(12) United States Patent
Tseng et al.

(10) Patent No.: US 12,332,410 B2
(45) Date of Patent: Jun. 17, 2025

(54) OPTICAL IMAGING SYSTEM, IMAGE CAPTURING UNIT AND ELECTRONIC DEVICE

(71) Applicant: LARGAN PRECISION CO., LTD., Taichung (TW)

(72) Inventors: Yu-Tai Tseng, Taichung (TW); Meng-Kuan Cho, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 818 days.

(21) Appl. No.: 17/359,030

(22) Filed: Jun. 25, 2021

(65) Prior Publication Data
US 2022/0244500 A1 Aug. 4, 2022

(30) Foreign Application Priority Data

Feb. 3, 2021 (TW) ................................. 110103920

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ....... G02B 13/0045; G02B 13/18; G02B 9/64
See application file for complete search history.

(56) References Cited

U.S. PATENT DOCUMENTS

| 2020/0393652 | A1 | 12/2020 | Kuo |
| 2021/0389575 | A1* | 12/2021 | Li ........................... G02B 9/64 |
| 2022/0066148 | A1 | 3/2022 | Zhao |

FOREIGN PATENT DOCUMENTS

| CN | 111505805 A | 8/2020 |
| CN | 111679399 A | 9/2020 |
| CN | 111722373 A | 9/2020 |
| CN | 111781711 A | 10/2020 |
| CN | 111812811 A | 10/2020 |
| CN | 111856717 A | 10/2020 |

(Continued)

OTHER PUBLICATIONS

Melles Griot Practical Application of Light: Catalogue, "Lens Shape"; "Aberration Balancing"; 1999, pp. 1.17, 1.27-1.28 (Year: 1999).*

(Continued)

*Primary Examiner* — Wyatt A Stoffa
*Assistant Examiner* — Samanvitha Sridhar
(74) *Attorney, Agent, or Firm* — Maschoff Brennan

(57) ABSTRACT

An optical imaging system includes ten lens elements which are, in order from an object side to an image side along an optical path: a first lens element, a second lens element, a third lens element, a fourth lens element, a fifth lens element, a sixth lens element, a seventh lens element, an eighth lens element, a ninth lens element and a tenth lens element. Each of the ten lens elements has an object-side surface facing toward the object side and an image-side surface facing toward the image side. The second lens element has negative refractive power. The tenth lens element has negative refractive power, and at least one of the object-side surface and the image-side surface of the tenth lens element has at least one inflection point.

8 Claims, 30 Drawing Sheets

(56) References Cited

FOREIGN PATENT DOCUMENTS

| | | |
|---|---|---|
| CN | 111856731 A | 10/2020 |
| CN | 111897103 A | 11/2020 |
| CN | 111965794 A | 11/2020 |
| CN | 112859291 A | 5/2021 |
| JP | 2016-006469 A | 1/2016 |
| TW | I684807 B | 2/2020 |
| WO | 2020-127280 A1 | 6/2020 |

OTHER PUBLICATIONS

Joseph M. Geary, "Introduction to Lens Design", 2007, Willmann-Bell Inc, 2nd Ed., pp. 23 (Year: 2007).*
Smith, W.J., "Modern lens design," McGraw-Hill Inc, pp. 25-27 (1992).
Gross, H., "Handbook of Optical Systems, Aberration Theory and Correction of Optical Systems, Chapter 31: Correction of Aberrations", vol. 3, pp. 215-221, 225 (2007).
Gross, H., "Handbook of Optical Systems, Aberration Theory and Correction of Optical Systems," vol. 3, pp. 377-379 (2007).
Extended European Search Report dated Jun. 27, 2024 as received in Application No. 24166974.6.

* cited by examiner

OPTICAL IMAGING SYSTEM, IMAGE CAPTURING UNIT AND ELECTRONIC DEVICE

RELATED APPLICATIONS

This application claims priority to Taiwan Application 110103920, filed on Feb. 3, 2021, which is incorporated by reference herein in its entirety.

BACKGROUND

Technical Field

The present disclosure relates to an optical imaging system, an image capturing unit and an electronic device, more particularly to an optical imaging system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical imaging system includes ten lens elements. The ten lens elements are, in order from an object side to an image side along an optical path, a first lens element, a second lens element, a third lens element, a fourth lens element, a fifth lens element, a sixth lens element, a seventh lens element, an eighth lens element, a ninth lens element and a tenth lens element. Each of the ten lens elements has an object-side surface facing toward the object side and an image-side surface facing toward the image side. The optical imaging system further includes an aperture stop. The second lens element has negative refractive power. The tenth lens element has negative refractive power, and at least one of the object-side surface and the image-side surface of the tenth lens element has at least one inflection point. When an axial distance between the aperture stop and the image-side surface of the tenth lens element is SD, an axial distance between the object-side surface of the first lens element and the image-side surface of the tenth lens element is TD, a curvature radius of the image-side surface of the ninth lens element is R18, a curvature radius of the object-side surface of the tenth lens element is R19, an axial distance between the object-side surface of the first lens element and an image surface is TL, and a maximum image height of the optical imaging system is ImgH, the following conditions are satisfied:

$0.60 < SD/TD < 1.20;$ $-1.20 < (R18+R19)/(R18-R19) < 1.30;$ and $0.50 < TL/ImgH < 2.50.$ According to another aspect of the present disclosure, an optical imaging system includes ten lens elements. The ten lens elements are, in order from an object side to an image side along an optical path, a first lens element, a second lens element, a third lens element, a fourth lens element, a fifth lens element, a sixth lens element, a seventh lens element, an eighth lens element, a ninth lens element and a tenth lens element. Each of the ten lens elements has an object-side surface facing toward the object side and an image-side surface facing toward the image side. The optical imaging system further includes an aperture stop. The tenth lens element has negative refractive power, the object-side surface of the tenth lens element is concave in a paraxial region thereof, and at least one of the object-side surface and the image-side surface of the tenth lens element has at least one inflection point. When an axial distance between the aperture stop and the image-side surface of the tenth lens element is SD, an axial distance between the object-side surface of the first lens element and the image-side surface of the tenth lens element is TD, a curvature radius of the image-side surface of the ninth lens element is R18, a curvature radius of the object-side surface of the tenth lens element is R19, an axial distance between the ninth lens element and the tenth lens element is T910, and a central thickness of the first lens element is CT1, the following conditions are satisfied:

$0.60 < SD/TD < 1.20;$ $-1.20 < (R18+R19)/(R18-R19) < 1.30;$ and $0 < T910/CT1 < 3.5.$ According to another aspect of the present disclosure, an optical imaging system includes ten lens elements. The ten lens elements are, in order from an object side to an image side along an optical path, a first lens element, a second lens element, a third lens element, a fourth lens element, a fifth lens element, a sixth lens element, a seventh lens element, an eighth lens element, a ninth lens element and a tenth lens element. Each of the ten lens elements has an object-side surface facing toward the object side and an image-side surface facing toward the image side. The optical imaging system further includes an aperture stop. The first lens element has positive refractive power. The image-side surface of the eighth lens element is concave in a paraxial region thereof and has at least one convex shape in an off-axis region thereof. At least one of the object-side surface and the image-side surface of the tenth lens element has at least one inflection point. When an axial distance between the aperture stop and the image-side surface of the tenth lens element is SD, an axial distance between the object-side surface of the first lens element and the image-side surface of the tenth lens element is TD, a curvature radius of the image-side surface of the eighth lens element is R16, a curvature radius of the image-side surface of the ninth lens element is R18, a curvature radius of the object-side surface of the tenth lens element is R19, a focal length of the optical imaging system is f, and a focal length of the first lens element is f1, the following conditions are satisfied:

$0.30 < SD/TD < 1.20;$ $-5.0 < (R18+R19)/(R18-R19) < 5.0;$ $0.15 < f/R16 < 8.0;$ and $0.20 < f/f1 < 4.0.$ According to another aspect of the present disclosure, an image capturing unit includes one of the aforementioned optical imaging systems and an image sensor, wherein the image sensor is disposed on the image surface of the optical imaging system, and the image sensor has at least 40 megapixels.

According to another aspect of the present disclosure, an electronic device includes at least two image capturing units facing the same side, wherein the at least two image capturing units include a first image capturing unit and a second image capturing unit. The first image capturing unit includes one of the aforementioned optical imaging systems and an image sensor that is disposed on the image surface of the optical imaging system. The second image capturing unit includes an optical lens assembly and an image sensor that is disposed on an image surface of the optical lens assembly. A maximum field of view of the first image capturing unit and a maximum field of view of the second image capturing unit differ by at least 30 degrees.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
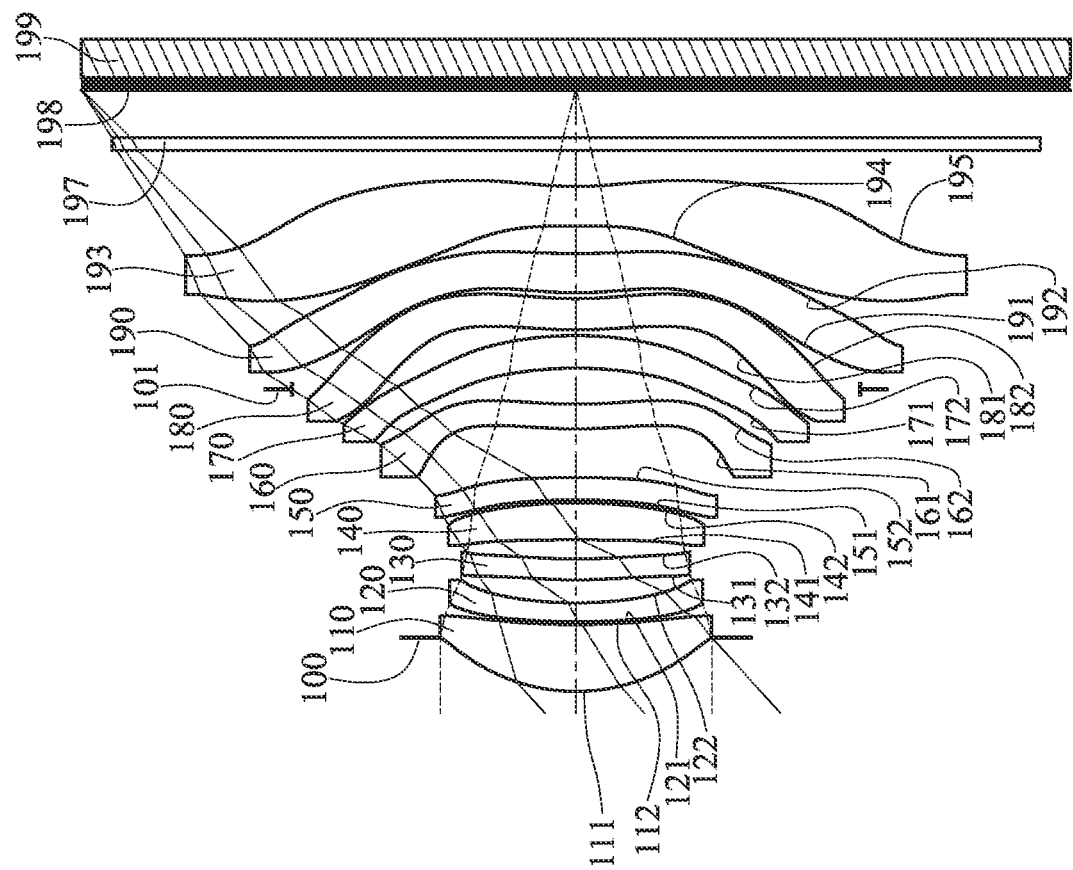
FIG. 1 is a schematic view of an image capturing unit according to the 1st embodiment of the present disclosure.

An optical imaging system includes ten lens elements. The ten lens elements are, in order from an object side to an image side along an optical path, a first lens element, a second lens element, a third lens element, a fourth lens element, a fifth lens element, a sixth lens element, a seventh lens element, an eighth lens element, a ninth lens element and a tenth lens element. Each of the ten lens elements has an object-side surface facing toward the object side and an image-side surface facing toward the image side.

The first lens element can have positive refractive power. Therefore, it is favorable for providing significant light convergence so as to effectively reduce the size of the optical imaging system for the requirement of miniaturization. The object-side surface of the first lens element can be convex in a paraxial region thereof. Therefore, it is favorable for reducing the angle between light rays and the lens surface so as to prevent total reflection.

The second lens element can have negative refractive power. Therefore, it is favorable for correcting aberrations generated by the first lens element, as well as correcting spherical aberration and chromatic aberration. The object-side surface of the second lens element can be convex in a paraxial region thereof, and the image-side surface of the second lens element can be concave in a paraxial region thereof. Therefore, it is favorable for controlling light rays in both tangential and sagittal directions so as to correct astigmatism.

The image-side surface of the third lens element can be concave in a paraxial region thereof. Therefore, it is favorable for obtaining a balance between the field of view and the size of the optical imaging system so as to meet product requirements.

The fourth lens element can have positive refractive power. Therefore, it is favorable for balancing refractive power of the fifth lens element so as to correct overall aberrations.

The image-side surface of the eighth lens element can be concave in a paraxial region thereof and can have at least one convex shape in an off-axis region thereof. Therefore, it is favorable for increasing the effective radius of the eighth lens element so as to adjust peripheral light rays, thereby effectively preventing distortion and maintaining brightness at the image periphery.

The image-side surface of the ninth lens element can be concave in a paraxial region thereof and can have at least one convex shape in an off-axis region thereof. Therefore, it is favorable for enhancing the capability of correcting off-axis aberrations at the image side of the optical imaging system, and it is also favorable for reducing distortion and field curvature.

The tenth lens element can have negative refractive power. Therefore, it is favorable for achieving a miniaturized module so as to reduce the size of the device. The object-side surface of the tenth lens element can be concave in a paraxial region thereof. Therefore, it is favorable for maintaining good image quality at different object distances. The image-side surface of the tenth lens element can be concave in a paraxial region thereof and can have at least one convex shape in an off-axis region thereof. Therefore, it is favorable for reducing the back focal length and the size of the optical imaging system for the requirement of miniaturization.

Figure 27:
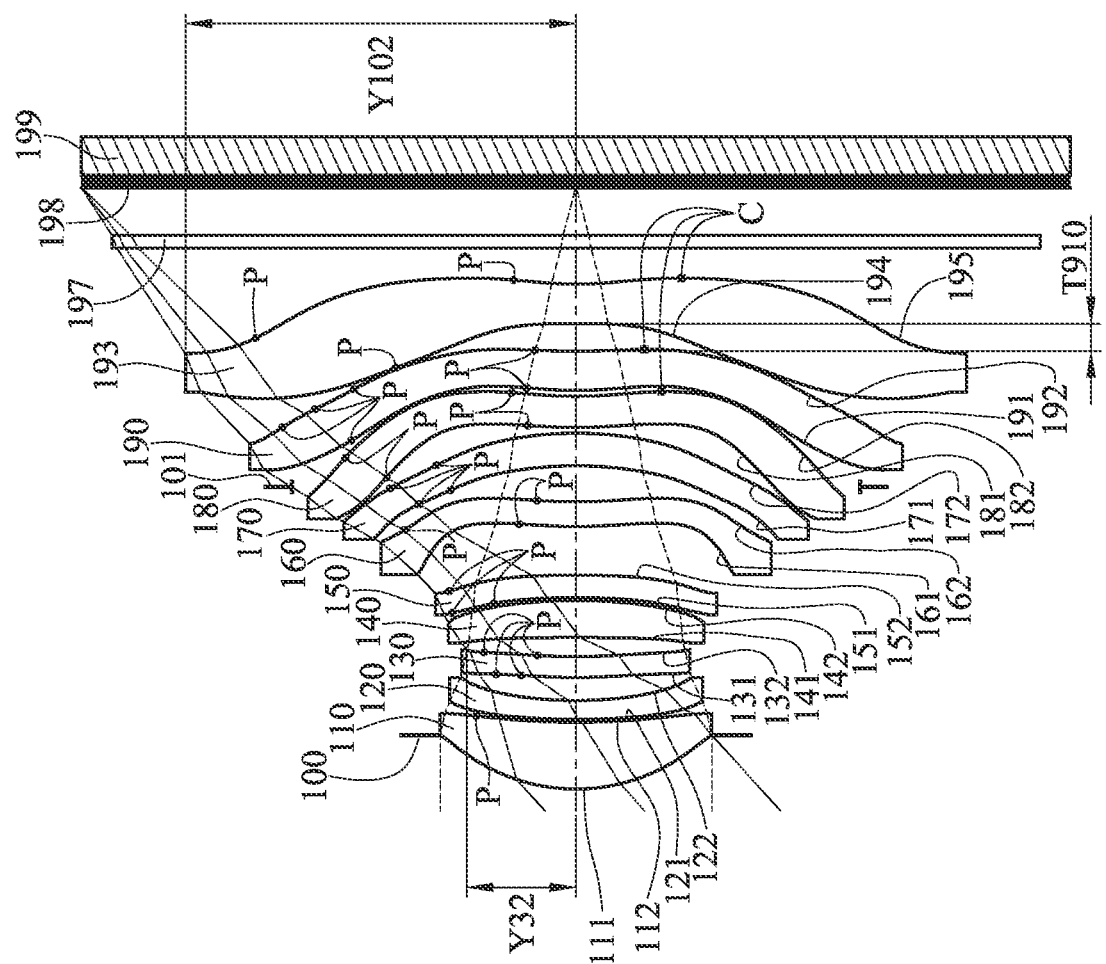
FIG. 27 shows a schematic view of T910, Y32, Y102, several inflection and critical points of the lens elements according to the 1st embodiment of the present disclosure.

According to the present disclosure, at least one of the object-side surface and the image-side surface of each of at least three lens elements of the optical imaging system can have at least one inflection point. Therefore, it is favorable for correcting field curvature so as to provide miniaturization and flatten Petzval surface of the optical imaging system. Moreover, at least one of the object-side surface and the image-side surface of the tenth lens element has at least one inflection point. Therefore, it is favorable for correcting off-axis aberrations and reducing the size of the optical imaging system. Please refer to FIG. 27, which shows a schematic view of inflection points P of the first lens element 110, the third lens element 130, the fifth lens element 150, the sixth lens element 160, the seventh lens element 170, the eighth lens element 180, the ninth lens element 190 and the tenth lens element 193 according to the 1st embodiment of the present disclosure. The inflection points on the first lens element, the third lens element and the fifth lens element through the tenth lens element in FIG. 27 are only exemplary. The other lens elements may also have one or more inflection points.

The image-side surface of the eighth lens element can have at least one critical point in an off-axis region thereof. Therefore, it is favorable for effectively correcting aberrations at the image periphery and reducing the size of the optical imaging system. Please refer to FIG. 27, which shows a schematic view of a critical point C of the image-side surface 182 of the eighth lens element 180 according to the 1st embodiment of the present disclosure.

The image-side surface of the ninth lens element can have at least one critical point in an off-axis region thereof. Therefore, it is favorable for effectively correcting distortion. Please refer to FIG. 27, which shows a schematic view of a critical point C of the image-side surface 192 of the ninth lens element 190 according to the 1st embodiment of the present disclosure.

The image-side surface of the tenth lens element can have at least one critical point in an off-axis region thereof. Therefore, it is favorable for effectively correcting field curvature while maintaining sufficient relative illuminance. Please refer to FIG. 27, which shows a schematic view of a critical point C of the image-side surface 195 of the tenth lens element 193 according to the 1st embodiment of the present disclosure. The critical points on the image-side surface of the eighth lens element, the image-side surface of the ninth lens element and the image-side surface of the tenth lens element in FIG. 27 are only exemplary. The other lens elements may also have one or more critical points.

According to the present disclosure, at least four lens elements of the optical imaging system can be made of plastic material. Therefore, it is favorable for effectively reducing manufacturing cost and increasing design flexibility, which is favorable for correcting off-axis aberrations.

According to the present disclosure, at least four lens elements of the optical imaging system can have Abbe numbers smaller than 40.0. Therefore, it is favorable for ensuring sufficient capability of controlling light rays with proper lens materials of the optical imaging system so as to balancing focus positions of light at different wavelengths and prevent overlapped images.

According to the present disclosure, the optical imaging system further includes an aperture stop. When an axial distance between the aperture stop and the image-side surface of the tenth lens element is SD, and an axial distance between the object-side surface of the first lens element and the image-side surface of the tenth lens element is TD, the following condition is satisfied: $0.30<SD/TD<1.20$. Therefore, it is favorable for effectively balancing the position of the aperture stop so as to control the size of the optical imaging system. Moreover, the following condition can also be satisfied: $0.60<SD/TD<1.20$. Moreover, the following condition can also be satisfied: $0.70<SD/TD<1.10$. Moreover, the following condition can also be satisfied: $0.80<SD/TD<1.0$.

When a curvature radius of the image-side surface of the ninth lens element is R18, and a curvature radius of the object-side surface of the tenth lens element is R19, the following condition is satisfied: $-5.0<(R18+R19)/(R18-R19)<5.0$. Therefore, it is favorable for providing good image quality at different object distances. Moreover, the following condition can also be satisfied: $-2.0<(R18+R19)/(R18-R19)<2.0$. Moreover, the following condition can also be satisfied: $-1.20<(R18+R19)/(R18-R19)<1.30$. Moreover, the following condition can also be satisfied: $-1.10<(R18+R19)/(R18-R19)<0.50$.

When an axial distance between the object-side surface of the first lens element and an image surface is TL, and a maximum image height of the optical imaging system is (which can be half of a diagonal length of an effective photosensitive area of the image sensor) ImgH, the following condition can be satisfied: $0.50<TL/ImgH<2.50$. Therefore, it is favorable for ensuring a sufficient light receiving area while reducing the total track length of the optical imaging system so as to prevent vignetting at the image periphery. Moreover, the following condition can also be satisfied: $0.50<TL/ImgH<1.85$. Moreover, the following condition can also be satisfied: $0.50<TL/ImgH<1.55$. Moreover, the following condition can also be satisfied: $0.90<TL/ImgH<1.35$.

When an axial distance between the ninth lens element and the tenth lens element is T910, and a central thickness of the first lens element is CT1, the following condition can be satisfied: $0<T910/CT1<3.5$. Therefore, it is favorable for increasing image quality at the image periphery in close-up photography. Moreover, the following condition can also be satisfied: 0.05<T910/CT1<2.0. Moreover, the following condition can also be satisfied: 0.10<T910/CT1<1.0. Moreover, the following condition can also be satisfied: 0.20<T910/CT1<0.75. Please refer to FIG. 27, which shows a schematic view of T910 according to the 1st embodiment of the present disclosure.

When a focal length of the optical imaging system is f, and a curvature radius of the image-side surface of the eighth lens element is R16, the following condition can be satisfied: 0.15<f/R16<8.0. Therefore, it is favorable for controlling the curvature of the image-side surface of the eighth lens element so as to correct aberrations at the image periphery in the optical imaging system. Moreover, the following condition can also be satisfied: 0.60<f/R16<5.0. Moreover, the following condition can also be satisfied: 1.0<f/R16<3.50.

When the focal length of the optical imaging system is f, and a focal length of the first lens element is f1, the following condition can be satisfied: 0.20<f/f1<4.0. Therefore, it is favorable for providing sufficient light convergence of the first lens element at the object side of the optical imaging system and preventing excessive aberrations due to an overly large curvature of the lens surface. Moreover, the following condition can also be satisfied: 0.60<f/f1<2.50. Moreover, the following condition can also be satisfied: 0.90<f/f1<2.0.

When a focal length of the ninth lens element is f9, and a focal length of the tenth lens element is f10, the following condition can be satisfied: −0.55<f10/f9<0. Therefore, it is favorable for ensuring relatively strong refractive power of the tenth lens element so as to balance light convergence and image quality.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, an Abbe number of the tenth lens element is V10, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, a refractive index of the tenth lens element is N10, a refractive index of the i-th lens element is Ni, and a minimum value of Vi/Ni is (Vi/Ni)min, the following condition can be satisfied: 7.0<(Vi/Ni)min<11.80, wherein i=1, 2, 3, 4, 5, 6, 7, 8, 9 or 10. Therefore, it is favorable for enhancing density difference between lens materials at the object side of the optical imaging system and air so as to achieve strong capability of controlling light path in limited space.

When the focal length of the optical imaging system is f, and a focal length of the eighth lens element is f8, the following condition can be satisfied: −0.50<f/f8<0.30. Therefore, it is favorable for properly arranging refractive power among the optical imaging system so as to achieve good image quality.

When the focal length of the optical imaging system is f, and the focal length of the ninth lens element is f9, the following condition can be satisfied: 0.10<f/f9<0.55. Therefore, it is favorable for having the ninth lens element as a correction lens so as to prevent an overly large curvature on the lens surface and to balance aberrations between lens elements of the object side and the image side.

When a central thickness of the third lens element is CT3, and a central thickness of the fourth lens element is CT4, the following condition can be satisfied: 1.0<CT4/CT3<2.20. Therefore, it is favorable for ensuring the ratio of the central thicknesses of the third lens element and the fourth lens element so as to increase uniformity of lens molding.

When the Abbe number of the first lens element is V1, the Abbe number of the second lens element is V2, and the Abbe number of the third lens element is V3, the following condition can be satisfied: 0.10<(V2+V3)/V1<0.90. Therefore, it is favorable for providing sufficient image control capabilities of the second lens element and the third lens element so as to correct various aberrations.

When an entrance pupil diameter of the optical imaging system is EPD, and an axial distance between the image-side surface of the tenth lens element and the image surface is BL, the following condition can be satisfied: 2.40<EPD/BL<6.0. Therefore, it is favorable for retaining a proper back focal length in limited space for lens assembling while ensuring a sufficient amount of incident light of the optical imaging system so as to meet requirements of product specifications.

When the focal length of the optical imaging system is f, and the entrance pupil diameter of the optical imaging system is EPD, the following condition can be satisfied: 0.80<f/EPD<2.40. Therefore, it is favorable for effectively controlling the size of entrance pupil and incident light of the optical imaging system so as to increase image brightness. Moreover, the following condition can also be satisfied: 0.80<f/EPD≤2.0. Moreover, the following condition can also be satisfied: 1.20<f/EPD≤2.0.

When a maximum value among refractive indices of all lens elements of the optical imaging system is Nmax, the following condition can be satisfied: 1.66<Nmax<1.78. Therefore, it is favorable for using proper lens materials to reduce difficulty in manufacturing and increase probability of commercialization of the optical imaging system. Moreover, the following condition can also be satisfied: 1.67<Nmax<1.72.

When the Abbe number of the fifth lens element is V5, and the Abbe number of the sixth lens element is V6, the following condition can be satisfied: 10.0<V5+V6<70.0. Therefore, it is favorable for providing relatively strong capability of controlling light path in the middle part of the optical imaging system. Moreover, the following condition can also be satisfied: 15.0<V5+V6<60.0. Moreover, the following condition can also be satisfied: 20.0<V5+V6<50.0.

When the axial distance between the object-side surface of the first lens element and the image surface is TL, and the focal length of the optical imaging system is f, the following condition can be satisfied: 0.80<TL/f<1.30. Therefore, it is favorable for balancing the total track length and controlling the field of view of the optical imaging system for various requirements of product applications.

When a minimum value among Abbe numbers of all lens elements of the optical imaging system is Vmin, the following condition can be satisfied: 8.0<Vmin<20.0. Therefore, it is favorable for controlling light path of the optical imaging system and balancing light convergence at different light wavelengths so as to correct aberrations. Moreover, the following condition can also be satisfied: 5.0<Vmin<19.0.

When a curvature radius of the object-side surface of the seventh lens element is R13, and a central thickness of the fifth lens element is CT5, the following condition can be satisfied: $10.0<|R13/CT5|<45.0$. Therefore, it is favorable for controlling the curvature of the object-side surface of the seventh lens element so as to correct aberrations of the optical imaging system. Moreover, the following condition can also be satisfied: $10.0<|R13/CT5|<30.0$. Moreover, the following condition can also be satisfied: $12.0<|R13/CT5|<25.0$.

When the maximum image height of the optical imaging system is ImgH, the following condition can be satisfied: $4.50\ [\text{mm}]<\text{ImgH}<12.0\ [\text{mm}]$. Therefore, it is favorable for controlling the size of the light receiving area to ensure sufficient image brightness and obtain a balance with specification requirements. Moreover, the following condition can also be satisfied: $4.50\ [\text{mm}]<\text{ImgH}<10.0\ [\text{mm}]$. Moreover, the following condition can also be satisfied: $5.80\ [\text{mm}]<\text{ImgH}<10.0\ [\text{mm}]$. Moreover, the following condition can also be satisfied: $6.50\ [\text{mm}]<\text{ImgH}<10.0\ [\text{mm}]$. Moreover, the following condition can also be satisfied: $8.0\ [\text{mm}]<\text{ImgH}<10.0\ [\text{mm}]$.

When the axial distance between the object-side surface of the first lens element and the image surface is TL, the following condition can be satisfied: $4.0\ [\text{mm}]<\text{TL}<15.0\ [\text{mm}]$. Therefore, it is favorable for controlling the total track length of the optical imaging system so as to expand product applications and satisfy current market demands.

When the axial distance between the image-side surface of the tenth lens element and the image surface is BL, and the axial distance between the object-side surface of the first lens element and the image-side surface of the tenth lens element is TD, the following condition can be satisfied: $0<BL/TD<0.25$. Therefore, it is favorable for reducing the back focal length and controlling the total track length of the optical imaging system.

When the maximum image height of the optical imaging system is ImgH, and the axial distance between the image-side surface of the tenth lens element and the image surface is BL, the following condition can be satisfied: $5.0<\text{ImgH}/BL<20.0$. Therefore, it is favorable for effectively reducing the back focal length while having a large light receiving area.

When a maximum value among central thicknesses of all lens elements of the optical imaging system is CTmax, and a minimum value among central thicknesses of all lens elements of the optical imaging system is CTmin, the following condition can be satisfied: $2.0<CTmax/CTmin<5.5$. Therefore, it is favorable for controlling lens thicknesses so as to ensure good quality and stability of lens molding.

When the focal length of the optical imaging system is f, and a focal length of the second lens element is f2, the following condition can be satisfied: $-3.0<f/f2<-0.25$. Therefore, it is favorable for correcting aberrations generated by the first lens element by the second lens element so as to increase image quality. Moreover, the following condition can also be satisfied: $-2.0<f/f2<-0.40$.

When a maximum effective radius of the image-side surface of the third lens element is Y32, and a maximum effective radius of the image-side surface of the tenth lens element is Y102, the following condition can be satisfied: $2.80<Y102/Y32<5.50$. Therefore, it is favorable for effectively controlling the ratio between effective radii of lens elements so as to favorably control the field of view and image height. Moreover, the following condition can also be satisfied: $3.0<Y102/Y32<4.50$. Please refer to FIG. 27, which shows a schematic view of Y32 and Y102 according to the 1st embodiment of the present disclosure.

When the focal length of the optical imaging system is f, a focal length of the third lens element is f3, a focal length of the fifth lens element is f5, a focal length of the sixth lens element is f6, a focal length of the seventh lens element is f7, and the focal length of the eighth lens element is f8, the following condition can be satisfied: $0<|f/f3|+|f/f5|+|f/f6|+|f/f7|+|f/f8|<1.10$. Therefore, it is favorable for providing multiple lens elements as correction lenses of the optical imaging system so as to correct aberrations at the image periphery. Moreover, the following condition can also be satisfied: $0<|f/f3|+|f/f5|+|f/f6|+|f/f7|+|f/f8|<0.60$.

When the Abbe number of the sixth lens element is V6, the following condition can be satisfied: $10.0<V6<40.0$. Therefore, it is favorable for correcting aberrations by the sixth lens element so as to prevent image shift from light of different wavelengths. Moreover, the following condition can also be satisfied: $10.0<V6<30.0$.

When the focal length of the optical imaging system is f, and a curvature radius of the image-side surface of the tenth lens element is R20, the following condition can be satisfied: $0.60<f/R20<2.50$. Therefore, it is favorable for controlling the back focal length of the optical imaging system and preventing the optical imaging system being too large. Moreover, the following condition can also be satisfied: $0.90<f/R20<2.00$.

When a sum of central thicknesses of all lens elements of the optical imaging system is $\Sigma CT$, and the axial distance between the object-side surface of the first lens element and the image-side surface of the tenth lens element is TD, the following condition can be satisfied: $0.45<\Sigma CT/TD<1.0$. Therefore, it is favorable for balancing the lens thickness and spacing between lens elements so as to improve space utilization. Moreover, the following condition can also be satisfied: $0.55<\Sigma CT/TD<0.75$.

According to the present disclosure, the aforementioned features and conditions can be utilized in numerous combinations so as to achieve corresponding effects.

According to the present disclosure, the lens elements of the optical imaging system can be made of either glass or plastic material. When the lens elements are made of glass material, the refractive power distribution of the optical imaging system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical imaging system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. In addition, the additive may also be coated on the lens surfaces so as to provide abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical imaging system, based on the corresponding image sensor, can be flat or curved, especially a curved surface being concave facing towards the object side of the optical imaging system.

According to the present disclosure, an image correction unit, such as a field flattener, can be optionally disposed between the lens element closest to the image side of the optical imaging system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 28:
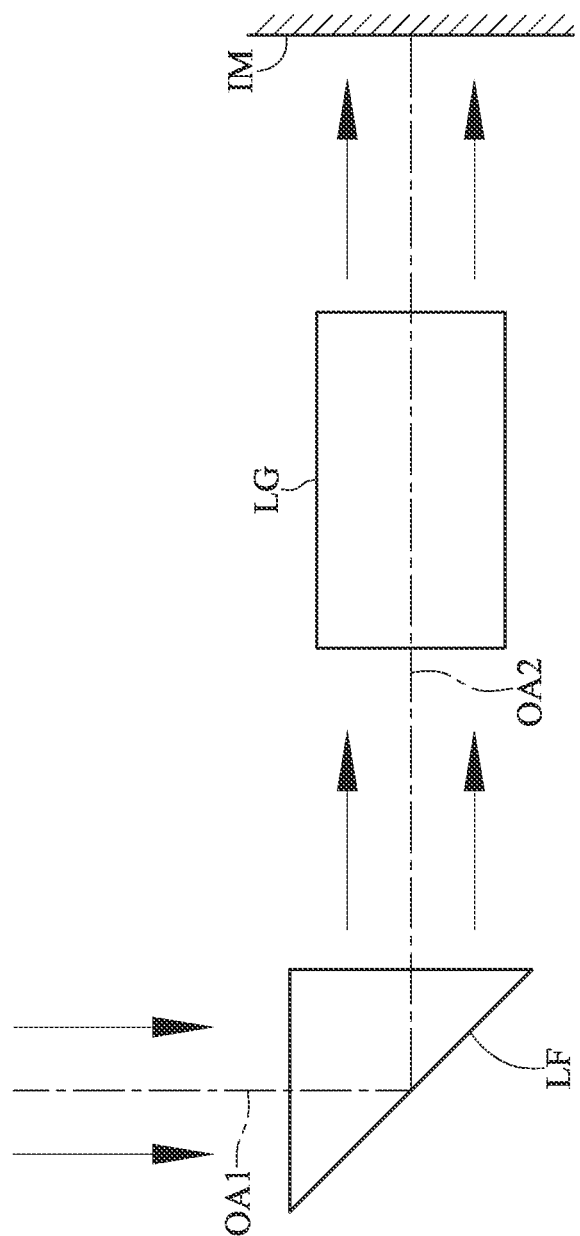
FIG. 28 shows a schematic view of a configuration of a light-folding element in an optical imaging system according to one embodiment of the present disclosure.
Figure 29:
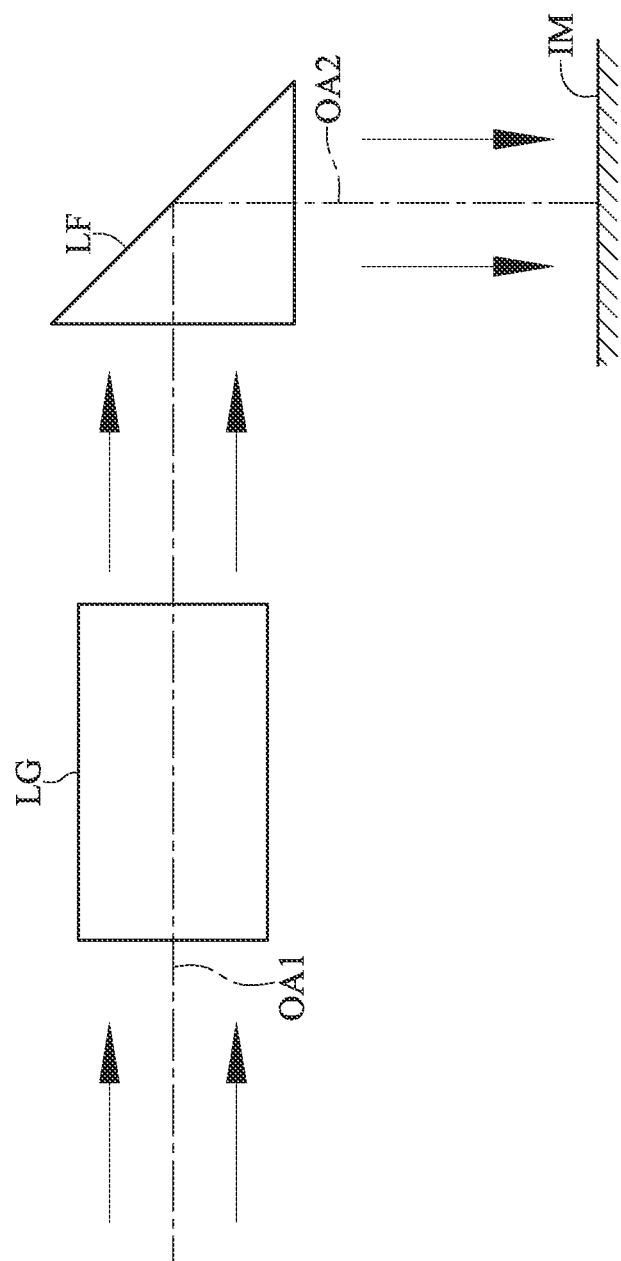
FIG. 29 shows a schematic view of another configuration of a light-folding element in an optical imaging system according to one embodiment of the present disclosure.
Figure 30:
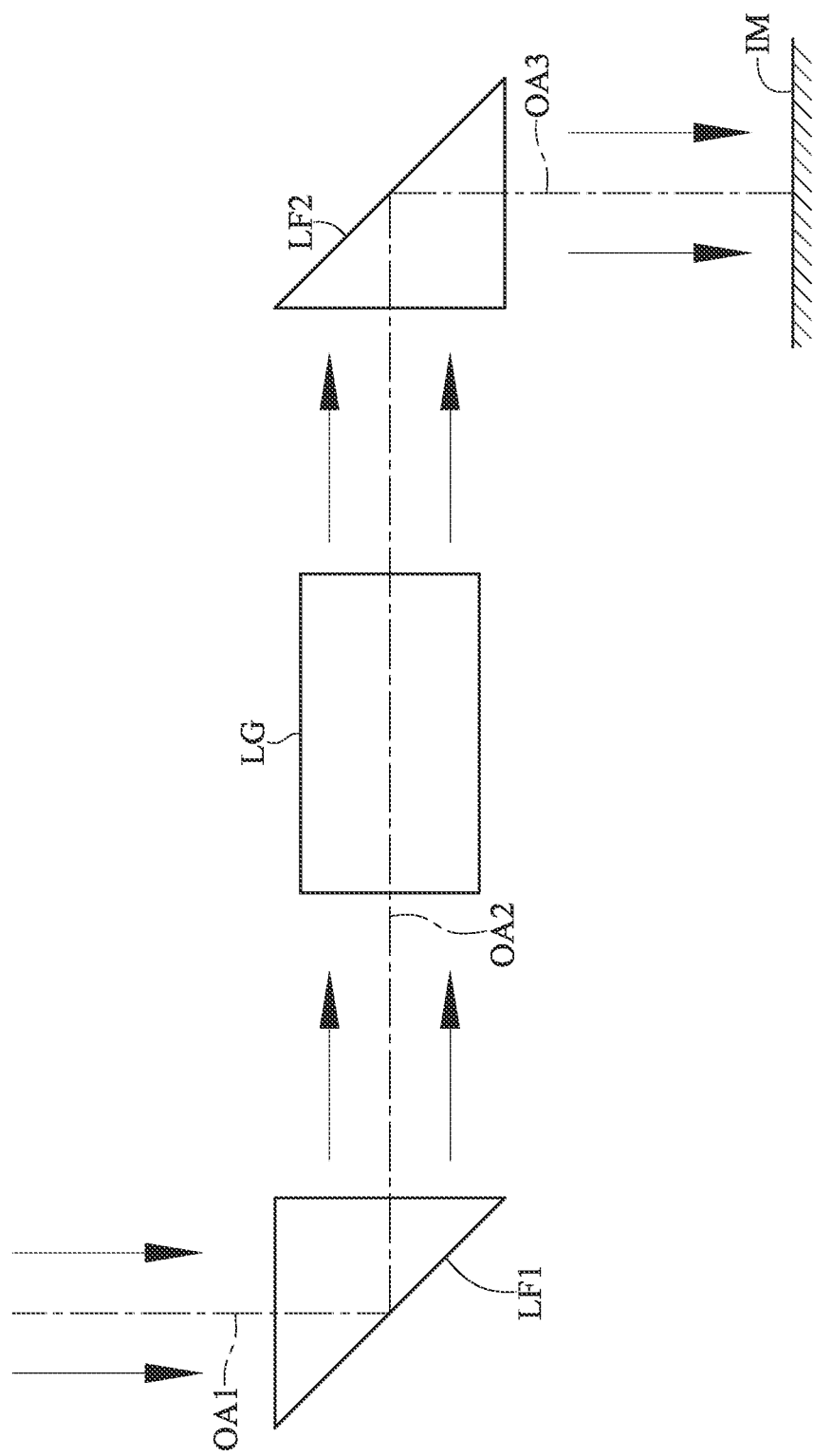
FIG. 30 shows a schematic view of a configuration of two light-folding elements in an optical imaging system according to one embodiment of the present disclosure.

According to the present disclosure, at least one light-folding element, such as a prism or a mirror, can be optionally disposed between an imaged object and the image surface on the imaging optical path, such that the optical imaging system can be more flexible in space arrangement, and therefore the dimensions of an electronic device is not restricted by the total track length of the optical imaging system. Specifically, please refer to FIG. 28 and FIG. 29. FIG. 28 shows a schematic view of a configuration of a light-folding element in an optical imaging system according to one embodiment of the present disclosure, and FIG. 29 shows a schematic view of another configuration of a light-folding element in an optical imaging system according to one embodiment of the present disclosure. In FIG. 28 and FIG. 29, the optical imaging system can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the optical imaging system as shown in FIG. 28 or disposed between a lens group LG of the optical imaging system and the image surface IM as shown in FIG. 29. Furthermore, please refer to FIG. 30, which shows a schematic view of a configuration of two light-folding elements in an optical imaging system according to one embodiment of the present disclosure. In FIG. 30, the optical imaging system can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical imaging system, the second light-folding element LF2 is disposed between the lens group LG of the optical imaging system and the image surface IM, and the travelling direction of light on the first optical axis OA1 can be the same direction as the travelling direction of light on the third optical axis OA3 as shown in FIG. 30. The optical imaging system can be optionally provided with three or more light-folding elements, and the present disclosure is not limited to the type, amount and position of the light-folding elements of the embodiments disclosed in the aforementioned figures.

According to the present disclosure, the optical imaging system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging system and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging system and thereby provides a wider field of view for the same.

According to the present disclosure, the optical imaging system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
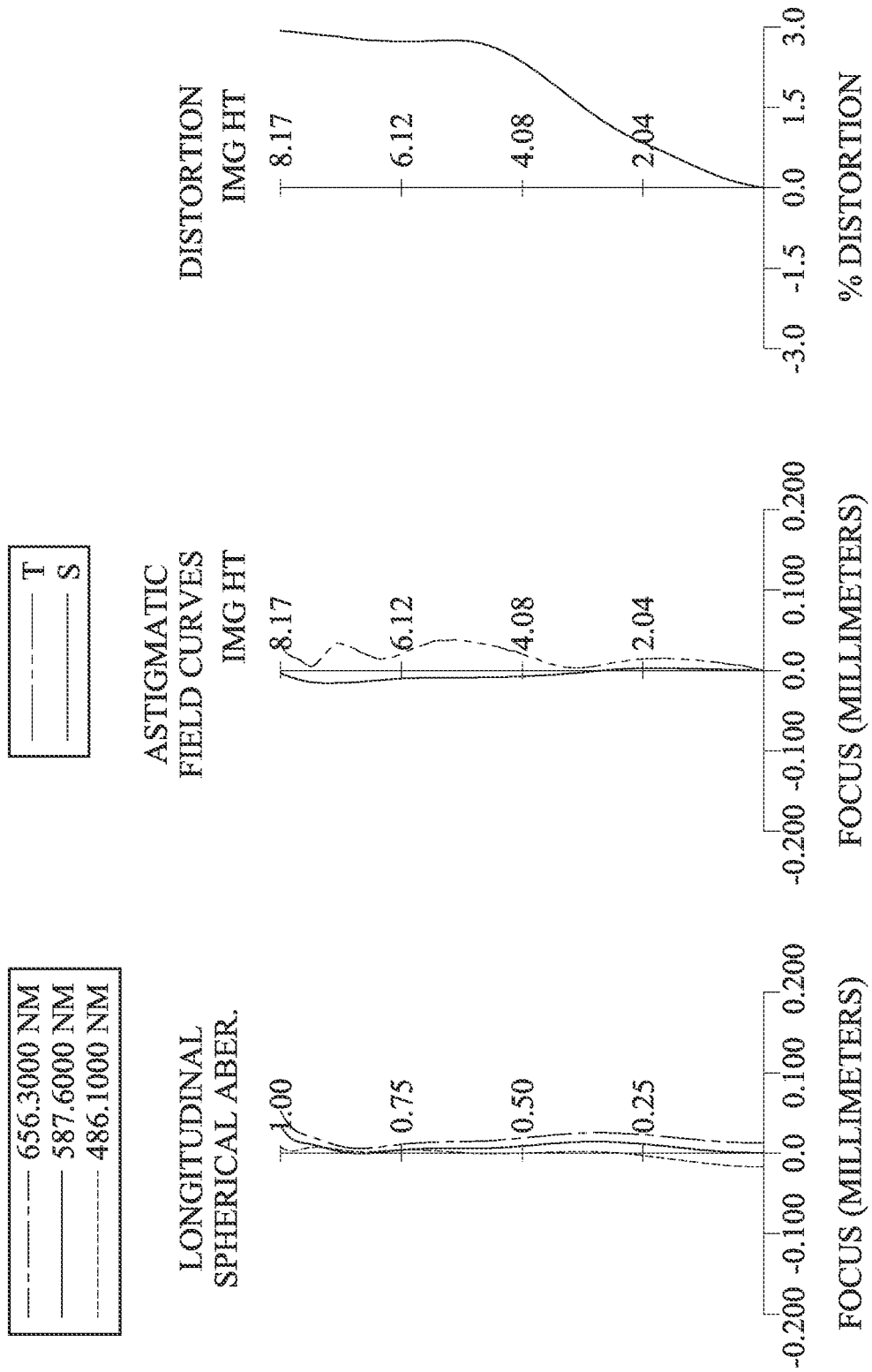
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging system (its reference numeral is omitted) of the present disclosure and an image sensor 199. The optical imaging system includes, in order from an object side to an image side along an optical path, an aperture stop 100, a first lens element 110, a second lens element 120, a third lens element 130, a fourth lens element 140, a fifth lens element 150, a sixth lens element 160, a seventh lens element 170, an eighth lens element 180, a stop 101, a ninth lens element 190, a tenth lens element 193, a filter 197 and an image surface 198. The optical imaging system includes ten lens elements (110, 120, 130, 140, 150, 160, 170, 180, 190 and 193) with no additional lens element disposed between each of the adjacent ten lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The image-side surface 112 of the first lens element 110 has at least one inflection point.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has at least one inflection point. The image-side surface 132 of the third lens element 130 has at least one inflection point.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has at least one inflection point. The image-side surface 152 of the fifth lens element 150 has at least one inflection point.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has at least one inflection point. The image-side surface 162 of the sixth lens element 160 has at least one inflection point.

The seventh lens element 170 with negative refractive power has an object-side surface 171 being concave in a paraxial region thereof and an image-side surface 172 being convex in a paraxial region thereof. The seventh lens element 170 is made of plastic material and has the object-side surface 171 and the image-side surface 172 being both aspheric. The object-side surface 171 of the seventh lens element 170 has at least one inflection point. The image-side surface 172 of the seventh lens element 170 has at least one inflection point.

The eighth lens element 180 with negative refractive power has an object-side surface 181 being convex in a paraxial region thereof and an image-side surface 182 being concave in a paraxial region thereof. The eighth lens element 180 is made of plastic material and has the object-side surface 181 and the image-side surface 182 being both aspheric. The object-side surface 181 of the eighth lens element 180 has at least one inflection point. The image-side surface 182 of the eighth lens element 180 has at least one inflection point. The image-side surface 182 of the eighth lens element 180 has at least one critical point in an off-axis region thereof.

The ninth lens element 190 with positive refractive power has an object-side surface 191 being convex in a paraxial region thereof and an image-side surface 192 being concave in a paraxial region thereof. The ninth lens element 190 is made of plastic material and has the object-side surface 191 and the image-side surface 192 being both aspheric. The object-side surface 191 of the ninth lens element 190 has at least one inflection point. The image-side surface 192 of the ninth lens element 190 has at least one inflection point. The image-side surface 192 of the ninth lens element 190 has at least one critical point in an off-axis region thereof.

The tenth lens element 193 with negative refractive power has an object-side surface 194 being concave in a paraxial region thereof and an image-side surface 195 being concave in a paraxial region thereof. The tenth lens element 193 is made of plastic material and has the object-side surface 194 and the image-side surface 195 being both aspheric. The object-side surface 194 of the tenth lens element 193 has at least one inflection point. The image-side surface 195 of the tenth lens element 193 has at least one inflection point. The image-side surface 195 of the tenth lens element 193 has at least one critical point in an off-axis region thereof.

The filter 197 is made of glass material and located between the tenth lens element 193 and the image surface 198, and will not affect the focal length of the optical imaging system. The image sensor 199 is disposed on or near the image surface 198 of the optical imaging system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26, 28 and 30.

In the optical imaging system of the image capturing unit according to the 1st embodiment, when a focal length of the optical imaging system is f, an f-number of the optical imaging system is Fno, and half of a maximum field of view of the optical imaging system is HFOV, these parameters have the following values: f=8.75 millimeters (mm), Fno=1.95, HFOV=42.2 degrees (deg.).

When an Abbe number of the sixth lens element 160 is V6, the following condition is satisfied: V6=23.5.

When an Abbe number of the first lens element 110 is V1, an Abbe number of the second lens element 120 is V2, and an Abbe number of the third lens element 130 is V3, the following condition is satisfied: (V2+V3)/V1=0.7.

When an Abbe number of the fifth lens element 150 is V5, and the Abbe number of the sixth lens element 160 is V6, the following condition is satisfied: V5+V6=43.9.

When a minimum value among Abbe numbers of all lens elements of the optical imaging system is Vmin, the following condition is satisfied: Vmin=18.4. In this embodiment, among the first through tenth lens elements (110-193), the Abbe number of the second lens element 120 is substantially equal to the Abbe number of the third lens element 130 and is smaller than Abbe numbers of the other lens elements, and Vmin is equal to the Abbe number of the second lens element 120 or the Abbe number of the third lens element 130.

When the Abbe number of the first lens element 110 is V1, the Abbe number of the second lens element 120 is V2, the Abbe number of the third lens element 130 is V3, an Abbe number of the fourth lens element 140 is V4, the Abbe number of the fifth lens element 150 is V5, the Abbe number of the sixth lens element 160 is V6, an Abbe number of the seventh lens element 170 is V7, an Abbe number of the eighth lens element 180 is V8, an Abbe number of the ninth lens element 190 is V9, an Abbe number of the tenth lens element 193 is V10, an Abbe number of the i-th lens element is Vi, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, a refractive index of the eighth lens element 180 is N8, a refractive index of the ninth lens element 190 is N9, a refractive index of the tenth lens element 193 is N10, a refractive index of the i-th lens element is Ni, and a minimum value of Vi/Ni is (Vi/Ni)min, the following conditions are satisfied: V1/N1=36.30; V2/N2=10.90; V3/N3=10.90; V4/N4=36.26; V5/N5=12.29; V6/N6=14.34; V7/N7=36.26; V8/N8=17.83; V9/N9=36.26; V10/N10=36.48; and (Vi/Ni)min=10.90, wherein i=1, 2, 3, 4, 5, 6, 7, 8, 9 or 10. In this embodiment, among the first through tenth lens elements (110-193), the second lens element 120 has a value of Vi/Ni (i.e., V2/N2) that is substantially equal to that of the third lens element 130 (i.e., V3/N3) and is smaller than that of the other lens elements, and the value of (Vi/Ni)min is equal to the value of Vi/Ni of the second lens element 120 or the value of Vi/Ni of the third lens element 130.

When a maximum value among refractive indices of all lens elements of the optical imaging system is Nmax, the following condition is satisfied: Nmax=1.686. In this embodiment, among the first through tenth lens elements (110-193), the refractive index of the second lens element 120 is substantially equal to the refractive index of the third lens element 130 and is larger than refractive indices of the other lens elements, and Nmax is equal to the refractive index of the second lens element 120 or the refractive index of the third lens element 130.

When a central thickness of the third lens element 130 is CT3, and a central thickness of the fourth lens element 140 is CT4, the following condition is satisfied: CT4/CT3=1.773.

When an axial distance between the ninth lens element 190 and the tenth lens element 193 is T910, and a central thickness of the first lens element 110 is CT1, the following condition is satisfied: T910/CT1=0.42. In this embodiment, an axial distance between two adjacent lens elements is a distance in a paraxial region between two adjacent lens surfaces of the two adjacent lens elements.

When a sum of central thicknesses of all lens elements of the optical imaging system is ΣCT, and an axial distance between the object-side surface 111 of the first lens element 110 and the image-side surface 195 of the tenth lens element 193 is TD, the following condition is satisfied: ΣCT/TD=0.66. In this embodiment, ΣCT is a sum of central thicknesses of the first lens element 110, the second lens element 120, the third lens element 130, the fourth lens element 140, the fifth lens element 150, the sixth lens element 160, the seventh lens element 170, the eighth lens element 180, the ninth lens element 190 and the tenth lens element 193.

When a maximum value among central thicknesses of all lens elements of the optical imaging system is CTmax, and a minimum value among central thicknesses of all lens elements of the optical imaging system is CTmin, the following condition is satisfied: CTmax/CTmin=3.56. In this embodiment, among the first through tenth lens elements (110-193), the central thickness of the first lens element 110 is larger than central thicknesses of the other lens elements of the optical imaging system, and CTmax is equal to the central thickness of the first lens element 110. In this embodiment, among the first through tenth lens elements (110-193), a central thickness of the second lens element 120 is smaller than central thicknesses of the other lens elements of the optical imaging system, and CTmin is equal to the central thickness of the second lens element 120.

When a curvature radius of the object-side surface 171 of the seventh lens element 170 is R13, and a central thickness of the fifth lens element 150 is CT5, the following condition is satisfied: |R13/CT5|=15.11.

When the focal length of the optical imaging system is f, and a curvature radius of the image-side surface 182 of the eighth lens element 180 is R16, the following condition is satisfied: f/R16=1.35.

When the focal length of the optical imaging system is f, and a curvature radius of the image-side surface 195 of the tenth lens element 193 is R20, the following condition is satisfied: f/R20=1.68.

When a curvature radius of the image-side surface 192 of the ninth lens element 190 is R18, and a curvature radius of the object-side surface 194 of the tenth lens element 193 is R19, the following condition is satisfied: (R18+R19)/(R18−R19)=−0.46.

When the focal length of the optical imaging system is f, and a focal length of the first lens element 110 is f1, the following condition is satisfied: f/f1=1.19.

When the focal length of the optical imaging system is f, and a focal length of the second lens element 120 is f2, the following condition is satisfied: f/f2=−0.42.

When the focal length of the optical imaging system is f, and a focal length of the eighth lens element 180 is f8, the following condition is satisfied: f/f8=−0.06.

When the focal length of the optical imaging system is f, and a focal length of the ninth lens element 190 is f9, the following condition is satisfied: f/f9=0.33.

When the focal length of the ninth lens element 190 is f9, and a focal length of the tenth lens element 193 is f10, the following condition is satisfied: f10/f9=−0.31.

When the focal length of the optical imaging system is f, a focal length of the third lens element 130 is f3, a focal length of the fifth lens element 150 is f5, a focal length of the sixth lens element 160 is f6, a focal length of the seventh lens element 170 is f7, and the focal length of the eighth lens element 180 is f8, the following condition is satisfied: |f/f3|+|f/f5|+|f/f6|+|f/f7|+|f/f8|=0.31.

When a maximum effective radius of the image-side surface 132 of the third lens element 130 is Y32, and a maximum effective radius of the image-side surface 195 of the tenth lens element 193 is Y102, the following condition is satisfied: Y102/Y32=3.49.

When an axial distance between the object-side surface 111 of the first lens element 110 and the image surface 198 is TL, the following condition is satisfied: TL=9.94 [mm].

When the axial distance between the object-side surface 111 of the first lens element 110 and the image surface 198 is TL, and the focal length of the optical imaging system is f, the following condition is satisfied: TL/f=1.14.

When the axial distance between the object-side surface 111 of the first lens element 110 and the image surface 198 is TL, and a maximum image height of the optical imaging system is ImgH, the following condition is satisfied: TL/ImgH=1.22.

When the maximum image height of the optical imaging system is ImgH, and an axial distance between the image-side surface 195 of the tenth lens element 193 and the image surface 198 is BL, the following condition is satisfied: ImgH/BL=5.13.

When an entrance pupil diameter of the optical imaging system is EPD, and the axial distance between the image-side surface 195 of the tenth lens element 193 and the image surface 198 is BL, the following condition is satisfied: EPD/BL=2.82.

When the axial distance between the image-side surface 195 of the tenth lens element 193 and the image surface 198 is BL, and the axial distance between the object-side surface 111 of the first lens element 110 and the image-side surface 195 of the tenth lens element 193 is TD, the following condition is satisfied: BL/TD=0.19.

When an axial distance between the aperture stop 100 and the image-side surface 195 of the tenth lens element 198 is SD, and the axial distance between the object-side surface 111 of the first lens element 110 and the image-side surface 195 of the tenth lens element 193 is TD, the following condition is satisfied: SD/TD=0.89.

When the focal length of the optical imaging system is f, and the entrance pupil diameter of the optical imaging system is EPD, the following condition is satisfied: f/EPD=1.95.

When the maximum image height of the optical imaging system is ImgH, the following condition is satisfied: ImgH=8.17 [mm].

The detailed optical data of the 1st embodiment are shown in Table 1 and the aspheric surface data are shown in Table 2 below.

TABLE 1

1st Embodiment
f = 8.75 mm, Fno = 1.95, HFOV = 42.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.8931 | | | | |
| 2 | Lens 1 | 3.115 | (ASP) | 1.1043 | Plastic | 1.545 | 56.1 | 7.36 |
| 3 | | 12.222 | (ASP) | 0.0500 | | | | |
| 4 | Lens 2 | 13.661 | (ASP) | 0.3100 | Plastic | 1.686 | 18.4 | −20.77 |
| 5 | | 6.911 | (ASP) | 0.3810 | | | | |
| 6 | Lens 3 | 9.234 | (ASP) | 0.3450 | Plastic | 1.686 | 18.4 | 215.95 |
| 7 | | 9.699 | (ASP) | 0.3156 | | | | |
| 8 | Lens 4 | −54.613 | (ASP) | 0.6117 | Plastic | 1.544 | 56.0 | 18.82 |
| 9 | | −8.655 | (ASP) | 0.0500 | | | | |
| 10 | Lens 5 | −11.352 | (ASP) | 0.3696 | Plastic | 1.660 | 20.4 | −43.46 |
| 11 | | −19.032 | (ASP) | 0.8047 | | | | |
| 12 | Lens 6 | 8.102 | (ASP) | 0.4080 | Plastic | 1.639 | 23.5 | 1357.64 |
| 13 | | 8.018 | (ASP) | 0.5971 | | | | |
| 14 | Lens 7 | −5.584 | (ASP) | 0.5381 | Plastic | 1.544 | 56.0 | −1055.87 |
| 15 | | −5.830 | (ASP) | 0.0932 | | | | |
| 16 | Lens 8 | 7.207 | (ASP) | 0.5159 | Plastic | 1.587 | 28.3 | −154.17 |
| 17 | | 6.499 | (ASP) | −1.5000 | | | | |
| 18 | Stop | Plano | | 1.5979 | | | | |
| 19 | Lens 9 | 6.412 | (ASP) | 0.6477 | Plastic | 1.544 | 56.0 | 26.86 |
| 20 | | 11.019 | (ASP) | 0.4585 | | | | |
| 21 | Lens 10 | −29.606 | (ASP) | 0.6500 | Plastic | 1.534 | 56.0 | −8.22 |
| 22 | | 5.198 | (ASP) | 0.6000 | | | | |
| 23 | Filter | Plano | | 0.2100 | Glass | 1.517 | 64.2 | — |
| 24 | | Plano | | 0.7814 | | | | |
| 25 | Image | Plano | | — | | | | |

Note:
Reference wavelength is 587.6 nm (d-line).
An effective radius of the stop 101 (Surface 18) is 4.693 mm.

TABLE 2

Aspheric Coefficients

| Surface # | 2 | 3 | 4 | 5 | 6 |
|---|---|---|---|---|---|
| k = | −6.542430E−01 | −5.006651E+01 | −2.640853E+01 | 5.246476E+00 | 3.949420E+00 |
| A4 = | 2.745005E−03 | 7.996204E−04 | 2.437208E−03 | 8.148874E−04 | −1.424592E−02 |
| A6 = | 2.876543E−04 | 2.487837E−03 | 2.886838E−03 | −1.368107E−04 | 3.305089E−05 |
| A8 = | −6.503023E−05 | −1.746697E−03 | −1.227724E−03 | 1.249843E−03 | −2.796746E−05 |
| A10 = | 2.841890E−05 | 5.492099E−04 | 2.563956E−04 | −8.457764E−04 | −3.189205E−05 |
| A12 = | −9.227980E−06 | −9.607282E−05 | 5.406606E−06 | 3.054137E−04 | 1.056326E−04 |
| A14 = | 1.553301E−06 | 8.138441E−06 | −7.487761E−06 | −5.023574E−05 | −2.351461E−05 |
| A16 = | −2.050922E−07 | −2.803378E−07 | 7.175167E−07 | 3.554977E−06 | 1.385938E−06 |

| Surface # | 7 | 8 | 9 | 10 | 11 |
|---|---|---|---|---|---|
| k = | −6.989611E+00 | 9.000000E+01 | 4.249790E+00 | −5.022237E+01 | −5.136813E+01 |
| A4 = | −9.113524E−03 | 1.352441E−03 | 8.461456E−03 | −3.401700E−03 | −7.801241E−03 |
| A6 = | −1.176520E−03 | −6.022866E−03 | −8.348493E−03 | −7.464916E−03 | −4.212322E−03 |
| A8 = | 7.812957E−04 | 5.783986E−03 | 2.200222E−03 | 4.711041E−03 | 4.453697E−03 |
| A10 = | −3.427566E−04 | −4.304063E−03 | 1.349926E−03 | −1.971731E−03 | −2.705594E−03 |
| A12 = | 1.772907E−04 | 1.934566E−03 | −1.616176E−03 | 6.490923E−04 | 9.858859E−04 |
| A14 = | −2.668499E−05 | −5.143486E−04 | 7.147616E−04 | −1.702803E−04 | −2.096990E−04 |
| A16 = | 8.300568E−07 | 7.692023E−05 | −1.675303E−04 | 3.394156E−05 | 2.356072E−05 |
| A18 = | — | −5.040673E−06 | 2.090150E−05 | −4.050419E−06 | −9.471849E−07 |
| A20 = | — | — | −1.124649E−06 | 1.953264E−07 | −1.681967E−08 |

| Surface # | 12 | 13 | 14 | 15 | 16 |
|---|---|---|---|---|---|
| k = | 2.923230E+00 | 1.565122E+00 | 4.840572E−01 | 2.891532E−01 | −1.377454E+01 |
| A4 = | −1.953525E−02 | −1.861571E−02 | 1.608729E−02 | −9.934399E−04 | −2.427419E−02 |
| A6 = | 2.441977E−03 | 2.937071E−03 | −7.013273E−03 | 5.832967E−03 | 8.176369E−03 |
| A8 = | −1.467632E−03 | −1.923504E−03 | 1.364095E−03 | −5.060206E−03 | −3.456098E−03 |
| A10 = | 4.077471E−04 | 6.765068E−04 | −7.491740E−04 | 1.705642E−03 | 1.108166E−03 |
| A12 = | 6.870278E−06 | −1.381942E−04 | 3.617866E−04 | −3.075674E−04 | −2.793622E−04 |
| A14 = | −6.079236E−05 | 1.467389E−05 | −8.773550E−05 | 3.320275E−05 | 4.943889E−05 |
| A16 = | 2.490264E−05 | −4.382457E−07 | 1.177163E−05 | −2.203600E−06 | −5.755709E−06 |
| A18 = | −5.444759E−06 | −5.089941E−08 | −9.057128E−07 | 8.690138E−08 | 4.289321E−07 |
| A20 = | 7.180998E−07 | 4.606150E−09 | 3.766214E−08 | −1.814972E−09 | −1.967306E−08 |
| A22 = | −5.413665E−08 | −1.071677E−10 | −6.580461E−10 | 1.448999E−11 | 5.056467E−10 |
| A24 = | 1.811195E−09 | — | — | — | −5.575294E−12 |

| Surface # | 17 | 19 | 20 | 21 | 22 |
|---|---|---|---|---|---|
| k = | −1.460072E+01 | −1.142581E+00 | 8.536253E−01 | 0.000000E+00 | −1.002451E+00 |
| A4 = | −1.008471E−02 | −1.634838E−02 | −1.841078E−02 | −4.005840E−02 | −3.649476E−02 |
| A6 = | −8.370334E−03 | −6.171353E−03 | 2.143035E−03 | 7.159282E−03 | 7.675893E−03 |
| A8 = | 5.260767E−03 | 2.583856E−03 | −9.173041E−04 | −1.931532E−04 | −1.090354E−03 |
| A10 = | −1.533216E−03 | −4.446112E−04 | 3.399267E−04 | −1.061078E−04 | 1.072090E−04 |
| A12 = | 2.633079E−04 | 4.203751E−05 | −6.651724E−05 | 1.887984E−05 | −7.688316E−06 |
| A14 = | −2.879433E−05 | −2.168534E−06 | 7.705370E−06 | −1.674792E−06 | 4.190318E−07 |
| A16 = | 2.064807E−06 | 3.998118E−08 | −5.704070E−07 | 9.431214E−08 | −1.779490E−08 |
| A18 = | −9.680792E−08 | 1.958392E−09 | 2.790944E−08 | −3.608484E−09 | 5.884303E−10 |
| A20 = | 2.855941E−09 | −1.522970E−10 | −9.040618E−10 | 9.554125E−11 | −1.473202E−11 |
| A22 = | −4.799648E−11 | 4.474200E−12 | 1.877607E−11 | −1.730758E−12 | 2.658231E−13 |
| A24 = | 3.489991E−13 | −6.521740E−14 | −2.293849E−13 | 2.053208E−14 | −3.218889E−15 |
| A26 = | — | 3.901859E−16 | 1.317641E−15 | −1.440092E−16 | 2.321577E−17 |
| A28 = | — | — | −1.171438E−18 | 4.534852E−19 | −7.506803E−20 |
| A30 = | — | — | — | −1.529311E−24 | 8.670393E−25 |

In Table 1, the curvature radius, the thickness and the focal length are shown in millimeters (mm). Surface numbers 0-25 represent the surfaces sequentially arranged from the object side to the image side along the optical axis. In Table 2, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
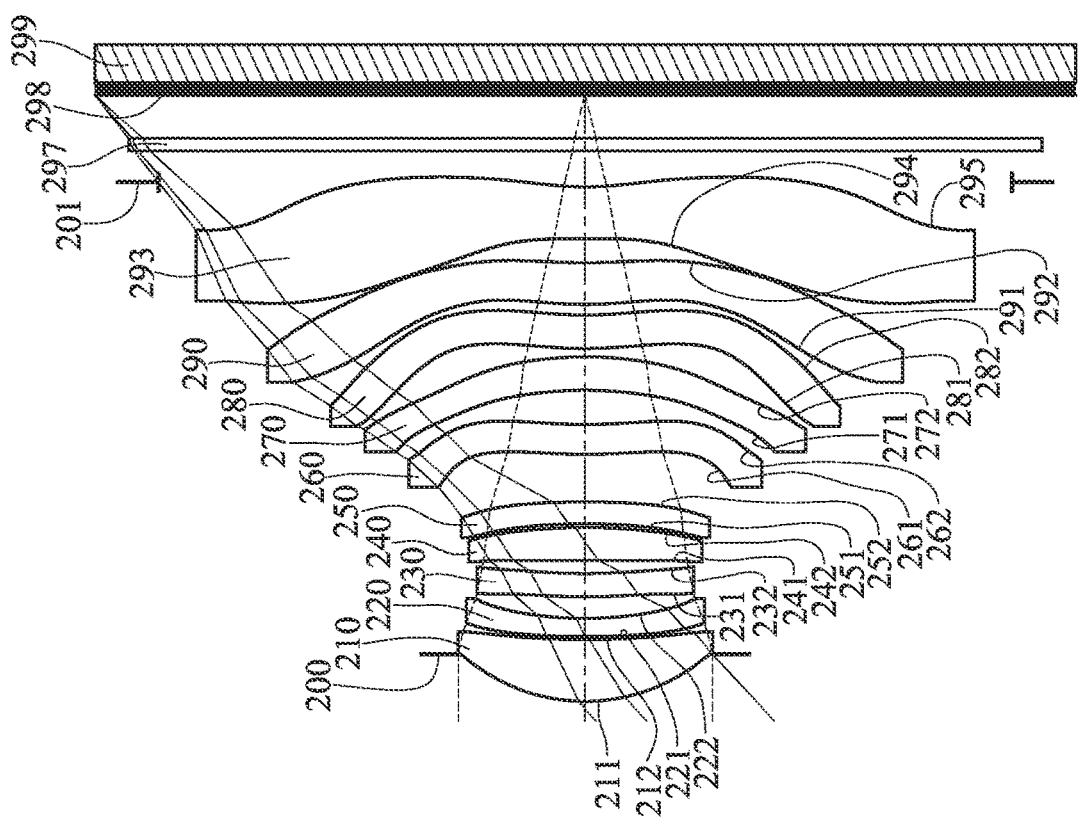
FIG. 3 is a schematic view of an image capturing unit according to the 2nd embodiment of the present disclosure.
Figure 4:
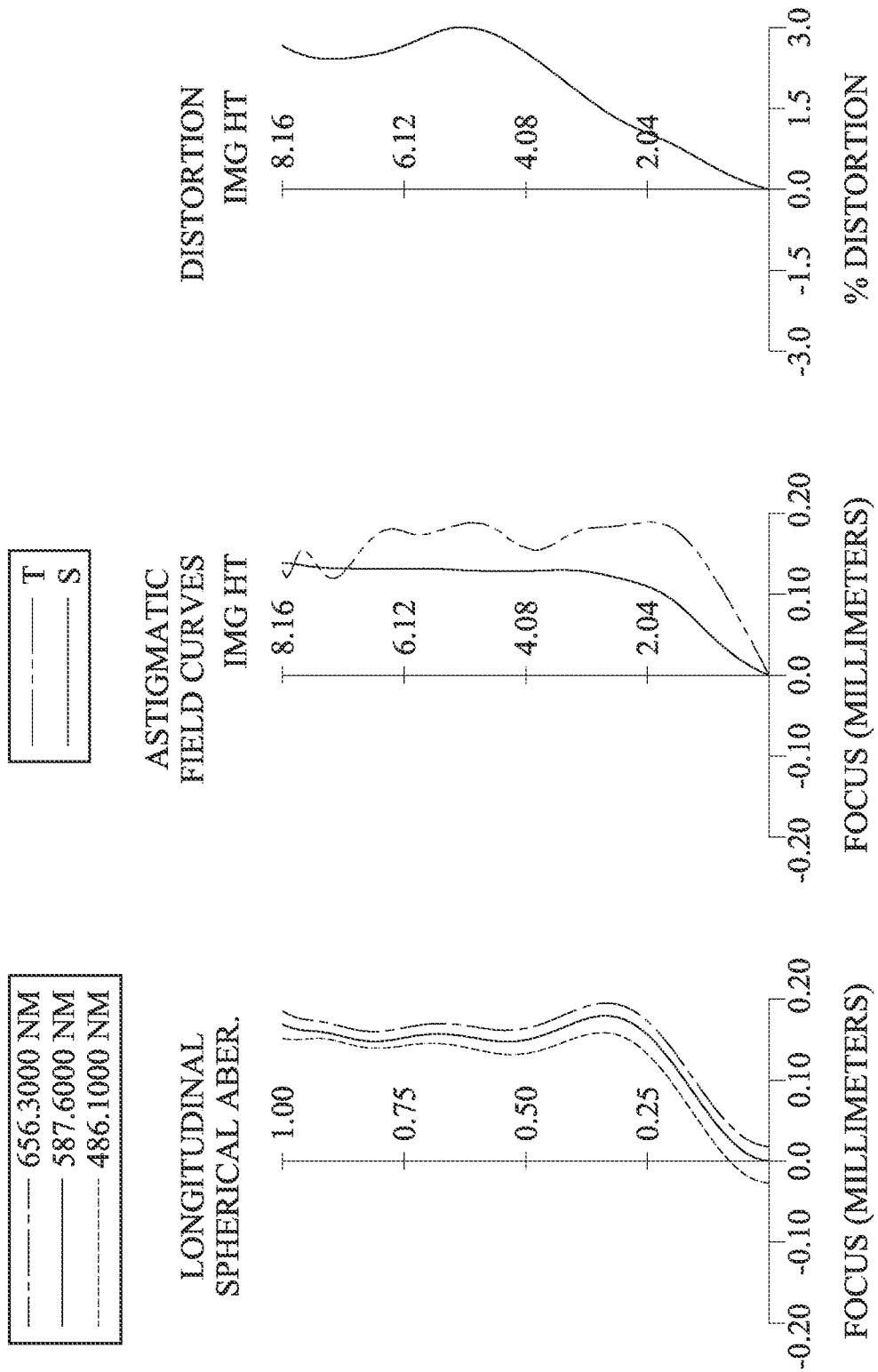
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging system (its reference numeral is omitted) of the present disclosure and an image sensor 299. The optical imaging system includes, in order from an object side to an image side along an optical path, an aperture stop 200, a first lens element 210, a second lens element 220, a third lens element 230, a fourth lens element 240, a fifth lens element 250, a sixth lens element 260, a seventh lens element 270, an eighth lens element 280, a ninth lens element 290, a tenth lens element 293, a stop 201, a filter 297 and an image surface 298. The optical imaging system includes ten lens elements (210, 220, 230, 240, 250, 260, 270, 280, 290 and 293) with no additional lens element disposed between each of the adjacent ten lens elements.

The first lens element 210 with positive refractive power has an object-side surface 211 being convex in a paraxial region thereof and an image-side surface 212 being concave in a paraxial region thereof. The first lens element 210 is made of glass material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has the object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has at least one inflection point. The image-side surface 232 of the third lens element 230 has at least one inflection point.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has at least one inflection point. The image-side surface 262 of the sixth lens element 260 has at least one inflection point.

The seventh lens element 270 with negative refractive power has an object-side surface 271 being concave in a paraxial region thereof and an image-side surface 272 being convex in a paraxial region thereof. The seventh lens element 270 is made of plastic material and has the object-side surface 271 and the image-side surface 272 being both aspheric. The object-side surface 271 of the seventh lens element 270 has at least one inflection point. The image-side surface 272 of the seventh lens element 270 has at least one inflection point.

The eighth lens element 280 with positive refractive power has an object-side surface 281 being convex in a paraxial region thereof and an image-side surface 282 being concave in a paraxial region thereof. The eighth lens element 280 is made of plastic material and has the object-side surface 281 and the image-side surface 282 being both aspheric. The object-side surface 281 of the eighth lens element 280 has at least one inflection point. The image-side surface 282 of the eighth lens element 280 has at least one inflection point. The image-side surface 282 of the eighth lens element 280 has at least one critical point in an off-axis region thereof.

The ninth lens element 290 with positive refractive power has an object-side surface 291 being convex in a paraxial region thereof and an image-side surface 292 being concave in a paraxial region thereof. The ninth lens element 290 is made of plastic material and has the object-side surface 291 and the image-side surface 292 being both aspheric. The object-side surface 291 of the ninth lens element 290 has at least one inflection point. The image-side surface 292 of the ninth lens element 290 has at least one inflection point. The image-side surface 292 of the ninth lens element 290 has at least one critical point in an off-axis region thereof.

The tenth lens element 293 with negative refractive power has an object-side surface 294 being concave in a paraxial region thereof and an image-side surface 295 being concave in a paraxial region thereof. The tenth lens element 293 is made of plastic material and has the object-side surface 294 and the image-side surface 295 being both aspheric. The object-side surface 294 of the tenth lens element 293 has at least one inflection point. The image-side surface 295 of the tenth lens element 293 has at least one inflection point. The image-side surface 295 of the tenth lens element 293 has at least one critical point in an off-axis region thereof.

The filter 297 is made of glass material and located between the stop 201 and the image surface 298, and will not affect the focal length of the optical imaging system. The image sensor 299 is disposed on or near the image surface 298 of the optical imaging system.

The detailed optical data of the 2nd embodiment are shown in Table 3 and the aspheric surface data are shown in Table 4 below.

TABLE 3

2nd Embodiment
f = 8.48 mm, Fno = 2.00, HFOV = 42.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.7901 | | | | |
| 2 | Lens 1 | 3.078 | (ASP) | 1.0324 | Glass | 1.541 | 47.2 | 7.03 |
| 3 | | 14.236 | (ASP) | 0.0500 | | | | |
| 4 | Lens 2 | 15.103 | (ASP) | 0.3000 | Plastic | 1.686 | 18.4 | −16.85 |
| 5 | | 6.496 | (ASP) | 0.3570 | | | | |
| 6 | Lens 3 | 9.767 | (ASP) | 0.3997 | Plastic | 1.686 | 18.4 | −238.91 |
| 7 | | 9.065 | (ASP) | 0.2165 | | | | |
| 8 | Lens 4 | 71.814 | (ASP) | 0.5515 | Plastic | 1.544 | 56.0 | 16.10 |
| 9 | | −9.947 | (ASP) | 0.0623 | | | | |
| 10 | Lens 5 | −10.700 | (ASP) | 0.3593 | Plastic | 1.566 | 37.4 | −50.18 |
| 11 | | −17.373 | (ASP) | 0.7958 | | | | |
| 12 | Lens 6 | 8.841 | (ASP) | 0.4965 | Plastic | 1.660 | 20.4 | −354.14 |
| 13 | | 8.328 | (ASP) | 0.5676 | | | | |

TABLE 3-continued

2nd Embodiment
f = 8.48 mm, Fno = 2.00, HFOV = 42.7 deg.

| Surface # | | Curvature Radius | | Thickness | Material | Index | Abbe # | Focal Length |
|---|---|---|---|---|---|---|---|---|
| 14 | Lens 7 | −5.592 | (ASP) | 0.5575 | Plastic | 1.544 | 56.0 | −353.00 |
| 15 | | −5.962 | (ASP) | 0.1388 | | | | |
| 16 | Lens 8 | 6.510 | (ASP) | 0.5561 | Plastic | 1.587 | 28.3 | 860.01 |
| 17 | | 6.387 | (ASP) | 0.1746 | | | | |
| 18 | Lens 9 | 6.278 | (ASP) | 0.7065 | Plastic | 1.544 | 56.0 | 29.25 |
| 19 | | 9.958 | (ASP) | 0.4023 | | | | |
| 20 | Lens 10 | −121.422 | (ASP) | 0.8567 | Plastic | 1.534 | 56.0 | −8.53 |
| 21 | | 4.746 | (ASP) | 0.0790 | | | | |
| 22 | Stop | Plano | | 0.5210 | | | | |
| 23 | Filter | Plano | | 0.2100 | Glass | 1.517 | 64.2 | — |
| 24 | | Plano | | 0.7153 | | | | |
| 25 | Image | Plano | | — | | | | |

Note:
Reference wavelength is 587.6 nm (d-line).
An effective radius of the stop 201 (Surface 22) is 7.103 mm.

TABLE 4

Aspheric Coefficients

| Surface # | 2 | 3 | 4 | 5 | 6 |
|---|---|---|---|---|---|
| k = | −6.495982E−01 | −4.875142E+01 | −2.631931E+01 | 1.987561E+00 | 3.374534E+00 |
| A4 = | 1.657652E−03 | 1.243748E−03 | 2.459795E−03 | 4.721905E−04 | −1.517264E−02 |
| A6 = | 2.177495E−03 | 2.537011E−03 | 4.593501E−03 | 2.104963E−03 | 1.346019E−03 |
| A8 = | −1.495172E−03 | −2.388039E−03 | −3.808204E−03 | −1.322888E−03 | −1.260058E−03 |
| A10 = | 6.380218E−04 | 1.091525E−03 | 1.851167E−03 | 5.364392E−04 | 6.407840E−04 |
| A12 = | −1.574042E−04 | −2.869151E−04 | −5.053642E−04 | −9.719264E−05 | −1.034870E−04 |
| A14 = | 2.099337E−05 | 3.967141E−05 | 7.509559E−05 | 6.436697E−06 | 6.253076E−06 |
| A16 = | −1.318164E−06 | −2.320946E−06 | −4.599842E−06 | 7.727564E−07 | 2.193360E−07 |

| Surface # | 7 | 8 | 9 | 10 | 11 |
|---|---|---|---|---|---|
| k = | −7.497279E+00 | 9.000000E+01 | 3.682695E+00 | −5.438946E+01 | −5.671964E+01 |
| A4 = | −9.906605E−03 | −6.148766E−03 | −9.357325E−04 | −1.706156E−02 | −9.953578E−03 |
| A6 = | −1.529634E−04 | 1.104831E−02 | −4.660839E−04 | 1.911162E−02 | 1.990977E−03 |
| A8 = | 6.992260E−04 | −1.512910E−02 | 8.198232E−03 | −1.694885E−02 | 4.029107E−04 |
| A10 = | −6.940654E−04 | 1.180351E−02 | −1.200504E−02 | 7.814703E−03 | −2.010164E−03 |
| A12 = | 4.229065E−04 | −5.732759E−03 | 7.865152E−03 | −2.079364E−03 | 1.387040E−03 |
| A14 = | −9.964307E−05 | 1.679700E−03 | −2.858789E−03 | 3.333084E−04 | −4.758008E−04 |
| A16 = | 9.055838E−06 | −2.723191E−04 | 5.984304E−04 | −2.952751E−05 | 9.186558E−05 |
| A18 = | — | 1.883231E−05 | −6.779275E−05 | 1.022264E−06 | −9.530016E−06 |
| A20 = | — | — | 3.214598E−06 | 5.659956E−09 | 4.170484E−07 |

| Surface # | 12 | 13 | 14 | 15 | 16 |
|---|---|---|---|---|---|
| k = | 1.751560E+00 | −8.060937E−01 | −1.542269E−02 | −3.119625E−01 | −1.262773E+01 |
| A4 = | −2.700543E−02 | −1.482487E−02 | 2.654391E−02 | 6.210321E−03 | −2.123221E−02 |
| A6 = | 1.867516E−02 | −3.116058E−03 | −2.019062E−02 | −4.353536E−03 | 7.101981E−03 |
| A8 = | −2.432056E−02 | 2.937014E−03 | 9.616527E−03 | 2.591747E−04 | −3.637730E−03 |
| A10 = | 2.072129E−02 | −1.492322E−03 | −3.639858E−03 | 2.423900E−04 | 1.334374E−03 |
| A12 = | −1.167090E−02 | 4.426116E−04 | 9.839325E−04 | −7.068872E−05 | −3.377192E−04 |
| A14 = | 4.383946E−03 | −7.980714E−05 | −1.741045E−04 | 9.832135E−06 | 5.640585E−05 |
| A16 = | −1.104937E−03 | 8.618759E−06 | 1.954111E−05 | −8.226379E−07 | −6.134666E−06 |
| A18 = | 1.842134E−04 | −5.177554E−07 | −1.341245E−06 | 4.213505E−08 | 4.296087E−07 |
| A20 = | −1.946340E−05 | 1.441038E−08 | 5.132170E−08 | −1.212862E−09 | −1.867992E−08 |
| A22 = | 1.179589E−06 | −9.656374E−11 | −8.366109E−10 | 1.495131E−11 | 4.589303E−10 |
| A24 = | −3.122347E−08 | — | — | — | −4.870828E−12 |

| Surface # | 17 | 18 | 19 | 20 | 21 |
|---|---|---|---|---|---|
| k = | −1.437620E+01 | −1.138786E+00 | 5.358819E−01 | −1.000000E+00 | −1.074046E+00 |
| A4 = | −1.454087E−02 | −1.756988E−02 | −1.942023E−02 | −3.936377E−02 | −3.270702E−02 |
| A6 = | −2.257980E−03 | −4.736714E−03 | 1.262437E−03 | 7.140468E−03 | 6.741920E−03 |
| A8 = | 1.578189E−03 | 1.905119E−03 | −1.496563E−04 | −2.459385E−04 | −9.849350E−04 |
| A10 = | −3.241406E−04 | −2.816723E−04 | 1.024652E−04 | −9.859393E−05 | 1.042756E−04 |
| A12 = | 1.928943E−05 | 1.854093E−05 | −2.486022E−05 | 1.900939E−05 | −8.358898E−06 |
| A14 = | 3.239681E−06 | 3.206065E−08 | 3.006725E−06 | −1.802483E−06 | 5.175413E−07 |
| A16 = | −7.276007E−07 | −9.806043E−08 | −2.112661E−07 | 1.096587E−07 | −2.463617E−08 |
| A18 = | 6.367542E−08 | 7.757773E−09 | 8.891436E−09 | −4.616558E−09 | 8.824831E−10 |
| A20 = | −2.987781E−09 | −3.107042E−10 | −2.052060E−10 | 1.380602E−10 | −2.306910E−11 |

TABLE 4-continued

Aspheric Coefficients

| A22 = | 7.414789E−11 | 7.089472E−12 | 1.287980E−12 | −2.935639E−12 | 4.229658E−13 |
|---|---|---|---|---|---|
| A24 = | −7.668794E−13 | −8.730355E−14 | 5.468951E−14 | 4.347437E−14 | −5.124868E−15 |
| A26 = | — | 4.478799E−16 | −1.379253E−15 | −4.266821E−16 | 3.674733E−17 |
| A28 = | — | — | 1.016180E−17 | 2.495973E−18 | −1.179436E−19 |
| A30 = | — | — | — | −6.591084E−21 | 3.168185E−25 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 8.48 | CTmax/CTmin | 3.44 |
| Fno | 2.00 | |R13/CT5| | 15.56 |
| HFOV [deg.] | 42.7 | f/R16 | 1.33 |
| V6 | 20.4 | f/R20 | 1.79 |
| (V2 + V3)/V1 | 0.8 | (R18 + R19)/(R18 − R19) | −0.85 |
| V5 + V6 | 57.8 | f/f1 | 1.21 |
| Vmin | 18.4 | f/f2 | −0.50 |
| V1/N1 | 30.64 | f/f8 | 0.01 |
| V2/N2 | 10.90 | f/f9 | 0.29 |
| V3/N3 | 10.90 | f10/f9 | −0.29 |
| V4/N4 | 36.26 | |f/f3| + |f/f5| + |f/f6| + |f/f7| + |f/f8| | 0.26 |
| V5/N5 | 23.91 | Y102/Y32 | 3.62 |
| V6/N6 | 12.29 | TL [mm] | 10.11 |
| V7/N7 | 36.26 | TL/f | 1.19 |
| V8/N8 | 17.83 | TL/ImgH | 1.24 |
| V9/N9 | 36.26 | ImgH/BL | 5.35 |
| V10/N10 | 36.48 | EPD/BL | 2.78 |
| (Vi/Ni)min | 10.90 | BL/TD | 0.18 |
| Nmax | 1.686 | SD/TD | 0.91 |
| CT4/CT3 | 1.380 | f/EPD | 2.00 |
| T910/CT1 | 0.39 | ImgH [mm] | 8.16 |
| ΣCT/TD | 0.68 | — | — |

3rd Embodiment

Figure 5:
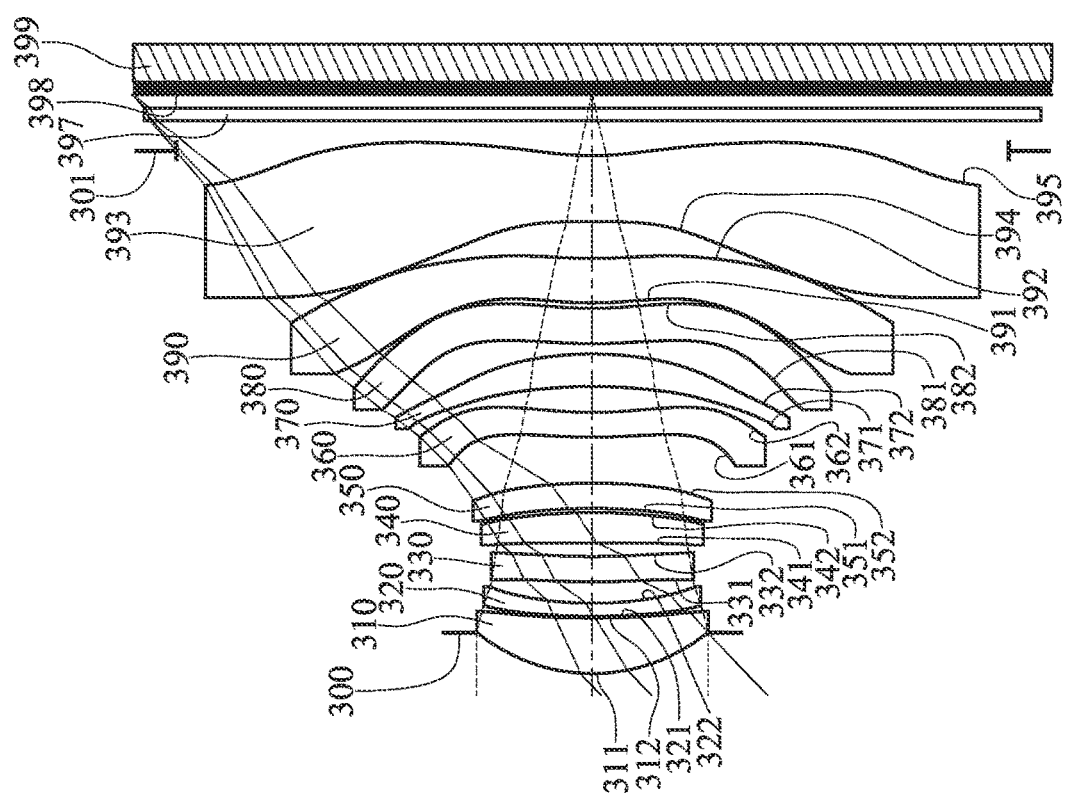
FIG. 5 is a schematic view of an image capturing unit according to the 3rd embodiment of the present disclosure.
Figure 6:
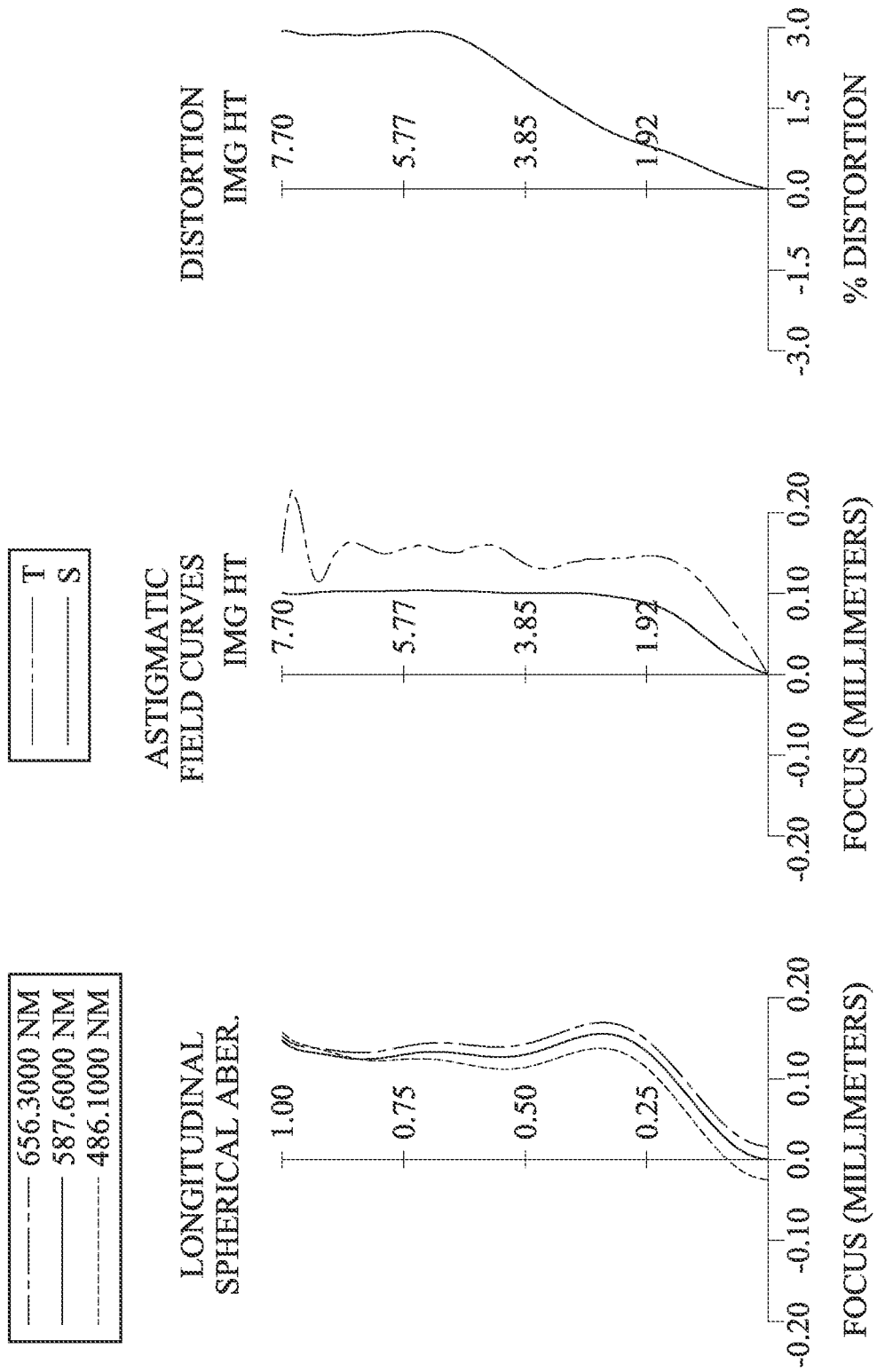
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging system (its reference numeral is omitted) of the present disclosure and an image sensor 399. The optical imaging system includes, in order from an object side to an image side along an optical path, an aperture stop 300, a first lens element 310, a second lens element 320, a third lens element 330, a fourth lens element 340, a fifth lens element 350, a sixth lens element 360, a seventh lens element 370, an eighth lens element 380, a ninth lens element 390, a tenth lens element 393, a stop 301, a filter 397 and an image surface 398. The optical imaging system includes ten lens elements (310, 320, 330, 340, 350, 360, 370, 380, 390 and 393) with no additional lens element disposed between each of the adjacent ten lens elements.

The first lens element 310 with positive refractive power has an object-side surface 311 being convex in a paraxial region thereof and an image-side surface 312 being concave in a paraxial region thereof. The first lens element 310 is made of glass material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has at least one inflection point. The image-side surface 332 of the third lens element 330 has at least one inflection point.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has at least one inflection point. The image-side surface 362 of the sixth lens element 360 has at least one inflection point.

The seventh lens element 370 with positive refractive power has an object-side surface 371 being concave in a paraxial region thereof and an image-side surface 372 being convex in a paraxial region thereof. The seventh lens element 370 is made of plastic material and has the object-side surface 371 and the image-side surface 372 being both aspheric. The object-side surface 371 of the seventh lens element 370 has at least one inflection point. The image-side surface 372 of the seventh lens element 370 has at least one inflection point.

The eighth lens element 380 with negative refractive power has an object-side surface 381 being convex in a paraxial region thereof and an image-side surface 382 being concave in a paraxial region thereof. The eighth lens element 380 is made of plastic material and has the object-side surface 381 and the image-side surface 382 being both aspheric. The object-side surface 381 of the eighth lens element 380 has at least one inflection point. The image-side surface 382 of the eighth lens element 380 has at least one inflection point. The image-side surface 382 of the eighth lens element 380 has at least one critical point in an off-axis region thereof.

The ninth lens element 390 with positive refractive power has an object-side surface 391 being convex in a paraxial region thereof and an image-side surface 392 being concave in a paraxial region thereof. The ninth lens element 390 is made of plastic material and has the object-side surface 391 and the image-side surface 392 being both aspheric. The object-side surface 391 of the ninth lens element 390 has at least one inflection point. The image-side surface 392 of the ninth lens element 390 has at least one inflection point. The image-side surface 392 of the ninth lens element 390 has at least one critical point in an off-axis region thereof.

The tenth lens element 393 with negative refractive power has an object-side surface 394 being concave in a paraxial region thereof and an image-side surface 395 being concave in a paraxial region thereof. The tenth lens element 393 is made of plastic material and has the object-side surface 394 and the image-side surface 395 being both aspheric. The object-side surface 394 of the tenth lens element 393 has at least one inflection point The image-side surface 395 of the tenth lens element 393 has at least one inflection point. The image-side surface 395 of the tenth lens element 393 has at least one critical point in an off-axis region thereof.

The filter 397 is made of glass material and located between the stop 301 and the image surface 398, and will not affect the focal length of the optical imaging system. The image sensor 399 is disposed on or near the image surface 398 of the optical imaging system.

The detailed optical data of the 3rd embodiment are shown in Table 5 and the aspheric surface data are shown in Table 6 below.

TABLE 5

3rd Embodiment
f = 7.77 mm, Fno = 2.00, HFOV = 43.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.6800 | | | | |
| 2 | Lens 1 | 3.074 | (ASP) | 0.9308 | Glass | 1.541 | 47.2 | 6.94 |
| 3 | | 15.155 | (ASP) | 0.0300 | | | | |
| 4 | Lens 2 | 14.092 | (ASP) | 0.2155 | Plastic | 1.686 | 18.4 | −16.90 |
| 5 | | 6.322 | (ASP) | 0.3600 | | | | |
| 6 | Lens 3 | 10.798 | (ASP) | 0.4213 | Plastic | 1.686 | 18.4 | 466.94 |
| 7 | | 10.997 | (ASP) | 0.2313 | | | | |
| 8 | Lens 4 | −224.305 | (ASP) | 0.5063 | Plastic | 1.544 | 56.0 | 20.51 |
| 9 | | −10.638 | (ASP) | 0.0708 | | | | |
| 10 | Lens 5 | −10.423 | (ASP) | 0.4256 | Plastic | 1.566 | 37.4 | 259.36 |
| 11 | | −9.876 | (ASP) | 0.7700 | | | | |
| 12 | Lens 6 | 8.722 | (ASP) | 0.4245 | Plastic | 1.660 | 20.4 | −57.63 |
| 13 | | 6.958 | (ASP) | 0.4387 | | | | |
| 14 | Lens 7 | −6.955 | (ASP) | 0.5425 | Plastic | 1.544 | 56.0 | 45.46 |
| 15 | | −5.578 | (ASP) | 0.1724 | | | | |
| 16 | Lens 8 | 7.928 | (ASP) | 0.5915 | Plastic | 1.587 | 28.3 | −60.72 |
| 17 | | 6.307 | (ASP) | 0.0917 | | | | |
| 18 | Lens 9 | 6.098 | (ASP) | 0.7433 | Plastic | 1.544 | 56.0 | 39.46 |
| 19 | | 8.151 | (ASP) | 0.6190 | | | | |
| 20 | Lens 10 | −32.388 | (ASP) | 1.1059 | Plastic | 1.534 | 56.0 | −7.80 |
| 21 | | 4.837 | (ASP) | 0.0790 | | | | |
| 22 | Stop | Plano | | 0.5210 | | | | |
| 23 | Filter | Plano | | 0.2100 | Glass | 1.517 | 64.2 | — |
| 24 | | Plano | | 0.2187 | | | | |
| 25 | Image | Plano | | — | | | | |

Note:
Reference wavelength is 587.6 nm (d-line).
An effective radius of the stop 301 (Surface 22) is 6.983 mm.

TABLE 6

Aspheric Coefficients

| Surface # | 2 | 3 | 4 | 5 | 6 |
|---|---|---|---|---|---|
| k = | −6.249593E−01 | −5.479740E+01 | −2.536946E+01 | 1.499215E+00 | 2.407796E+00 |
| A4 = | 1.288589E−03 | −3.557917E−03 | −2.272792E−03 | 2.032382E−04 | −1.470671E−02 |
| A6 = | 3.491179E−03 | 1.463462E−02 | 1.748390E−02 | 3.643167E−03 | 1.461158E−03 |
| A8 = | −2.991572E−03 | −1.357452E−02 | −1.631512E−02 | −2.790690E−03 | −2.197716E−03 |
| A10 = | 1.582798E−03 | 6.367566E−03 | 8.037865E−03 | 1.021682E−03 | 1.274467E−03 |
| A12 = | −4.788577E−04 | −1.671258E−03 | −2.210325E−03 | −1.049151E−04 | −2.798877E−04 |
| A14 = | 7.722371E−05 | 2.334137E−04 | 3.265041E−04 | −2.015653E−05 | 2.550869E−05 |
| A16 = | −5.355678E−06 | −1.372672E−05 | −2.017440E−05 | 4.725749E−06 | 6.651027E−08 |

TABLE 6-continued

Aspheric Coefficients

| Surface # | 7 | 8 | 9 | 10 | 11 |
|---|---|---|---|---|---|
| k = | −8.189170E+00 | −9.900000E+01 | 5.842629E+00 | −6.186962E+01 | −4.914059E+01 |
| A4 = | −9.919358E−03 | −7.401831E−03 | −8.061695E−03 | −1.907141E−02 | −8.898510E−03 |
| A6 = | 1.211825E−03 | 1.301288E−02 | 6.509769E−03 | 2.222677E−02 | −4.691129E−04 |
| A8 = | −1.886633E−03 | −1.539672E−02 | 7.022050E−03 | −1.785805E−02 | 3.564433E−03 |
| A10 = | 1.091209E−03 | 1.056831E−02 | −1.490489E−02 | 7.702643E−03 | −4.674705E−03 |
| A12 = | −1.655968E−04 | −4.616848E−03 | 1.059546E−02 | −2.146533E−03 | 2.779957E−03 |
| A14 = | −6.756522E−06 | 1.274732E−03 | −4.029238E−03 | 4.638254E−04 | −9.356114E−04 |
| A16 = | 3.568317E−06 | −2.058749E−04 | 8.825147E−04 | −7.572072E−05 | 1.848731E−04 |
| A18 = | — | 1.482265E−05 | −1.061640E−04 | 7.290680E−06 | −1.995450E−05 |
| A20 = | — | — | 5.466478E−06 | −2.741444E−07 | 9.103037E−07 |

| Surface # | 12 | 13 | 14 | 15 | 16 |
|---|---|---|---|---|---|
| k = | 1.747726E+00 | −5.558994E−01 | −4.349758E−01 | −3.623550E−01 | −1.233726E+01 |
| A4 = | −2.542826E−02 | −1.386895E−02 | 2.549970E−02 | 3.395230E−03 | −2.686956E−02 |
| A6 = | 1.716905E−02 | −2.840729E−03 | −1.908957E−02 | −1.738994E−03 | 1.344673E−02 |
| A8 = | −2.284987E−02 | 2.725814E−03 | 9.384883E−03 | −6.137856E−04 | −7.473697E−03 |
| A10 = | 1.982839E−02 | −1.315324E−03 | −3.573230E−03 | 3.566168E−04 | 2.814632E−03 |
| A12 = | −1.141403E−02 | 3.603510E−04 | 9.548480E−04 | −7.323791E−05 | −7.076445E−04 |
| A14 = | 4.382967E−03 | −5.967444E−05 | −1.671169E−04 | 9.234034E−06 | 1.174640E−04 |
| A16 = | −1.128875E−03 | 5.942945E−06 | 1.862575E−05 | −7.999269E−07 | −1.284542E−05 |
| A18 = | 1.921936E−04 | −3.328212E−07 | −1.273862E−06 | 4.523240E−08 | 9.148420E−07 |
| A20 = | −2.070501E−05 | 8.923263E−09 | 4.874127E−08 | −1.437884E−09 | −4.082424E−08 |
| A22 = | 1.276028E−06 | −7.142425E−11 | −7.984826E−10 | 1.868196E−11 | 1.036954E−09 |
| A24 = | −3.421722E−08 | — | — | — | −1.145315E−11 |

| Surface # | 17 | 18 | 19 | 20 | 21 |
|---|---|---|---|---|---|
| k = | −1.450961E+01 | −1.093199E+00 | 1.347910E−01 | −3.370399E+01 | −1.099437E+00 |
| A4 = | −1.639917E−02 | −2.158962E−02 | −2.480285E−02 | −3.430294E−02 | −2.654643E−02 |
| A6 = | 2.591595E−03 | −2.583902E−03 | 2.399066E−03 | 4.956617E−03 | 4.868177E−03 |
| A8 = | −2.240172E−03 | 8.888956E−04 | 1.009409E−04 | 2.137149E−04 | −6.400313E−04 |
| A10 = | 1.124876E−03 | 1.624636E−05 | −4.215973E−05 | −1.591913E−04 | 6.246251E−05 |
| A12 = | −3.056721E−04 | −3.584444E−05 | 3.854811E−06 | 2.421052E−05 | −4.744754E−06 |
| A14 = | 4.983767E−05 | 6.445187E−06 | −2.728615E−07 | −2.067445E−06 | 2.834286E−07 |
| A16 = | −5.122873E−06 | −5.959864E−07 | 2.976354E−08 | 1.138488E−07 | −1.307518E−08 |
| A18 = | 3.353032E−07 | 3.316408E−08 | −2.950590E−09 | −4.184884E−09 | 4.524637E−10 |
| A20 = | −1.357273E−08 | −1.138396E−09 | 1.850198E−10 | 1.008549E−10 | −1.137688E−11 |
| A22 = | 3.099611E−10 | 2.307919E−11 | −7.104349E−12 | −1.444533E−12 | 2.000760E−13 |
| A24 = | −3.054849E−12 | −2.405546E−13 | 1.644166E−13 | 7.451961E−15 | −2.322551E−15 |
| A26 = | — | 8.489718E−16 | −2.119515E−15 | 1.089610E−16 | 1.595046E−17 |
| A28 = | — | — | 1.174146E−17 | −2.042882E−18 | −4.901886E−20 |
| A30 = | — | — | — | 1.025503E−20 | 7.030999E−26 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 7.77 | CTmax/CTmin | 5.13 |
| Fno | 2.00 | |R13/CT5| | 16.34 |
| HFOV [deg.] | 43.4 | f/R16 | 1.23 |
| V6 | 20.4 | f/R20 | 1.61 |
| (V2 + V3)/V1 | 0.8 | (R18 + R19)/(R18 − R19) | −0.60 |
| V5 + V6 | 57.8 | f/f1 | 1.12 |
| Vmin | 18.4 | f/f2 | −0.46 |
| V1/N1 | 30.64 | f/f8 | −0.13 |
| V2/N2 | 10.90 | f/f9 | 0.20 |
| V3/N3 | 10.90 | f10/f9 | −0.20 |
| V4/N4 | 36.26 | |f/f3| + |f/f5| + |f/f6| + |f/f7| + |f/f8| | 0.48 |
| V5/N5 | 23.91 | Y102/Y32 | 3.82 |
| V6/N6 | 12.29 | TL [mm] | 9.72 |
| V7/N7 | 36.26 | TL/f | 1.25 |
| V8/N8 | 17.83 | TL/ImgH | 1.26 |
| V9/N9 | 36.26 | ImgH/BL | 7.49 |
| V10/N10 | 36.48 | EPD/BL | 3.78 |
| (Vi/Ni)min | 10.90 | BL/TD | 0.12 |
| Nmax | 1.686 | SD/TD | 0.92 |
| CT4/CT3 | 1.202 | f/EPD | 2.00 |
| T910/CT1 | 0.67 | ImgH [mm] | 7.70 |
| ΣCT/TD | 0.68 | — | |

4th Embodiment

Figure 7:
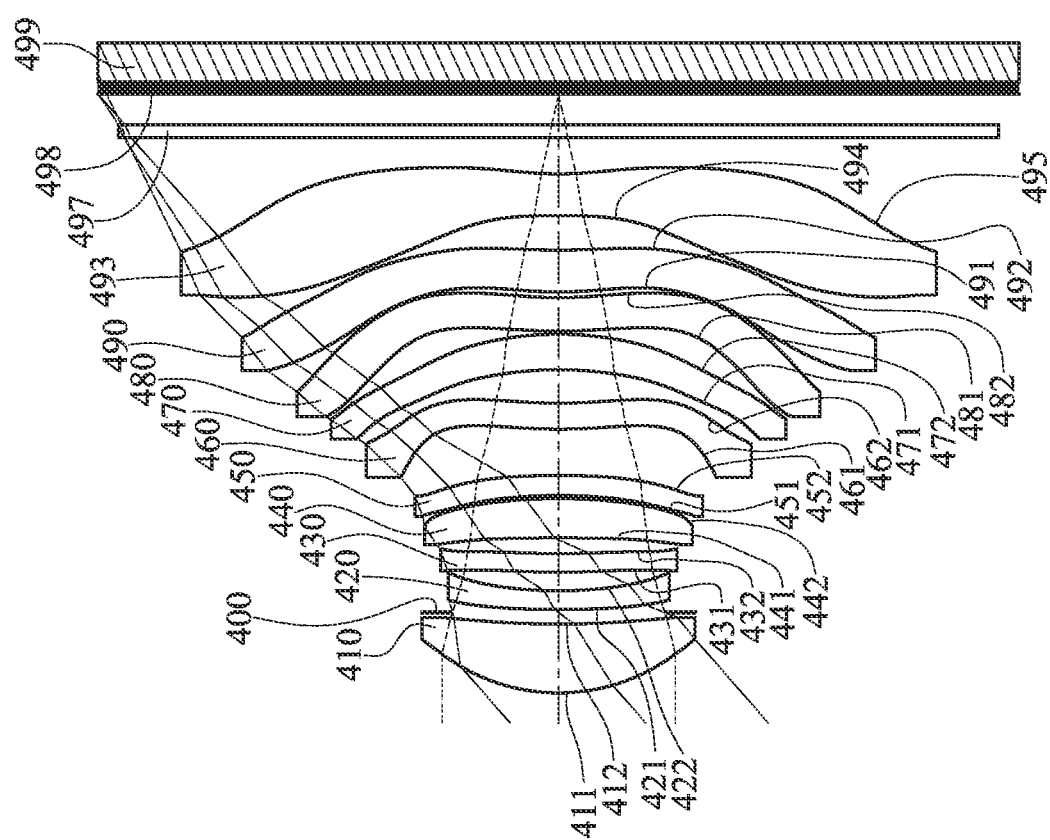
FIG. 7 is a schematic view of an image capturing unit according to the 4th embodiment of the present disclosure.
Figure 8:
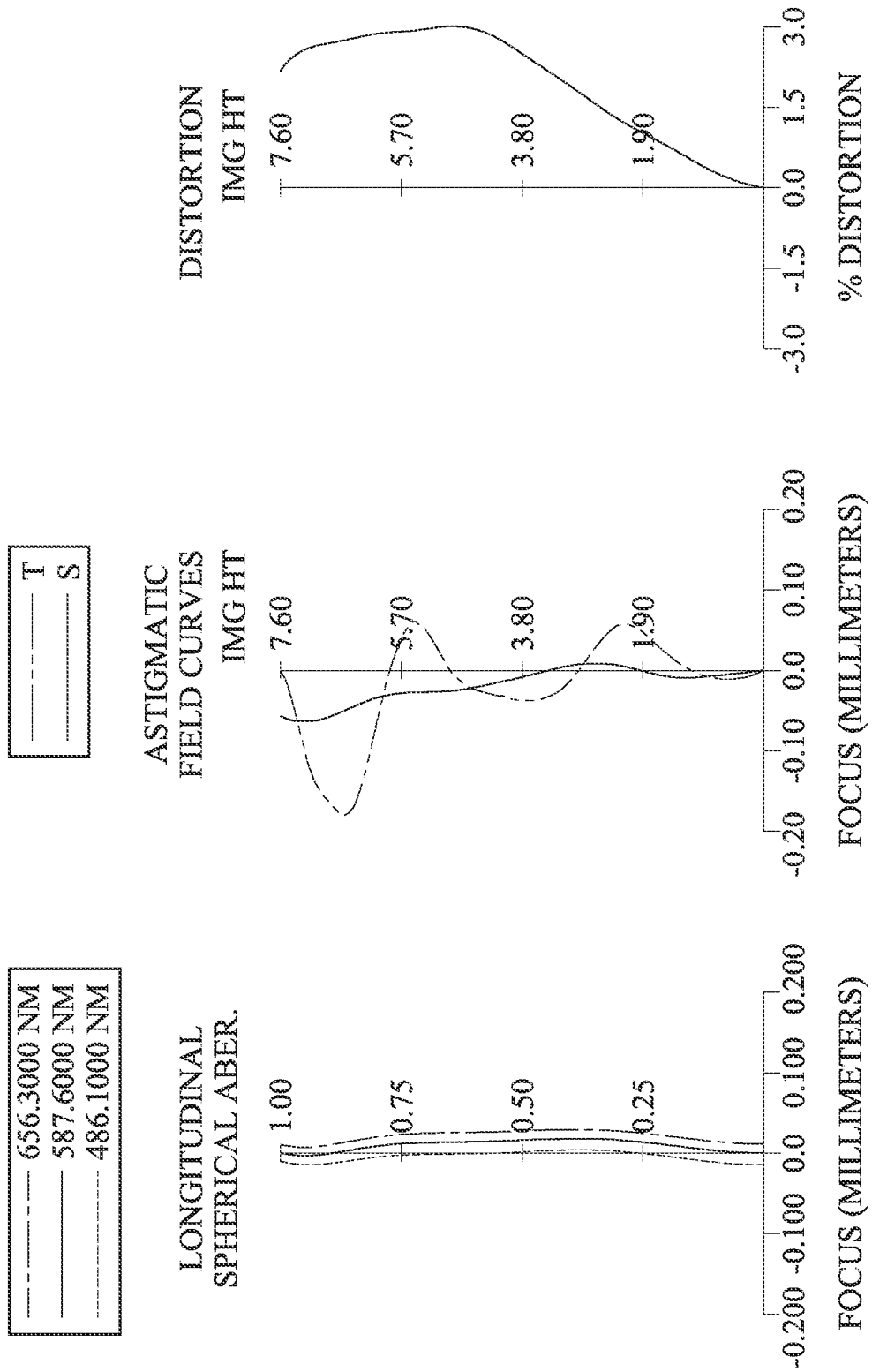
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging system (its reference numeral is omitted) of the present disclosure and an image sensor 499. The optical imaging system includes, in order from an object side to an image side along an optical path, a first lens element 410, an aperture stop 400, a second lens element 420, a third lens element 430, a fourth lens element 440, a fifth lens element 450, a sixth lens element 460, a seventh lens element 470, an eighth lens element 480, a ninth lens element 490, a tenth lens element 493, a filter 497 and an image surface 498. The optical imaging system includes ten lens elements (410, 420, 430, 440, 450, 460, 470, 480, 490 and 493) with no additional lens element disposed between each of the adjacent ten lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The image-side surface 412 of the first lens element 410 has at least one inflection point.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has at least one inflection point. The image-side surface 432 of the third lens element 430 has at least one inflection point.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The object-side surface 461 of the sixth lens element 460 has at least one inflection point. The image-side surface 462 of the sixth lens element 460 has at least one inflection point.

The seventh lens element 470 with positive refractive power has an object-side surface 471 being concave in a paraxial region thereof and an image-side surface 472 being convex in a paraxial region thereof. The seventh lens element 470 is made of plastic material and has the object-side surface 471 and the image-side surface 472 being both aspheric. The object-side surface 471 of the seventh lens element 470 has at least one inflection point. The image-side surface 472 of the seventh lens element 470 has at least one inflection point.

The eighth lens element 480 with negative refractive power has an object-side surface 481 being convex in a paraxial region thereof and an image-side surface 482 being concave in a paraxial region thereof. The eighth lens element 480 is made of plastic material and has the object-side surface 481 and the image-side surface 482 being both aspheric. The object-side surface 481 of the eighth lens element 480 has at least one inflection point. The image-side surface 482 of the eighth lens element 480 has at least one inflection point. The image-side surface 482 of the eighth lens element 480 has at least one critical point in an off-axis region thereof.

The ninth lens element 490 with positive refractive power has an object-side surface 491 being convex in a paraxial region thereof and an image-side surface 492 being concave in a paraxial region thereof. The ninth lens element 490 is made of plastic material and has the object-side surface 491 and the image-side surface 492 being both aspheric. The object-side surface 491 of the ninth lens element 490 has at least one inflection point. The image-side surface 492 of the ninth lens element 490 has at least one inflection point. The image-side surface 492 of the ninth lens element 490 has at least one critical point in an off-axis region thereof.

The tenth lens element 493 with negative refractive power has an object-side surface 494 being concave in a paraxial region thereof and an image-side surface 495 being concave in a paraxial region thereof. The tenth lens element 493 is made of plastic material and has the object-side surface 494 and the image-side surface 495 being both aspheric. The object-side surface 494 of the tenth lens element 493 has at least one inflection point. The image-side surface 495 of the tenth lens element 493 has at least one inflection point. The image-side surface 495 of the tenth lens element 493 has at least one critical point in an off-axis region thereof.

The filter 497 is made of glass material and located between the tenth lens element 493 and the image surface 498, and will not affect the focal length of the optical imaging system. The image sensor 499 is disposed on or near the image surface 498 of the optical imaging system.

The detailed optical data of the 4th embodiment are shown in Table 7 and the aspheric surface data are shown in Table 8 below.

TABLE 7

4th Embodiment
f = 8.49 mm, Fno = 2.20, HFOV = 41.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.208 (ASP) | 1.1383 | Plastic | 1.545 | 56.1 | 7.13 |
| 2 | | 16.117 (ASP) | 0.1889 | | | | |
| 3 | Ape. Stop | Plano | 0.0500 | | | | |
| 4 | Lens 2 | 16.100 (ASP) | 0.3100 | Plastic | 1.686 | 18.4 | −18.02 |
| 5 | | 6.938 (ASP) | 0.3064 | | | | |
| 6 | Lens 3 | 10.871 (ASP) | 0.3100 | Plastic | 1.634 | 23.8 | 65.27 |

TABLE 7-continued

4th Embodiment
f = 8.49 mm, Fno = 2.20, HFOV = 41.2 deg.

| Surface # | | Curvature Radius | Thickness | Material | Index | Abbe # | Focal Length |
|---|---|---|---|---|---|---|---|
| 7 | | 14.580 (ASP) | 0.2601 | | | | |
| 8 | Lens 4 | −35.279 (ASP) | 0.6488 | Plastic | 1.544 | 56.0 | 21.48 |
| 9 | | −8.835 (ASP) | 0.0502 | | | | |
| 10 | Lens 5 | −8.947 (ASP) | 0.3320 | Plastic | 1.660 | 20.4 | −40.27 |
| 11 | | −13.686 (ASP) | 0.7661 | | | | |
| 12 | Lens 6 | 8.012 (ASP) | 0.4297 | Plastic | 1.639 | 23.5 | 919.37 |
| 13 | | 7.953 (ASP) | 0.5542 | | | | |
| 14 | Lens 7 | −5.432 (ASP) | 0.5862 | Plastic | 1.544 | 56.0 | 214.62 |
| 15 | | −5.388 (ASP) | 0.0503 | | | | |
| 16 | Lens 8 | 7.601 (ASP) | 0.5544 | Plastic | 1.587 | 28.3 | −88.91 |
| 17 | | 6.456 (ASP) | 0.0937 | | | | |
| 18 | Lens 9 | 6.417 (ASP) | 0.6915 | Plastic | 1.544 | 56.0 | 27.28 |
| 19 | | 10.875 (ASP) | 0.5697 | | | | |
| 20 | Lens 10 | −23.585 (ASP) | 0.6915 | Plastic | 1.534 | 56.0 | −8.14 |
| 21 | | 5.383 (ASP) | 0.6000 | | | | |
| 22 | Filter | Plano | 0.2100 | Glass | 1.517 | 64.2 | — |
| 23 | | Plano | 0.5049 | | | | |
| 24 | Image | Plano | — | | | | |

Note:
Reference wavelength is 587.6 nm (d-line).

TABLE 8

Aspheric Coefficients

| Surface # | 1 | 2 | 4 | 5 | 6 |
|---|---|---|---|---|---|
| k = | −6.779721E−01 | −5.878066E+01 | −2.896894E+01 | 2.213595E+00 | 3.581431E+00 |
| A4 = | 2.623958E−03 | 5.793235E−04 | 2.294447E−03 | 9.572303E−04 | −1.430721E−02 |
| A6 = | 2.759199E−04 | 2.447136E−03 | 2.764007E−03 | −7.942734E−05 | −1.690843E−04 |
| A8 = | −6.264313E−05 | −1.746472E−03 | −1.263410E−03 | 1.221167E−03 | −4.290486E−05 |
| A10 = | 2.878554E−05 | 5.507025E−04 | 2.533876E−04 | −8.543323E−04 | −2.689200E−05 |
| A12 = | −9.020403E−06 | −9.584291E−05 | 6.700934E−06 | 3.055232E−04 | 1.055400E−04 |
| A14 = | 1.584844E−06 | 8.116488E−06 | −7.349656E−06 | −4.935765E−05 | −2.442422E−05 |
| A16 = | −1.881718E−07 | −2.728168E−07 | 7.295333E−07 | 3.401619E−06 | 1.239360E−06 |

| Surface # | 7 | 8 | 9 | 10 | 11 |
|---|---|---|---|---|---|
| k = | −1.079895E+01 | −1.146821E+01 | 1.971096E+00 | −4.689336E+01 | −5.028410E+01 |
| A4 = | −9.296561E−03 | 7.842506E−04 | 8.289540E−03 | −1.005331E−02 | −1.009181E−02 |
| A6 = | −1.136942E−03 | −5.742158E−03 | −8.423147E−03 | 1.014939E−02 | 5.234507E−03 |
| A8 = | 8.047344E−04 | 5.815002E−03 | 2.188869E−03 | −2.062165E−02 | −9.990927E−03 |
| A10 = | −3.380720E−04 | −4.305090E−03 | 1.351290E−03 | 1.881739E−02 | 8.722866E−03 |
| A12 = | 1.779022E−04 | 1.934274E−03 | −1.615740E−03 | −9.573397E−03 | −4.245864E−03 |
| A14 = | −2.715116E−05 | −5.142524E−04 | 7.148568E−04 | 2.914266E−03 | 1.238460E−03 |
| A16 = | 5.802324E−07 | 7.695818E−05 | −1.675058E−04 | −5.264598E−04 | −2.160311E−04 |
| A18 = | — | −5.032493E−06 | 2.090862E−05 | 5.222205E−05 | 2.083901E−05 |
| A20 = | — | — | −1.122536E−06 | −2.203701E−06 | −8.529750E−07 |

| Surface # | 12 | 13 | 14 | 15 | 16 |
|---|---|---|---|---|---|
| k = | 5.389896E−01 | 2.588246E−01 | −3.942436E−01 | −5.279704E−01 | −1.285195E+01 |
| A4 = | −1.598570E−02 | −1.920918E−02 | 1.569150E−02 | −1.714119E−03 | −2.676496E−02 |
| A6 = | −4.947140E−03 | 3.592847E−03 | −7.647840E−03 | 6.152332E−03 | 1.141719E−02 |
| A8 = | 7.045137E−03 | −2.389764E−03 | 2.081588E−03 | −5.076178E−03 | −5.020691E−03 |
| A10 = | −5.508590E−03 | 8.561355E−04 | −1.056053E−03 | 1.677957E−03 | 1.539180E−03 |
| A12 = | 2.606395E−03 | −1.765464E−04 | 4.381450E−04 | −2.989513E−04 | −3.512279E−04 |
| A14 = | −7.868292E−04 | 1.916002E−05 | −1.003562E−04 | 3.195549E−05 | 5.659897E−05 |
| A16 = | 1.503101E−04 | −6.964539E−07 | 1.317832E−05 | −2.100414E−06 | −6.131926E−06 |
| A18 = | −1.755833E−05 | −4.714053E−08 | −1.006185E−06 | 8.199960E−08 | 4.323981E−07 |
| A20 = | 1.140244E−06 | 4.856405E−09 | 4.176077E−08 | −1.695710E−09 | −1.896209E−08 |
| A22 = | −3.131849E−08 | −1.154689E−10 | −7.298754E−10 | 1.345387E−11 | 4.688855E−10 |
| A24 = | 3.856000E−12 | — | — | — | −4.991418E−12 |

| Surface # | 17 | 18 | 19 | 20 | 21 |
|---|---|---|---|---|---|
| k = | −1.523915E+01 | −1.149818E+00 | 7.496358E−01 | −1.404650E+00 | −1.071783E+00 |
| A4 = | −1.437002E−02 | −1.695169E−02 | −1.802704E−02 | −4.113995E−02 | −3.230136E−02 |
| A6 = | −3.175083E−03 | −5.585078E−03 | 9.511436E−04 | 8.231030E−03 | 6.246983E−03 |
| A8 = | 2.670253E−03 | 2.330344E−03 | −1.601036E−04 | −6.356859E−04 | −7.832056E−04 |
| A10 = | −8.008646E−04 | −3.821879E−04 | 1.224856E−04 | −8.114019E−06 | 6.215481E−05 |
| A12 = | 1.328824E−04 | 3.249732E−05 | −3.018351E−05 | 5.521329E−06 | −2.971735E−06 |

TABLE 8-continued

| Aspheric Coefficients | | | | | |
|---|---|---|---|---|---|
| A14 = | −1.351282E−05 | −1.229562E−06 | 3.822325E−06 | −4.639675E−07 | 6.229941E−08 |
| A16 = | 8.706584E−07 | −2.045495E−08 | −2.942774E−07 | 1.804095E−08 | 1.695028E−09 |
| A18 = | −3.521850E−08 | 4.490079E−09 | 1.470048E−08 | −1.882029E−10 | −1.756386E−10 |
| A20 = | 8.440314E−10 | −2.190726E−10 | −4.847056E−10 | −1.464776E−11 | 6.443397E−12 |
| A22 = | −1.030657E−11 | 5.492553E−12 | 1.034208E−11 | 8.066000E−13 | −1.374812E−13 |
| A24 = | 4.078611E−14 | −7.239406E−14 | −1.335557E−13 | −2.030647E−14 | 1.788553E−15 |
| A26 = | — | 3.975615E−16 | 8.871275E−16 | 2.932003E−16 | −1.320566E−17 |
| A28 = | — | — | −1.847599E−18 | −2.348400E−18 | 4.250941E−20 |
| A30 = | — | — | — | 8.142848E−21 | 4.164299E−25 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 8.49 | CTmax/CTmin | 3.67 |
| Fno | 2.20 | |R13/CT5| | 16.36 |
| HFOV [deg.] | 41.2 | f/R16 | 1.31 |
| V6 | 23.5 | f/R20 | 1.58 |
| (V2 + V3)/V1 | 0.8 | (R18 + R19)/(R18 − R19) | −0.37 |
| V5 + V6 | 43.9 | f/f1 | 1.19 |
| Vmin | 18.4 | f/f2 | −0.47 |
| V1/N1 | 36.30 | f/f8 | −0.10 |
| V2/N2 | 10.90 | f/f9 | 0.31 |
| V3/N3 | 14.59 | f10/f9 | −0.30 |
| V4/N4 | 36.26 | |f/f3| + |f/f5| + |f/f6| + |f/f7| + |f/f8| | 0.48 |
| V5/N5 | 12.29 | Y102/Y32 | 3.19 |
| V6/N6 | 14.34 | TL [mm] | 9.90 |
| V7/N7 | 36.26 | TL/f | 1.17 |
| V8/N8 | 17.83 | TL/ImgH | 1.30 |
| V9/N9 | 36.26 | ImgH/BL | 5.78 |
| V10/N10 | 36.48 | EPD/BL | 2.93 |
| (Vi/Ni)min | 10.90 | BL/TD | 0.15 |
| Nmax | 1.686 | SD/TD | 0.85 |
| CT4/CT3 | 2.093 | f/EPD | 2.20 |
| T910/CT1 | 0.50 | ImgH [mm] | 7.60 |
| ΣCT/TD | 0.66 | — | — |

5th Embodiment

Figure 9:
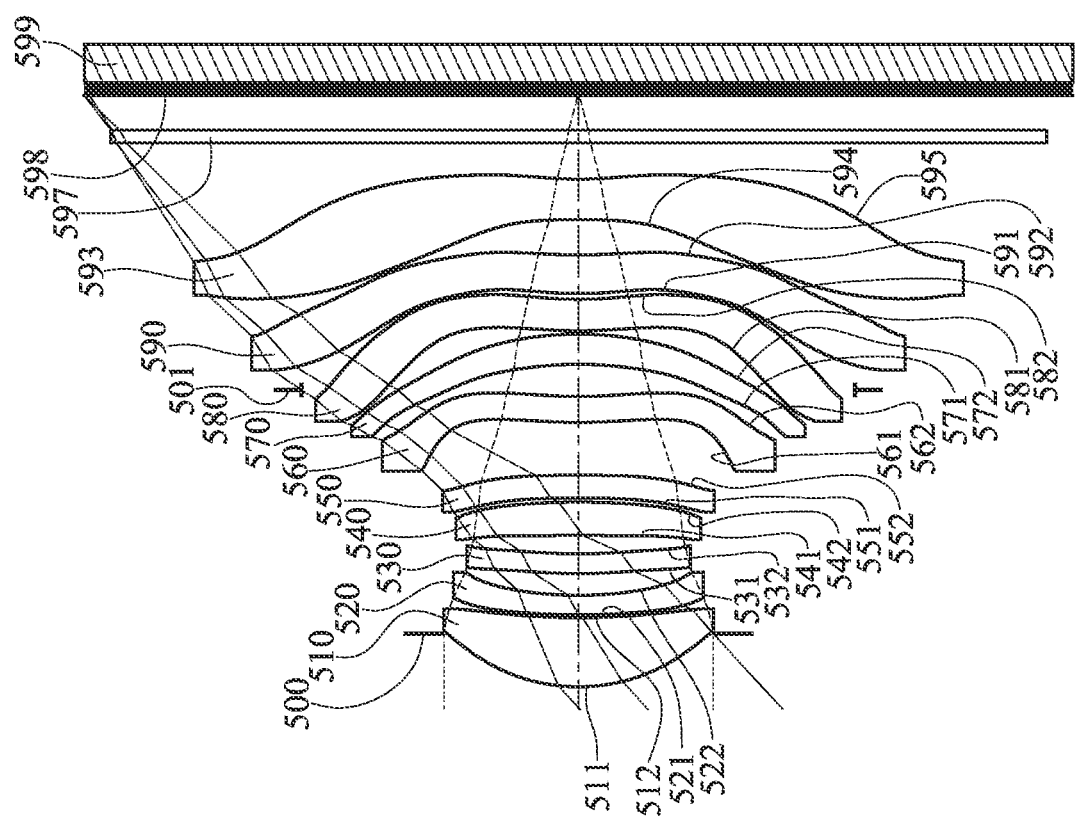
FIG. 9 is a schematic view of an image capturing unit according to the 5th embodiment of the present disclosure.
Figure 10:
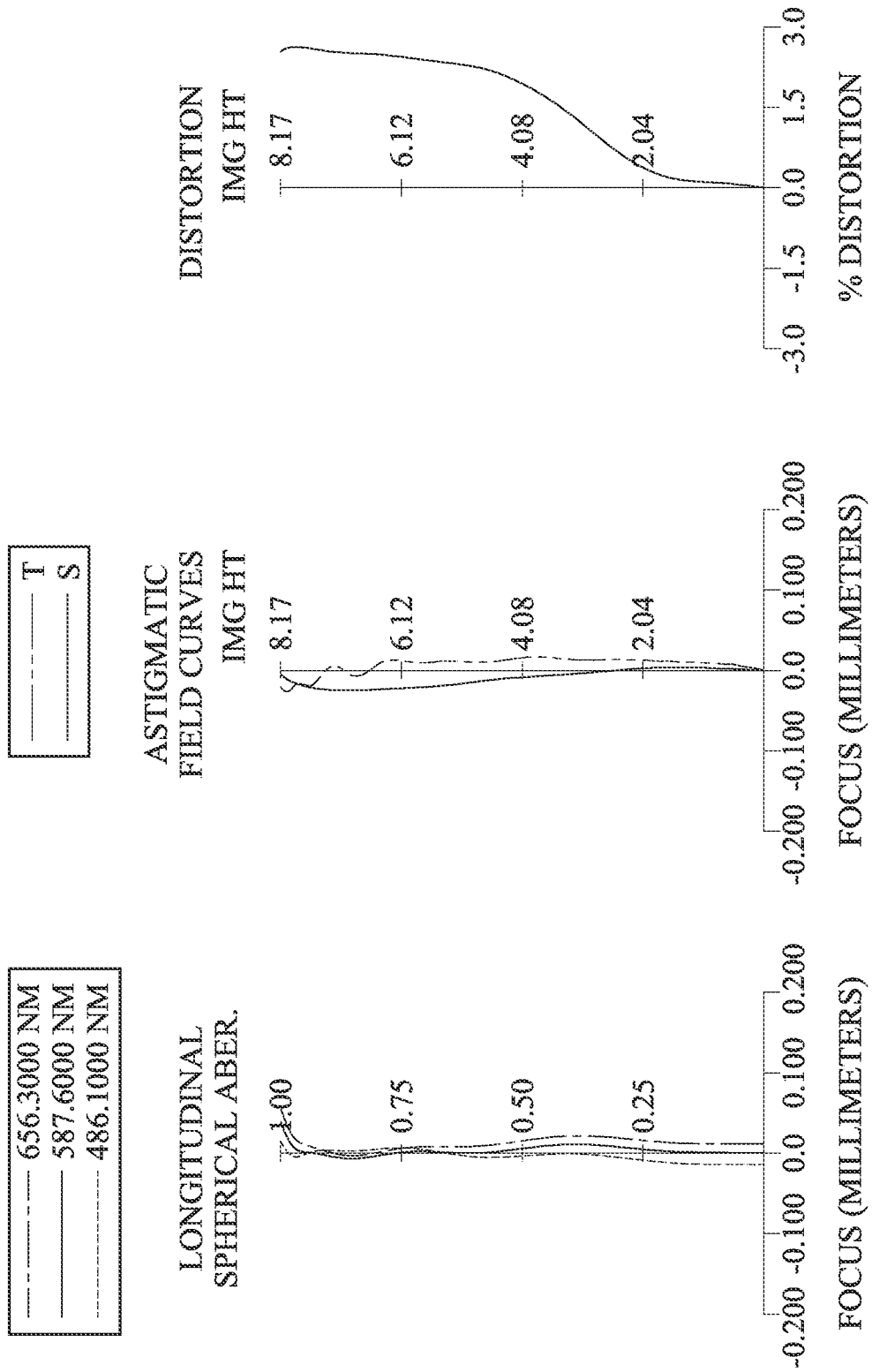
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging system (its reference numeral is omitted) of the present disclosure and an image sensor 599. The optical imaging system includes, in order from an object side to an image side along an optical path, an aperture stop 500, a first lens element 510, a second lens element 520, a third lens element 530, a fourth lens element 540, a fifth lens element 550, a sixth lens element 560, a seventh lens element 570, an eighth lens element 580, a stop 501, a ninth lens element 590, a tenth lens element 593, a filter 597 and an image surface 598. The optical imaging system includes ten lens elements (510, 520, 530, 540, 550, 560, 570, 580, 590 and 593) with no additional lens element disposed between each of the adjacent ten lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The image-side surface 512 of the first lens element 510 has at least one inflection point.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has at least one inflection point. The image-side surface 552 of the fifth lens element 550 has at least one inflection point.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has at least one inflection point. The image-side surface 562 of the sixth lens element 560 has at least one inflection point.

The seventh lens element 570 with positive refractive power has an object-side surface 571 being concave in a paraxial region thereof and an image-side surface 572 being convex in a paraxial region thereof. The seventh lens element 570 is made of plastic material and has the object-side surface 571 and the image-side surface 572 being both aspheric. The object-side surface 571 of the seventh lens element 570 has at least one inflection point. The image-side surface 572 of the seventh lens element 570 has at least one inflection point.

The eighth lens element 580 with negative refractive power has an object-side surface 581 being convex in a paraxial region thereof and an image-side surface 582 being concave in a paraxial region thereof. The eighth lens element 580 is made of plastic material and has the object-side surface 581 and the image-side surface 582 being both aspheric. The object-side surface 581 of the eighth lens element 580 has at least one inflection point. The image-side surface 582 of the eighth lens element 580 has at least one inflection point. The image-side surface 582 of the eighth lens element 580 has at least one critical point in an off-axis region thereof.

The ninth lens element 590 with positive refractive power has an object-side surface 591 being convex in a paraxial region thereof and an image-side surface 592 being concave in a paraxial region thereof. The ninth lens element 590 is made of plastic material and has the object-side surface 591 and the image-side surface 592 being both aspheric. The object-side surface 591 of the ninth lens element 590 has at least one inflection point. The image-side surface 592 of the ninth lens element 590 has at least one inflection point. The image-side surface 592 of the ninth lens element 590 has at least one critical point in an off-axis region thereof.

The tenth lens element 593 with negative refractive power has an object-side surface 594 being concave in a paraxial region thereof and an image-side surface 595 being concave in a paraxial region thereof. The tenth lens element 593 is made of plastic material and has the object-side surface 594 and the image-side surface 595 being both aspheric. The object-side surface 594 of the tenth lens element 593 has at least one inflection point. The image-side surface 595 of the tenth lens element 593 has at least one inflection point. The image-side surface 595 of the tenth lens element 593 has at least one critical point in an off-axis region thereof.

The filter 597 is made of glass material and located between the tenth lens element 593 and the image surface 598, and will not affect the focal length of the optical imaging system. The image sensor 599 is disposed on or near the image surface 598 of the optical imaging system.

The detailed optical data of the 5th embodiment are shown in Table 9 and the aspheric surface data are shown in Table 10 below.

TABLE 9

5th Embodiment
f = 8.68 mm, Fno = 1.95, HFOV = 42.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.8785 | | | | |
| 2 | Lens 1 | 3.032 | (ASP) | 1.1435 | Plastic | 1.545 | 56.1 | 7.12 |
| 3 | | 12.020 | (ASP) | 0.0500 | | | | |
| 4 | Lens 2 | 14.261 | (ASP) | 0.3204 | Plastic | 1.686 | 18.4 | −18.50 |
| 5 | | 6.655 | (ASP) | 0.3591 | | | | |
| 6 | Lens 3 | 8.510 | (ASP) | 0.3264 | Plastic | 1.686 | 18.4 | 189.24 |
| 7 | | 8.965 | (ASP) | 0.3034 | | | | |
| 8 | Lens 4 | −214.520 | (ASP) | 0.5522 | Plastic | 1.544 | 56.0 | 21.44 |
| 9 | | −11.074 | (ASP) | 0.0690 | | | | |
| 10 | Lens 5 | −17.355 | (ASP) | 0.3756 | Plastic | 1.660 | 20.4 | −55.89 |
| 11 | | −33.057 | (ASP) | 0.8724 | | | | |
| 12 | Lens 6 | 8.389 | (ASP) | 0.4300 | Plastic | 1.639 | 23.5 | −260.71 |
| 13 | | 7.827 | (ASP) | 0.5303 | | | | |
| 14 | Lens 7 | −5.879 | (ASP) | 0.5000 | Plastic | 1.544 | 56.0 | 84.66 |
| 15 | | −5.370 | (ASP) | 0.0549 | | | | |
| 16 | Lens 8 | 7.435 | (ASP) | 0.5200 | Plastic | 1.587 | 28.3 | −77.08 |
| 17 | | 6.221 | (ASP) | −1.5000 | | | | |
| 18 | Stop | Plano | | 1.5957 | | | | |
| 19 | Lens 9 | 6.624 | (ASP) | 0.6400 | Plastic | 1.544 | 56.0 | 33.34 |
| 20 | | 10.080 | (ASP) | 0.5818 | | | | |
| 21 | Lens 10 | −21.760 | (ASP) | 0.6700 | Plastic | 1.534 | 56.0 | −8.16 |
| 22 | | 5.513 | (ASP) | 0.6000 | | | | |
| 23 | Filter | Plano | | 0.2100 | Glass | 1.517 | 64.2 | — |
| 24 | | Plano | | 0.5777 | | | | |
| 25 | Image | Plano | | — | | | | |

Note:
Reference wavelength is 587.6 nm (d-line).
An effective radius of the stop 501 (Surface 18) is 4.572 mm.

TABLE 10

Aspheric Coefficients

| Surface # | 2 | 3 | 4 | 5 | 6 |
|---|---|---|---|---|---|
| k = | −6.372759E−01 | −5.026495E+01 | −2.695817E+01 | 5.510826E+00 | 4.794316E+00 |
| A4 = | 3.082768E−03 | 4.748617E−03 | 5.488542E−03 | 8.433063E−04 | −1.431812E−02 |
| A6 = | 6.113410E−05 | −1.133750E−03 | 8.696738E−05 | 1.166562E−03 | −1.873333E−04 |
| A8 = | 2.399676E−04 | −1.031134E−04 | −3.431936E−04 | −8.396657E−04 | 4.740495E−04 |
| A10 = | −1.380548E−04 | 4.893565E−05 | 1.794982E−04 | 6.187904E−04 | −2.546150E−04 |
| A12 = | 3.891015E−05 | 1.127323E−05 | −2.155420E−05 | −2.283499E−04 | 1.389081E−04 |
| A14 = | −5.319892E−06 | −5.729029E−06 | 1.791881E−06 | 4.890414E−05 | −2.368933E−05 |

TABLE 10-continued

| Aspheric Coefficients | | | | | |
|---|---|---|---|---|---|
| A16 = | 1.513075E−07 | 4.752819E−07 | −1.206522E−07 | −3.513506E−06 | 1.355380E−06 |

| Surface # | 7 | 8 | 9 | 10 | 11 |
|---|---|---|---|---|---|
| k = | −4.477920E+00− | 9.900000E+01 | 6.696746E+00 | −3.359893E+01 | −8.251342E+01 |
| A4 = | −9.992743E−03 | 4.378155E−04 | 5.446860E−03 | −6.738349E−03 | −1.257976E−02 |
| A6 = | −2.752951E−04 | −2.355712E−03 | 7.240682E−04 | 1.353738E−03 | 2.100449E−03 |
| A8 = | −1.631079E−05 | 1.011186E−03 | −7.155355E−03 | −3.976276E−03 | −1.645161E−03 |
| A10 = | 3.314004E−04 | −1.009510E−03 | 6.616904E−03 | 2.804172E−03 | 9.780611E−04 |
| A12 = | −1.171266E−04 | 6.081583E−04 | −3.479739E−03 | −9.777913E−04 | −4.167272E−04 |
| A14 = | 3.541769E−05 | −2.047693E−04 | 1.124419E−03 | 1.575811E−04 | 1.273775E−04 |
| A16 = | −4.110114E−06 | 3.804576E−05 | −2.209075E−04 | 1.408568E−06 | −2.550882E−05 |
| A18 = | — | −3.043208E−06 | 2.469373E−05 | −3.524908E−06 | 2.974503E−06 |
| A20 = | — | — | −1.248615E−06 | 2.954490E−07 | −1.481584E−07 |

| Surface # | 12 | 13 | 14 | 15 | 16 |
|---|---|---|---|---|---|
| k = | 2.407673E+00 | 9.152951E−01 | 4.924832E−01 | 4.948043E−02 | −2.028366E+01 |
| A4 = | −2.277273E−02 | −2.349856E−02 | 8.980649E−03 | 4.618496E−03 | −1.451408E−02 |
| A6 = | 8.710236E−03 | 9.054935E−03 | −1.204200E−03 | −3.805815E−03 | −1.787705E−03 |
| A8 = | −7.502303E−03 | −5.664138E−03 | −3.487824E−04 | 1.669157E−03 | 3.535879E−04 |
| A10 = | 4.254295E−03 | 2.003866E−03 | −6.565754E−04 | −6.927436E−04 | 4.738577E−04 |
| A12 = | −1.738778E−03 | −4.377847E−04 | 4.230413E−04 | 1.963144E−04 | −2.749528E−04 |
| A14 = | 5.088925E−04 | 5.970627E−05 | −1.043773E−04 | −3.355540E−05 | 6.637891E−05 |
| A16 = | −1.049753E−04 | −4.955114E−06 | 1.373175E−05 | 3.469676E−06 | −8.948207E−06 |
| A18 = | 1.426541E−05 | 2.370668E−07 | −1.025720E−06 | −2.140659E−07 | 7.256126E−07 |
| A20 = | −1.130868E−06 | −5.766614E−09 | 4.120981E−08 | 7.275510E−09 | −3.526967E−08 |
| A22 = | 3.929949E−08 | 4.998649E−11 | −6.935559E−10 | −1.049751E−10 | 9.491701E−10 |
| A24 = | — | — | — | — | −1.089510E−11 |

| Surface # | 17 | 19 | 20 | 21 | 22 |
|---|---|---|---|---|---|
| k = | 2.027054E+01 | 1.016159E+00 | 7.301660E−01 | −9.459871E−01 | −1.041853E+00 |
| A4 = | 2.913321E−03 | 1.034342E−03 | −4.633244E−03 | −3.877000E−02 | −4.313002E−02 |
| A6 = | −2.048223E−02 | −2.871742E−02 | −1.326897E−02 | 6.496470E−03 | 1.060865E−02 |
| A8 = | 9.447024E−03 | 1.310449E−02 | 5.962007E−03 | −1.501374E−05 | −1.731917E−03 |
| A10 = | −2.229502E−03 | −3.035593E−03 | −1.362055E−03 | −1.313322E−04 | 1.929717E−04 |
| A12 = | 3.138809E−04 | 4.335353E−04 | 2.009798E−04 | 2.087254E−05 | −1.529620E−05 |
| A14 = | −2.771332E−05 | −4.116035E−05 | −2.084601E−05 | −1.754782E−06 | 8.851518E−07 |
| A16 = | 1.535836E−06 | 2.687436E−06 | 1.568426E−06 | 9.451458E−08 | −3.786996E−08 |
| A18 = | −5.056366E−08 | −1.216714E−07 | −8.593265E−08 | −3.458345E−09 | 1.197747E−09 |
| A20 = | 8.152984E−10 | 3.763153E−09 | 3.383005E−09 | 8.727295E−11 | −2.761645E−11 |
| A22 = | −8.816106E−13 | −7.599342E−11 | −9.290845E−11 | −1.499119E−12 | 4.501597E−13 |
| A24 = | −1.047821E−13 | 9.040160E−13 | 1.685457E−12 | 1.675287E−14 | −4.902344E−15 |
| A26 = | — | −4.807912E−15 | −1.812017E−14 | −1.097933E−16 | 3.193219E−17 |
| A28 = | — | — | 8.733385E−17 | 3.197574E−19 | −9.395163E−20 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 8.68 | CTmax/CTmin | 3.57 |
| Fno | 1.95 | |R13/CT5| | 15.65 |
| HFOV [deg.] | 42.5 | f/R16 | 1.39 |
| V6 | 23.5 | f/R20 | 1.57 |
| (V2 + V3)/V1 | 0.7 | (R18 + R19)/(R18 − R19) | −0.37 |
| V5 + V6 | 43.9 | f/f1 | 1.22 |
| Vmin | 18.4 | f/f2 | −0.47 |
| V1/N1 | 36.30 | f/f8 | −0.11 |
| V2/N2 | 10.90 | f/f9 | 0.26 |
| V3/N3 | 10.90 | f10/f9 | −0.24 |
| V4/N4 | 36.26 | |f/f3| + |f/f5| + |f/f6| + |f/f7| + |f/f8| | 0.45 |
| V5/N5 | 12.29 | Y102/Y32 | 3.48 |

| 5th Embodiment | | | |
|---|---|---|---|
| V6/N6 | 14.34 | TL [mm] | 9.78 |
| V7/N7 | 36.26 | TL/f | 1.13 |
| V8/N8 | 17.83 | TL/ImgH | 1.20 |
| V9/N9 | 36.26 | ImgH/BL | 5.88 |
| V10/N10 | 36.48 | EPD/BL | 3.21 |
| (Vi/Ni)min | 10.90 | BL/TD | 0.17 |
| Nmax | 1.686 | SD/TD | 0.90 |
| CT4/CT3 | 1.692 | f/EPD | 1.95 |
| T910/CT1 | 0.51 | ImgH [mm] | 8.17 |
| ΣCT/TD | 0.65 | — | — |

6th Embodiment

Figure 11:
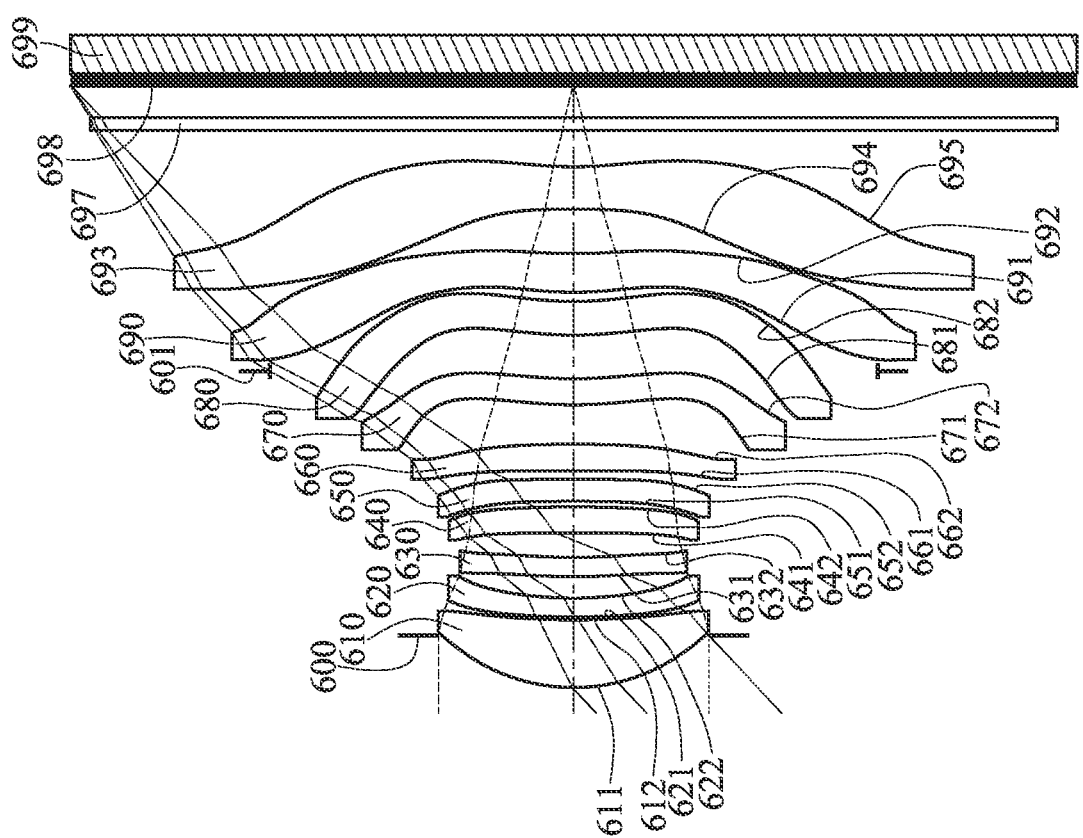
FIG. 11 is a schematic view of an image capturing unit according to the 6th embodiment of the present disclosure.
Figure 12:
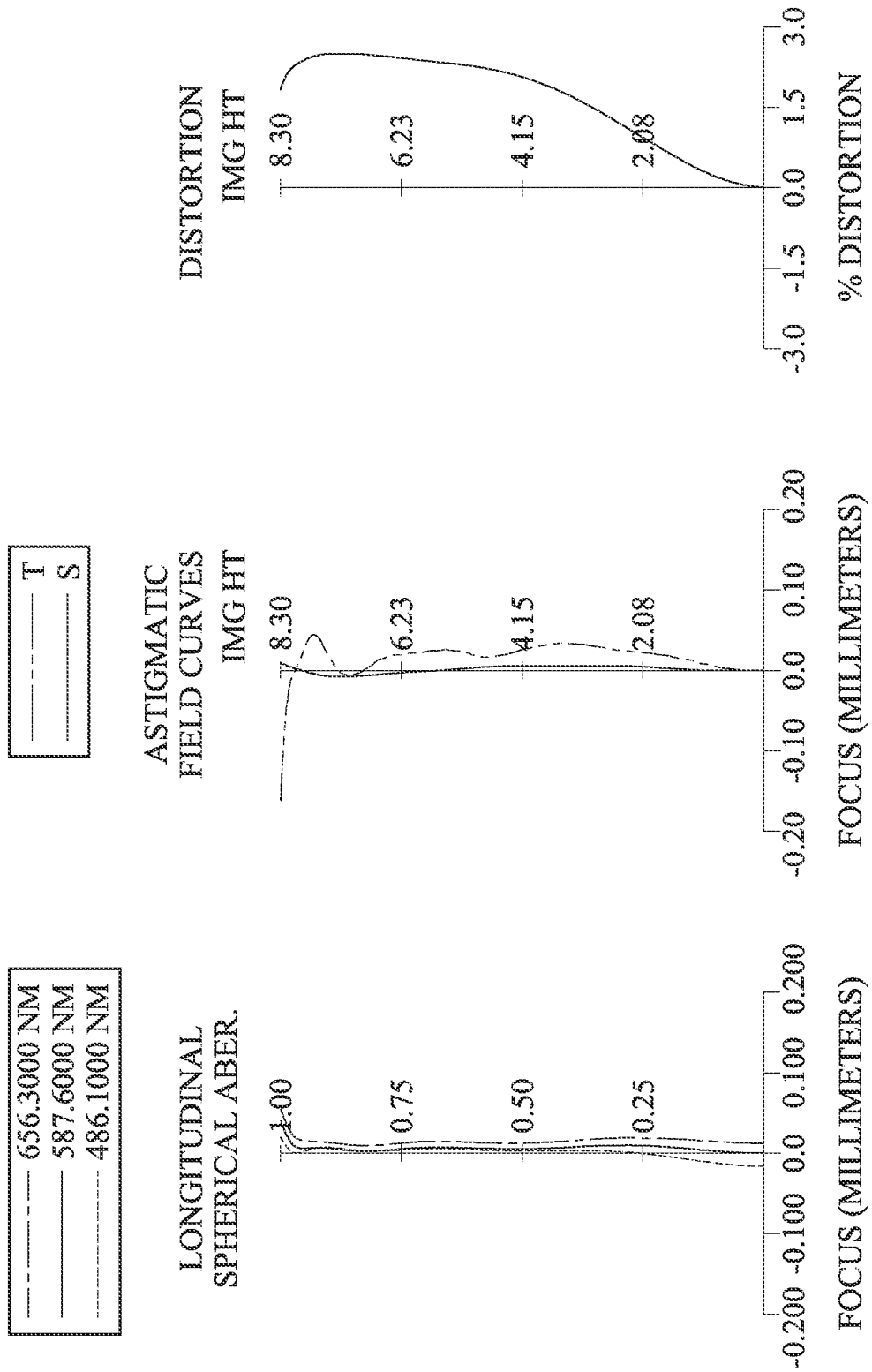
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging system (its reference numeral is omitted) of the present disclosure and an image sensor 699. The optical imaging system includes, in order from an object side to an image side along an optical path, an aperture stop 600, a first lens element 610, a second lens element 620, a third lens element 630, a fourth lens element 640, a fifth lens element 650, a sixth lens element 660, a seventh lens element 670, an eighth lens element 680, a stop 601, a ninth lens element 690, a tenth lens element 693, a filter 697 and an image surface 698. The optical imaging system includes ten lens elements (610, 620, 630, 640, 650, 660, 670, 680, 690 and 693) with no additional lens element disposed between each of the adjacent ten lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric.

The sixth lens element 660 with positive refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric. The object-side surface 661 of the sixth lens element 660 has at least one inflection point. The image-side surface 662 of the sixth lens element 660 has at least one inflection point.

The seventh lens element 670 with negative refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The object-side surface 671 of the seventh lens element 670 has at least one inflection point. The image-side surface 672 of the seventh lens element 670 has at least one inflection point.

The eighth lens element 680 with negative refractive power has an object-side surface 681 being convex in a paraxial region thereof and an image-side surface 682 being concave in a paraxial region thereof. The eighth lens element 680 is made of plastic material and has the object-side surface 681 and the image-side surface 682 being both aspheric. The object-side surface 681 of the eighth lens element 680 has at least one inflection point. The image-side surface 682 of the eighth lens element 680 has at least one inflection point. The image-side surface 682 of the eighth lens element 680 has at least one critical point in an off-axis region thereof.

The ninth lens element 690 with positive refractive power has an object-side surface 691 being convex in a paraxial region thereof and an image-side surface 692 being concave in a paraxial region thereof. The ninth lens element 690 is made of plastic material and has the object-side surface 691 and the image-side surface 692 being both aspheric. The object-side surface 691 of the ninth lens element 690 has at least one inflection point. The image-side surface 692 of the ninth lens element 690 has at least one inflection point. The image-side surface 692 of the ninth lens element 690 has at least one critical point in an off-axis region thereof.

The tenth lens element 693 with negative refractive power has an object-side surface 694 being concave in a paraxial region thereof and an image-side surface 695 being concave in a paraxial region thereof. The tenth lens element 693 is made of plastic material and has the object-side surface 694 and the image-side surface 695 being both aspheric. The object-side surface 694 of the tenth lens element 693 has at least one inflection point. The image-side surface 695 of the tenth lens element 693 has at least one inflection point. The image-side surface 695 of the tenth lens element 693 has at least one critical point in an off-axis region thereof.

The filter 697 is made of glass material and located between the tenth lens element 693 and the image surface 698, and will not affect the focal length of the optical imaging system. The image sensor 699 is disposed on or near the image surface 698 of the optical imaging system.

The detailed optical data of the 6th embodiment are shown in Table 11 and the aspheric surface data are shown in Table 12 below.

TABLE 11

6th Embodiment
f = 8.71 mm, Fno = 1.95, HFOV = 43.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.8631 | | | | |
| 2 | Lens 1 | 3.147 | (ASP) | 1.1193 | Plastic | 1.545 | 56.1 | 7.24 |
| 3 | | 13.620 | (ASP) | 0.0500 | | | | |
| 4 | Lens 2 | 14.673 | (ASP) | 0.3100 | Plastic | 1.686 | 18.4 | −18.42 |
| 5 | | 6.732 | (ASP) | 0.3534 | | | | |
| 6 | Lens 3 | 9.253 | (ASP) | 0.3200 | Plastic | 1.686 | 18.4 | 142.27 |
| 7 | | 10.078 | (ASP) | 0.4064 | | | | |
| 8 | Lens 4 | −45.335 | (ASP) | 0.4279 | Plastic | 1.544 | 56.0 | 57.60 |

TABLE 11-continued

6th Embodiment
f = 8.71 mm, Fno = 1.95, HFOV = 43.1 deg.

| Surface # | | Curvature Radius | | Thickness | Material | Index | Abbe # | Focal Length |
|---|---|---|---|---|---|---|---|---|
| 9 | | −18.590 | (ASP) | 0.0926 | | | | |
| 10 | Lens 5 | −40.964 | (ASP) | 0.3600 | Plastic | 1.660 | 20.4 | −57.82 |
| 11 | | 559.146 | (ASP) | 0.1448 | | | | |
| 12 | Lens 6 | −43.553 | (ASP) | 0.4403 | Plastic | 1.544 | 56.0 | 52.75 |
| 13 | | −17.362 | (ASP) | 0.6506 | | | | |
| 14 | Lens 7 | 6.517 | (ASP) | 0.4300 | Plastic | 1.639 | 23.5 | −253.82 |
| 15 | | 6.104 | (ASP) | 0.7228 | | | | |
| 16 | Lens 8 | 6.329 | (ASP) | 0.5565 | Plastic | 1.587 | 28.3 | −493.98 |
| 17 | | 5.993 | (ASP) | −1.1500 | | | | |
| 18 | Stop | Plano | | 1.3009 | | | | |
| 19 | Lens 9 | 5.434 | (ASP) | 0.6400 | Plastic | 1.544 | 56.0 | 26.42 |
| 20 | | 8.373 | (ASP) | 0.7351 | | | | |
| 21 | Lens 10 | −25.644 | (ASP) | 0.7000 | Plastic | 1.534 | 56.0 | −8.57 |
| 22 | | 5.625 | (ASP) | 0.6000 | | | | |
| 23 | Filter | Plano | | 0.2100 | Glass | 1.517 | 64.2 | — |
| 24 | | Plano | | 0.5243 | | | | |
| 25 | Image | Plano | | — | | | | |

Note:
Reference wavelength is 587.6 nm (d-line).
An effective radius of the stop 601 (Surface 18) is 5.022 mm.

TABLE 12

Aspheric Coefficients

| Surface # | 2 | 3 | 4 | 5 | 6 |
|---|---|---|---|---|---|
| k = | −6.227097E−01 | −4.482662E+01 | −3.487214E+01 | 3.877699E+00 | 2.084350E+00 |
| A4 = | 2.606686E−03 | 1.409280E−03 | 3.248108E−03 | −5.683183E−04 | −1.442300E−02 |
| A6 = | 6.253579E−04 | 9.555067E−04 | 1.312225E−03 | 1.061911E−03 | −1.080618E−03 |
| A8 = | −3.171959E−04 | −3.613967E−04 | 3.972865E−05 | −2.425892E−04 | 3.557039E−04 |
| A10 = | 1.588520E−04 | 2.478540E−05 | −2.129831E−04 | 1.944104E−04 | 1.835058E−04 |
| A12 = | −4.713911E−05 | 8.132583E−06 | 9.875455E−05 | −7.649476E−05 | −3.399397E−05 |
| A14 = | 7.729660E−06 | −2.887153E−06 | −1.807124E−05 | 2.219069E−05 | 3.535924E−06 |
| A16 = | −6.153129E−07 | 2.168245E−07 | 1.279777E−06 | −2.146315E−06 | −4.083563E−07 |

| Surface # | 7 | 8 | 9 | 10 | 11 |
|---|---|---|---|---|---|
| k = | −6.332266E+00 | 8.970068E+01 | 5.011799E+01 | 3.731130E+01 | 9.000000E+01 |
| A4 = | −8.841747E−03 | 1.730705E−03 | −4.169803E−03 | −1.863009E−02 | −5.284614E−03 |
| A6 = | −2.846130E−03 | 1.251040E−03 | 2.096251E−02 | 1.921127E−02 | 9.063448E−04 |
| A8 = | 2.112027E−03 | −4.423597E−03 | −2.816847E−02 | −2.320976E−02 | −8.697959E−03 |
| A10 = | −9.457157E−04 | 2.436776E−03 | 2.115671E−02 | 1.757567E−02 | 8.256310E−03 |
| A12 = | 4.236192E−04 | −7.036319E−04 | −1.079839E−02 | −9.003986E−03 | −4.027485E−03 |
| A14 = | −9.510002E−05 | 1.077741E−04 | 3.688109E−03 | 3.049314E−03 | 1.164613E−03 |
| A16 = | 8.399750E−06 | −7.249562E−06 | −7.915834E−04 | −6.399949E−04 | −2.000972E−04 |
| A18 = | — | 9.384786E−08 | 9.556819E−05 | 7.459562E−05 | 1.878075E−05 |
| A20 = | — | — | −4.934980E−06 | −3.673164E−06 | −7.361219E−07 |

| Surface # | 12 | 13 | 14 | 15 | 16 |
|---|---|---|---|---|---|
| k = | 9.000000E+01 | 1.449521E+01 | 3.297323E+00 | 3.161246E−02 | −9.168107E+00 |
| A4 = | 1.435709E−02 | 9.819191E−04 | −2.633370E−02 | −3.219110E−02 | −4.294953E−03 |
| A6 = | −5.436657E−03 | 5.262320E−04 | 9.896925E−03 | 1.190469E−02 | −6.169224E−03 |
| A8 = | −7.632162E−03 | −3.857133E−03 | −3.502557E−03 | −3.776317E−03 | 2.504853E−03 |
| A10 = | 8.198549E−03 | 2.448522E−03 | 1.525988E−04 | 6.037465E−04 | −5.831964E−04 |
| A12 = | −3.874466E−03 | −7.575153E−04 | 3.007790E−04 | −2.585513E−05 | 8.061262E−05 |
| A14 = | 1.083422E−03 | 1.338194E−04 | −1.247328E−04 | −8.731573E−06 | −1.069048E−05 |
| A16 = | −1.896445E−04 | −1.351182E−05 | 2.519675E−05 | 1.878601E−06 | 1.832939E−06 |
| A18 = | 2.046739E−05 | 7.293528E−07 | −2.897543E−06 | −1.683046E−07 | −2.381107E−07 |
| A20 = | −1.248338E−06 | −1.785130E−08 | 1.804137E−07 | 7.387424E−09 | 1.767845E−08 |
| A22 = | 3.296074E−08 | 1.366701E−10 | −4.696741E−09 | −1.296503E−10 | −6.749478E−10 |
| A24 = | — | — | — | — | 1.035828E−11 |

| Surface # | 17 | 19 | 20 | 21 | 22 |
|---|---|---|---|---|---|
| k = | −1.577595E+01 | −1.091057E+00 | 1.900418E−01 | 7.935951E+00 | −1.060398E+00 |
| A4 = | 8.504585E−03 | −2.005648E−02 | −1.926869E−02 | −2.963971E−02 | −3.034648E−02 |
| A6 = | −1.457308E−02 | −6.931694E−03 | −1.976770E−03 | 3.771952E−03 | 5.801170E−03 |
| A8 = | 5.667982E−03 | 3.901866E−03 | 2.105198E−03 | 2.365108E−04 | −8.602748E−04 |
| A10 = | −1.285806E−03 | −8.849739E−04 | −5.496038E−04 | −1.243374E−04 | 9.593877E−05 |

TABLE 12-continued

| Aspheric Coefficients | | | | |
|---|---|---|---|---|
| A12 = | 1.812241E−04 | 1.181624E−04 | 8.285412E−05 | 1.716910E−05 | −8.245817E−06 |
| A14 = | −1.618421E−05 | −1.027708E−05 | −8.421150E−06 | −1.348185E−06 | 5.510840E−07 |
| A16 = | 9.103375E−07 | 6.076533E−07 | 6.099194E−07 | 6.829000E−08 | −2.827459E−08 |
| A18 = | −3.070685E−08 | −2.473558E−08 | −3.194530E−08 | −2.316834E−09 | 1.085601E−09 |
| A20 = | 5.298330E−10 | 6.846787E−10 | 1.199359E−09 | 5.261598E−11 | −3.021581E−11 |
| A22 = | −1.863166E−12 | −1.233614E−11 | −3.137862E−11 | −7.730096E−13 | 5.859832E−13 |
| A24 = | −4.662465E−14 | 1.306682E−13 | 5.416486E−13 | 6.738707E−15 | −7.463337E−15 |
| A26 = | — | −6.180207E−16 | −5.531103E−15 | −2.803915E−17 | 5.592256E−17 |
| A28 = | — | — | 2.525889E−17 | 2.079737E−20 | −1.864838E−19 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 8.71 | CTmax/CTmin | 3.61 |
| Fno | 1.95 | |R13/CT5| | 18.10 |
| HFOV [deg.] | 43.1 | f/R16 | 1.45 |
| V6 | 56.0 | f/R20 | 1.55 |
| (V2 + V3)/V1 | 0.7 | (R18 + R19)/(R18 − R19) | −0.51 |
| V5 + V6 | 76.4 | f/f1 | 1.20 |
| Vmin | 18.4 | f/f2 | −0.47 |
| V1/N1 | 36.30 | f/f8 | −0.02 |
| V2/N2 | 10.90 | f/f9 | 0.33 |
| V3/N3 | 10.90 | f10/f9 | −0.32 |
| V4/N4 | 36.26 | |f/f3| + |f/f5| + |f/f6| + |f/f7| + |f/f8| | 0.43 |
| V5/N5 | 12.29 | Y102/Y32 | 3.59 |
| V6/N6 | 36.26 | TL [mm] | 9.94 |
| V7/N7 | 14.34 | TL/f | 1.14 |
| V8/N8 | 17.83 | TL/ImgH | 1.20 |
| V9/N9 | 36.26 | ImgH/BL | 6.22 |
| V10/N10 | 36.48 | EPD/BL | 3.35 |
| (Vi/Ni)min | 10.90 | BL/TD | 0.15 |
| Nmax | 1.686 | SD/TD | 0.90 |
| CT4/CT3 | 1.337 | f/EPD | 1.95 |
| T910/CT1 | 0.66 | ImgH [mm] | 8.30 |
| ΣCT/TD | 0.62 | — | — |

7th Embodiment

Figure 13:
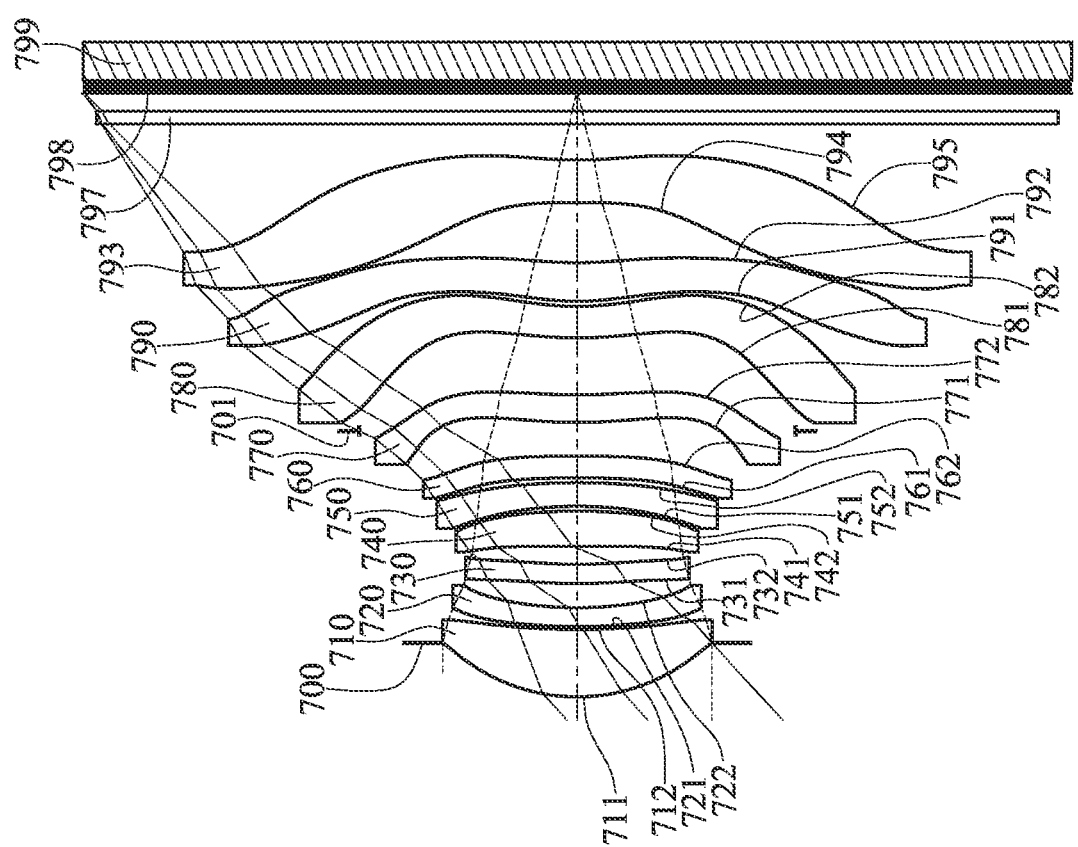
FIG. 13 is a schematic view of an image capturing unit according to the 7th embodiment of the present disclosure.
Figure 14:
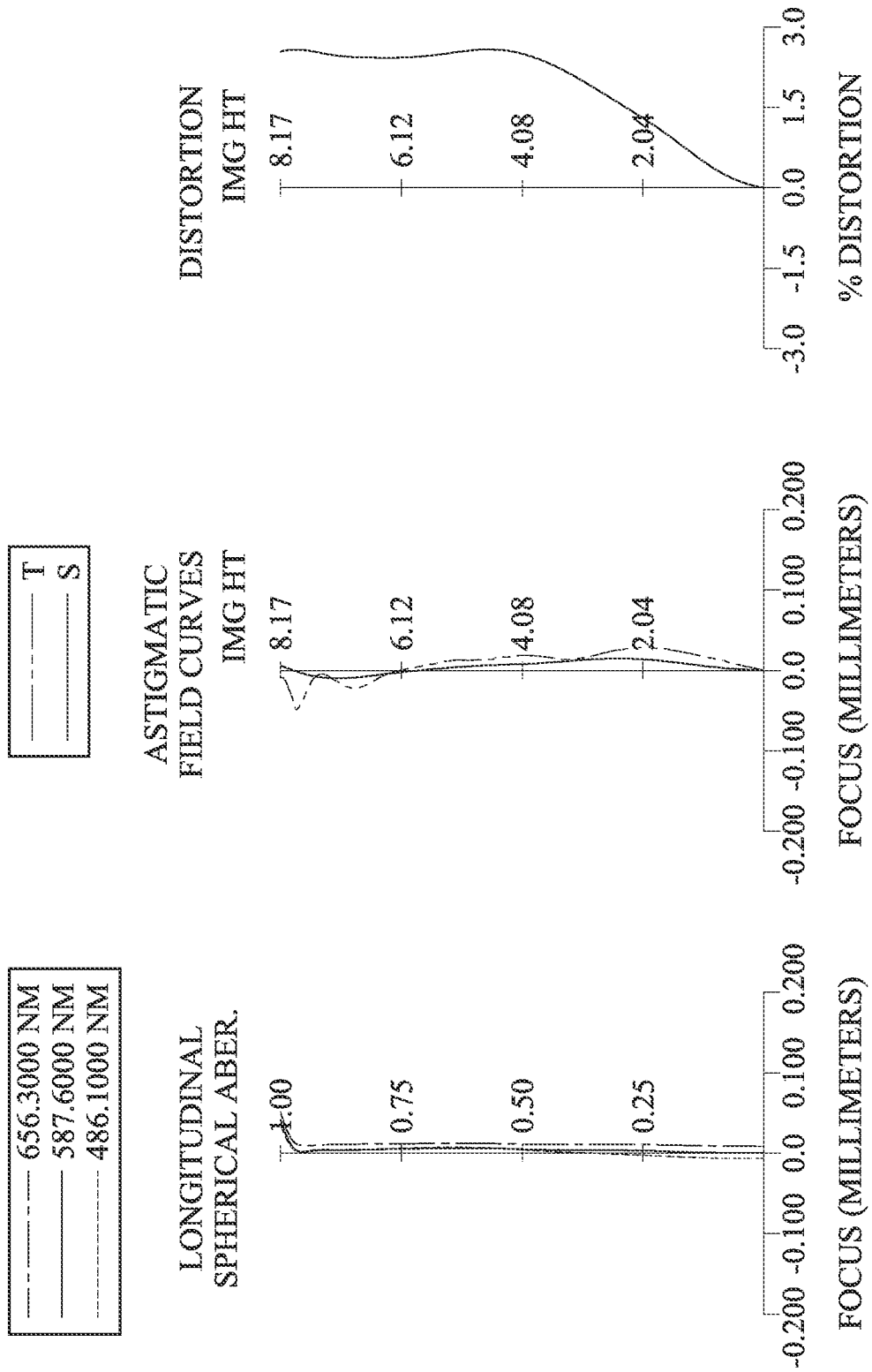
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging system (its reference numeral is omitted) of the present disclosure and an image sensor 799. The optical imaging system includes, in order from an object side to an image side along an optical path, an aperture stop 700, a first lens element 710, a second lens element 720, a third lens element 730, a fourth lens element 740, a fifth lens element 750, a sixth lens element 760, a seventh lens element 770, a stop 701, an eighth lens element 780, a ninth lens element 790, a tenth lens element 793, a filter 797 and an image surface 798. The optical imaging system includes ten lens elements (710, 720, 730, 740, 750, 760, 770, 780, 790 and 793) with no additional lens element disposed between each of the adjacent ten lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The image-side surface 712 of the first lens element 710 has at least one inflection point.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has at least one inflection point. The image-side surface 732 of the third lens element 730 has at least one inflection point.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with negative refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric. The image-side surface 762 of the sixth lens element 760 has at least one inflection point.

The seventh lens element 770 with positive refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The object-side surface 771 of the seventh lens element 770 has at least one inflection point. The image-side surface 772 of the seventh lens element 770 has at least one inflection point.

The eighth lens element 780 with negative refractive power has an object-side surface 781 being convex in a paraxial region thereof and an image-side surface 782 being concave in a paraxial region thereof. The eighth lens element 780 is made of plastic material and has the object-side surface 781 and the image-side surface 782 being both aspheric. The object-side surface 781 of the eighth lens element 780 has at least one inflection point. The image-side surface 782 of the eighth lens element 780 has at least one inflection point. The image-side surface 782 of the eighth lens element 780 has at least one critical point in an off-axis region thereof.

The ninth lens element 790 with positive refractive power has an object-side surface 791 being convex in a paraxial region thereof and an image-side surface 792 being concave in a paraxial region thereof. The ninth lens element 790 is made of plastic material and has the object-side surface 791 and the image-side surface 792 being both aspheric. The object-side surface 791 of the ninth lens element 790 has at least one inflection point. The image-side surface 792 of the ninth lens element 790 has at least one inflection point. The image-side surface 792 of the ninth lens element 790 has at least one critical point in an off-axis region thereof.

The tenth lens element 793 with negative refractive power has an object-side surface 794 being concave in a paraxial region thereof and an image-side surface 795 being concave in a paraxial region thereof. The tenth lens element 793 is made of plastic material and has the object-side surface 794 and the image-side surface 795 being both aspheric. The object-side surface 794 of the tenth lens element 793 has at least one inflection point. The image-side surface 795 of the tenth lens element 793 has at least one inflection point. The image-side surface 795 of the tenth lens element 793 has at least one critical point in an off-axis region thereof.

The filter 797 is made of glass material and located between the tenth lens element 793 and the image surface 798, and will not affect the focal length of the optical imaging system. The image sensor 799 is disposed on or near the image surface 798 of the optical imaging system.

The detailed optical data of the 7th embodiment are shown in Table 13 and the aspheric surface data are shown in Table 14 below.

TABLE 13

7th Embodiment
f = 8.67 mm, Fno = 1.95, HFOV = 42.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.8900 | | | | |
| 2 | Lens 1 | 3.135 | (ASP) | 1.1140 | Plastic | 1.545 | 56.1 | 7.48 |
| 3 | | 11.853 | (ASP) | 0.0510 | | | | |
| 4 | Lens 2 | 10.876 | (ASP) | 0.3100 | Plastic | 1.686 | 18.4 | −23.07 |
| 5 | | 6.372 | (ASP) | 0.3980 | | | | |
| 6 | Lens 3 | 8.864 | (ASP) | 0.3200 | Plastic | 1.686 | 18.4 | 547.86 |
| 7 | | 8.944 | (ASP) | 0.2990 | | | | |
| 8 | Lens 4 | −133.508 | (ASP) | 0.5800 | Plastic | 1.544 | 56.0 | 17.18 |
| 9 | | −8.747 | (ASP) | 0.0800 | | | | |
| 10 | Lens 5 | −6.288 | (ASP) | 0.3900 | Plastic | 1.639 | 23.5 | −24.88 |
| 11 | | −10.658 | (ASP) | 0.0800 | | | | |
| 12 | Lens 6 | −18.294 | (ASP) | 0.3600 | Plastic | 1.660 | 20.4 | −81.18 |
| 13 | | −27.996 | (ASP) | 0.5550 | | | | |
| 14 | Lens 7 | 7.393 | (ASP) | 0.4570 | Plastic | 1.639 | 23.5 | 50.42 |
| 15 | | 9.365 | (ASP) | −0.6000 | | | | |
| 16 | Stop | Plano | | 1.5420 | | | | |
| 17 | Lens 8 | 6.618 | (ASP) | 0.5200 | Plastic | 1.587 | 28.3 | −25.97 |
| 18 | | 4.481 | (ASP) | 0.0850 | | | | |
| 19 | Lens 9 | 4.165 | (ASP) | 0.6400 | Plastic | 1.544 | 56.0 | 17.52 |
| 20 | | 6.995 | (ASP) | 0.9960 | | | | |
| 21 | Lens 10 | −18.539 | (ASP) | 0.7000 | Plastic | 1.534 | 56.0 | −8.92 |
| 22 | | 6.502 | (ASP) | 0.6000 | | | | |
| 23 | Filter | Plano | | 0.2100 | Glass | 1.517 | 64.2 | — |
| 24 | | Plano | | 0.2973 | | | | |
| 25 | Image | Plano | | — | | | | |

Note:

Reference wavelength is 587.6 nm (d-line).

An effective radius of the stop 701 (Surface 16) is 3.603 mm.

TABLE 14

| Aspheric Coefficients | | | | | |
|---|---|---|---|---|---|
| Surface # | 2 | 3 | 4 | 5 | 6 |
| k = | −6.269890E−01 | −4.788420E+01 | −2.761120E+01 | 3.156370E+00 | 2.665300E+00 |
| A4 = | 2.992670E−03 | 1.123821E−03 | 2.499729E−03 | −4.784871E−04 | −1.386575E−02 |
| A6 = | 1.707045E−04 | 8.318621E−04 | 1.342442E−03 | 2.734170E−04 | −2.095305E−03 |
| A8 = | −4.899034E−05 | −9.294563E−05 | 3.266760E−04 | 8.678641E−04 | 1.926101E−03 |
| A10 = | 6.924575E−05 | −1.609479E−04 | −4.403316E−04 | −6.268354E−04 | −1.068346E−03 |
| A12 = | −3.101836E−05 | 7.548670E−05 | 1.840694E−04 | 2.441336E−04 | 4.495786E−04 |
| A14 = | 6.244281E−06 | −1.456749E−05 | −3.260742E−05 | −4.207378E−05 | −8.466934E−05 |
| A16 = | −5.589640E−07 | 9.749482E−07 | 2.224000E−06 | 3.288269E−06 | 5.734755E−06 |

| Surface # | 7 | 8 | 9 | 10 | 11 |
|---|---|---|---|---|---|
| k = | −9.731780E+00 | 9.000000E+01 | 7.968930E+00 | 0.000000E+00 | 0.000000E+00 |
| A4 = | −8.553952E−03 | 3.299816E−04 | 1.725255E−02 | 1.690583E−02 | 4.234074E−03 |
| A6 = | −4.152412E−03 | −7.234066E−03 | −3.435794E−02 | −3.728699E−02 | −6.475234E−03 |
| A8 = | 3.385068E−03 | 5.482742E−03 | 2.894053E−02 | 4.136874E−02 | 3.142631E−03 |
| A10 = | −1.744576E−03 | −3.642004E−03 | −1.404562E−02 | −4.095176E−02 | −2.340307E−03 |
| A12 = | 6.464914E−04 | 1.490748E−03 | 3.913951E−03 | 4.235770E−02 | 3.644577E−03 |
| A14 = | −1.085749E−04 | −3.609246E−04 | −5.634103E−04 | −3.666582E−02 | −3.779079E−03 |
| A16 = | 6.523199E−06 | 5.124967E−05 | 8.381317E−06 | 2.290651E−02 | 2.311586E−03 |
| A18 = | — | −3.355564E−06 | 9.917999E−06 | −9.985685E−03 | −8.920713E−04 |
| A20 = | — | — | −1.075665E−06 | 3.011237E−03 | 2.263955E−04 |
| A22 = | — | — | — | −6.165694E−04 | −3.800815E−05 |
| A24 = | — | — | — | 8.192934E−05 | 4.081024E−06 |
| A26 = | — | — | — | −6.382710E−06 | −2.543209E−07 |
| A28 = | — | — | — | 2.220368E−07 | 7.007108E−09 |
| A30 = | — | — | — | −7.714581E−11 | −7.581188E−13 |

| Surface # | 12 | 13 | 14 | 15 | 17 |
|---|---|---|---|---|---|
| k = | 8.626580E+00 | −2.347780E+00 | 0.000000E+00 | 0.000000E+00 | 0.000000E+00 |
| A4 = | −6.881423E−03 | −1.173574E−02 | −1.749826E−02 | −1.890275E−02 | −1.243486E−02 |
| A6 = | 7.228348E−03 | 4.449704E−03 | 9.290122E−04 | 1.831013E−03 | −1.386821E−03 |
| A8 = | −1.237684E−02 | −4.193363E−03 | 1.625496E−03 | 8.949173E−04 | −1.792202E−04 |
| A10 = | 9.556050E−03 | 2.132040E−03 | −1.586567E−03 | −8.597761E−04 | 3.332150E−04 |
| A12 = | −4.614888E−03 | −7.178326E−04 | 6.725217E−04 | 3.090490E−04 | −1.343277E−04 |
| A14 = | 1.395941E−03 | 1.633113E−04 | −1.696862E−04 | −6.407468E−05 | 2.893074E−05 |
| A16 = | −2.480085E−04 | −2.305970E−05 | 2.661285E−05 | 8.146121E−06 | −3.747338E−06 |
| A18 = | 2.340743E−05 | 1.799768E−06 | −2.556606E−06 | −6.201422E−07 | 3.006232E−07 |
| A20 = | −9.023392E−07 | −5.928434E−08 | 1.430862E−07 | 2.582260E−08 | −1.463858E−08 |
| A22 = | — | — | −4.637375E−09 | −4.493964E−10 | 3.978660E−10 |
| A24 = | — | — | 1.493690E−10 | −1.442132E−13 | −4.731768E−12 |
| A26 = | — | — | −6.878095E−12 | — | 6.066154E−15 |
| A28 = | — | — | 1.427042E−13 | — | −1.209413E−16 |
| A30 = | — | — | — | — | 1.088556E−18 |

| Surface # | 18 | 19 | 20 | 21 | 22 |
|---|---|---|---|---|---|
| k = | −9.041460E+00 | −1.197930E+00 | −5.732450E−02 | 7.513300E−01 | −8.264520E−01 |
| A4 = | −8.605956E−03 | −3.308647E−02 | −2.138098E−02 | −3.110637E−02 | −2.829706E−02 |
| A6 = | −1.858252E−03 | 3.398592E−03 | 7.884538E−04 | 3.832288E−03 | 4.632260E−03 |
| A8 = | 6.413181E−04 | 3.643203E−04 | 9.122518E−04 | 1.579642E−04 | −5.524901E−04 |
| A10 = | −7.761374E−05 | −1.662866E−04 | −2.702842E−04 | −9.160913E−05 | 5.020718E−05 |
| A12 = | −1.038677E−06 | 2.359823E−05 | 4.075546E−05 | 1.195370E−05 | −3.681535E−06 |
| A14 = | 1.569454E−06 | −1.895440E−06 | −3.997724E−06 | −9.033711E−07 | 2.193009E−07 |
| A16 = | −2.207653E−07 | 9.724898E−08 | 2.745963E−07 | 4.557602E−08 | −1.031663E−08 |
| A18 = | 1.590832E−08 | −3.312222E−09 | −1.350606E−08 | −1.608710E−09 | 3.685539E−10 |
| A20 = | −6.546796E−10 | 7.475882E−11 | 4.738687E−10 | 4.013795E−11 | −9.601189E−12 |
| A22 = | 1.461987E−11 | −1.074625E−12 | −1.157037E−11 | −6.966709E−13 | 1.744372E−13 |
| A24 = | −1.377869E−13 | 8.883435E−15 | 1.865578E−13 | 8.022902E−15 | −2.077610E−15 |
| A26 = | — | −3.195799E−17 | −1.783023E−15 | −5.517664E−17 | 1.450900E−17 |
| A28 = | — | — | 7.638887E−18 | 1.716028E−19 | −4.489793E−20 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 8.67 | CTmax/CTmin | 3.59 |
| Fno | 1.95 | |R13/CT5| | 18.96 |
| HFOV [deg.] | 42.5 | f/R16 | 1.94 |
| V6 | 20.4 | f/R20 | 1.33 |
| (V2 + V3)/V1 | 0.7 | (R18 + R19)/(R18 − R19) | −0.45 |
| V5 + V6 | 43.9 | f/f1 | 1.16 |
| Vmin | 18.4 | f/f2 | −0.38 |
| V1/N1 | 36.30 | f/f8 | −0.33 |

-continued

| 7th Embodiment | | | |
|---|---|---|---|
| V2/N2 | 10.90 | f/f9 | 0.50 |
| V3/N3 | 10.90 | f10/f9 | −0.51 |
| V4/N4 | 36.26 | \|f/f3\| + \|f/f5\| + \|f/f6\| + \|f/f7\| + \|f/f8\| | 0.98 |
| V5/N5 | 14.34 | Y102/Y32 | 3.57 |
| V6/N6 | 12.29 | TL [mm] | 9.98 |
| V7/N7 | 14.34 | TL/f | 1.15 |
| V8/N8 | 17.83 | TL/ImgH | 1.22 |
| V9/N9 | 36.26 | ImgH/BL | 7.37 |
| V10/N10 | 36.48 | EPD/BL | 4.02 |
| (Vi/Ni)min | 10.90 | BL/TD | 0.12 |
| Nmax | 1.686 | SD/TD | 0.90 |
| CT4/CT3 | 1.813 | f/EPD | 1.95 |
| T910/CT1 | 0.89 | ImgH [mm] | 8.17 |
| ΣCT/TD | 0.61 | — | — |

8th Embodiment

Figure 15:
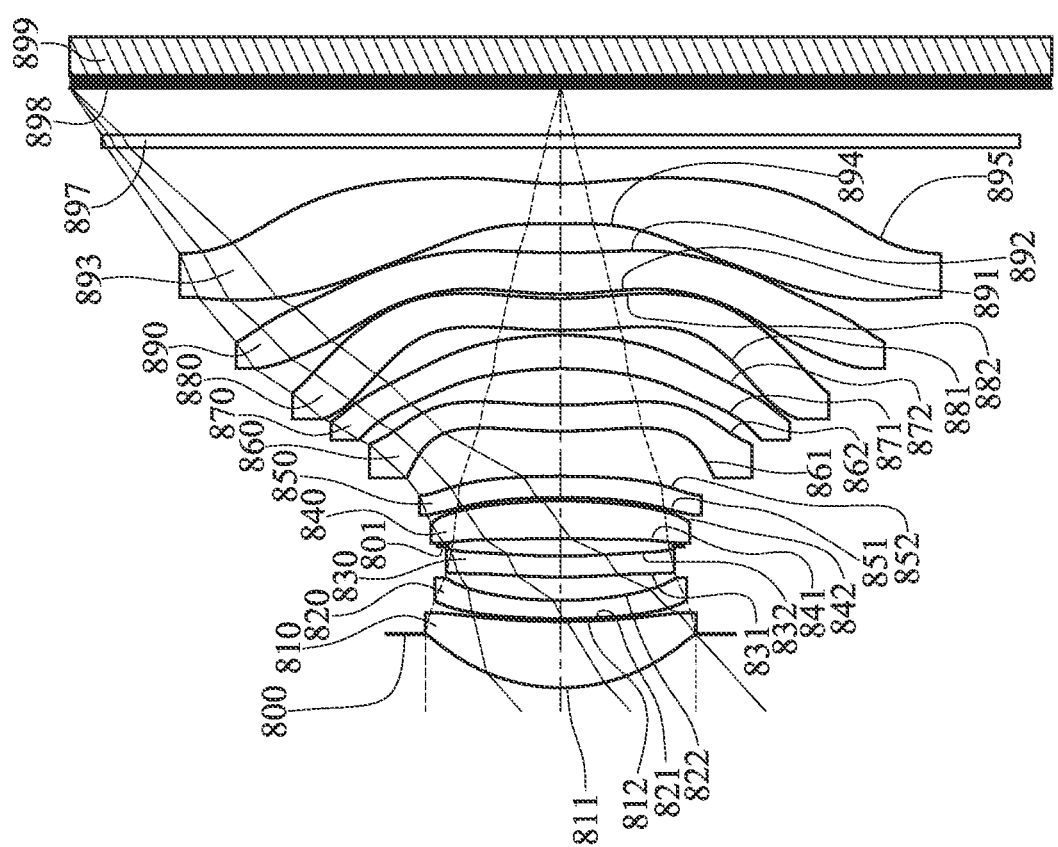
FIG. 15 is a schematic view of an image capturing unit according to the 8th embodiment of the present disclosure.
Figure 16:
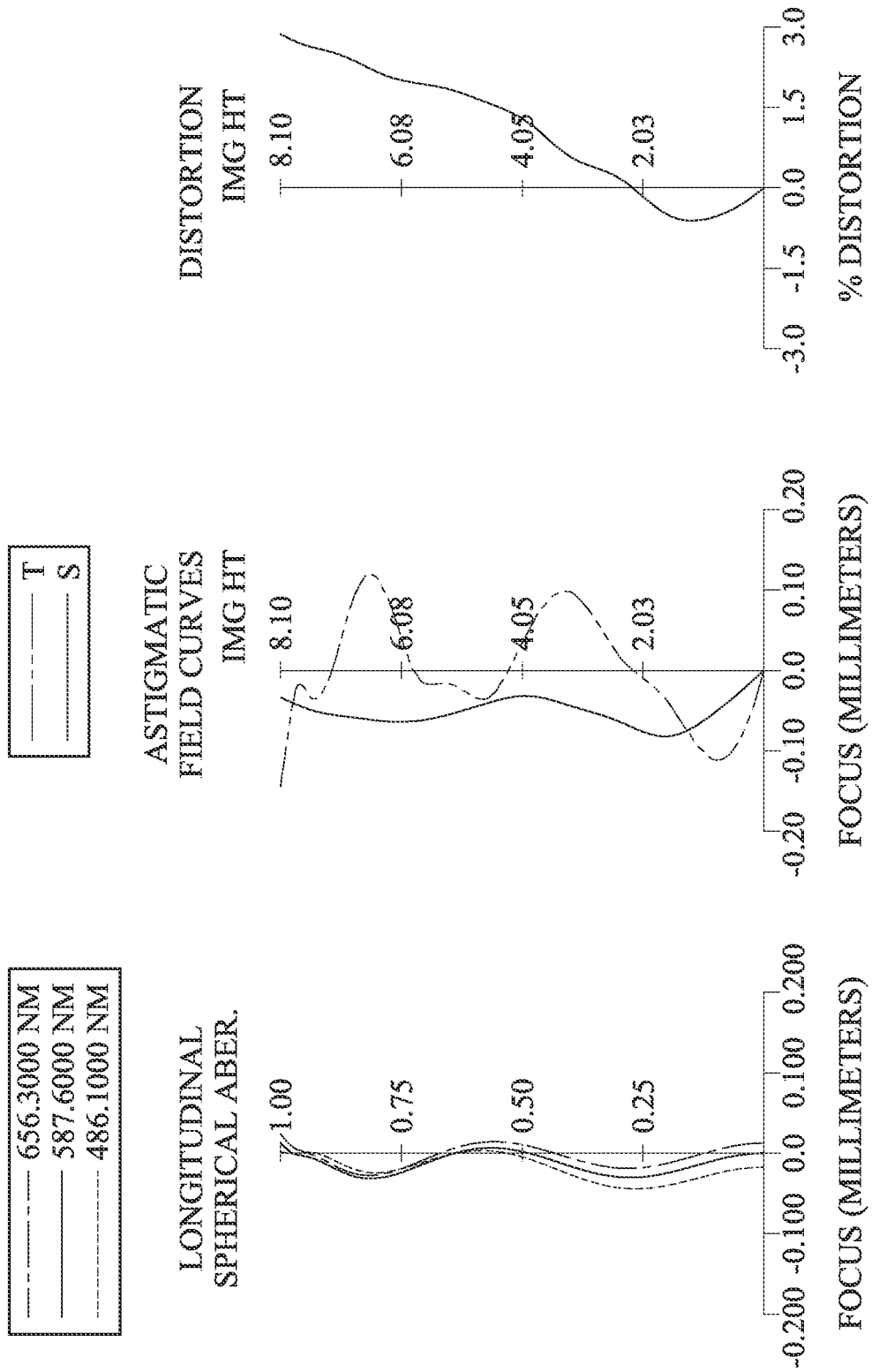
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging system (its reference numeral is omitted) of the present disclosure and an image sensor 899. The optical imaging system includes, in order from an object side to an image side along an optical path, an aperture stop 800, a first lens element 810, a second lens element 820, a third lens element 830, a stop 801, a fourth lens element 840, a fifth lens element 850, a sixth lens element 860, a seventh lens element 870, an eighth lens element 880, a ninth lens element 890, a tenth lens element 893, a filter 897 and an image surface 898. The optical imaging system includes ten lens elements (810, 820, 830, 840, 850, 860, 870, 880, 890 and 893) with no additional lens element disposed between each of the adjacent ten lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric. The image-side surface 812 of the first lens element 810 has at least one inflection point.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The object-side surface 831 of the third lens element 830 has at least one inflection point. The image-side surface 832 of the third lens element 830 has at least one inflection point.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. The object-side surface 851 of the fifth lens element 850 has at least one inflection point. The image-side surface 852 of the fifth lens element 850 has at least one inflection point.

The sixth lens element 860 with positive refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The object-side surface 861 of the sixth lens element 860 has at least one inflection point. The image-side surface 862 of the sixth lens element 860 has at least one inflection point.

The seventh lens element 870 with positive refractive power has an object-side surface 871 being concave in a paraxial region thereof and an image-side surface 872 being convex in a paraxial region thereof. The seventh lens element 870 is made of plastic material and has the object-side surface 871 and the image-side surface 872 being both aspheric. The object-side surface 871 of the seventh lens element 870 has at least one inflection point. The image-side surface 872 of the seventh lens element 870 has at least one inflection point.

The eighth lens element 880 with negative refractive power has an object-side surface 881 being convex in a paraxial region thereof and an image-side surface 882 being concave in a paraxial region thereof. The eighth lens element 880 is made of plastic material and has the object-side surface 881 and the image-side surface 882 being both aspheric. The object-side surface 881 of the eighth lens element 880 has at least one inflection point. The image-side surface 882 of the eighth lens element 880 has at least one inflection point. The image-side surface 882 of the eighth lens element 880 has at least one critical point in an off-axis region thereof.

The ninth lens element 890 with positive refractive power has an object-side surface 891 being convex in a paraxial region thereof and an image-side surface 892 being concave in a paraxial region thereof. The ninth lens element 890 is made of plastic material and has the object-side surface 891 and the image-side surface 892 being both aspheric. The object-side surface 891 of the ninth lens element 890 has at least one inflection point. The image-side surface 892 of the ninth lens element 890 has at least one inflection point. The image-side surface 892 of the ninth lens element 890 has at least one critical point in an off-axis region thereof.

The tenth lens element 893 with negative refractive power has an object-side surface 894 being concave in a paraxial region thereof and an image-side surface 895 being concave in a paraxial region thereof. The tenth lens element 893 is made of plastic material and has the object-side surface 894 and the image-side surface 895 being both aspheric. The object-side surface 894 of the tenth lens element 893 has at least one inflection point. The image-side surface 895 of the tenth lens element 893 has at least one inflection point. The image-side surface 895 of the tenth lens element 893 has at least one critical point in an off-axis region thereof.

The filter 897 is made of glass material and located between the tenth lens element 893 and the image surface 898, and will not affect the focal length of the optical imaging system. The image sensor 899 is disposed on or near the image surface 898 of the optical imaging system.

The detailed optical data of the 8th embodiment are shown in Table 15 and the aspheric surface data are shown in Table 16 below.

TABLE 15

8th Embodiment
f = 8.72 mm, Fno = 1.95, HFOV = 42.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.8861 | | | | |
| 2 | Lens 1 | 3.112 | (ASP) | 1.0931 | Plastic | 1.545 | 56.1 | 7.41 |
| 3 | | 11.914 | (ASP) | 0.0500 | | | | |
| 4 | Lens 2 | 13.274 | (ASP) | 0.3000 | Plastic | 1.686 | 18.4 | −21.19 |
| 5 | | 6.875 | (ASP) | 0.3866 | | | | |
| 6 | Lens 3 | 9.424 | (ASP) | 0.3446 | Plastic | 1.740 | 16.0 | 306.13 |
| 7 | | 9.680 | (ASP) | 0.1586 | | | | |
| 8 | Stop | Plano | | 0.1272 | | | | |
| 9 | Lens 4 | −165.889 | (ASP) | 0.6271 | Plastic | 1.544 | 56.0 | 18.27 |
| 10 | | −9.389 | (ASP) | 0.0588 | | | | |
| 11 | Lens 5 | −10.585 | (ASP) | 0.3505 | Plastic | 1.660 | 20.4 | −42.51 |
| 12 | | −17.222 | (ASP) | 0.7457 | | | | |
| 13 | Lens 6 | 8.243 | (ASP) | 0.4298 | Plastic | 1.639 | 23.5 | 716.72 |
| 14 | | 8.224 | (ASP) | 0.6036 | | | | |
| 15 | Lens 7 | −5.537 | (ASP) | 0.5536 | Plastic | 1.544 | 56.0 | 1237.57 |
| 16 | | −5.685 | (ASP) | 0.0798 | | | | |
| 17 | Lens 8 | 7.339 | (ASP) | 0.5273 | Plastic | 1.587 | 28.3 | −109.86 |
| 18 | | 6.414 | (ASP) | 0.0734 | | | | |
| 19 | Lens 9 | 6.317 | (ASP) | 0.6814 | Plastic | 1.544 | 56.0 | 27.35 |
| 20 | | 10.560 | (ASP) | 0.4851 | | | | |
| 21 | Lens 10 | −30.522 | (ASP) | 0.6563 | Plastic | 1.534 | 56.0 | −8.36 |
| 22 | | 5.269 | (ASP) | 0.6000 | | | | |
| 23 | Filter | Plano | | 0.2100 | Glass | 1.517 | 64.2 | — |
| 24 | | Plano | | 0.7755 | | | | |
| 25 | Image | Plano | | — | | | | |

Note:
Reference wavelength is 587.6 nm (d-line).
An effective radius of the stop 801 (Surface 8) is 1.870 mm.

TABLE 16

Aspheric Coefficients

| Surface # | 2 | 3 | 4 | 5 | 6 |
|---|---|---|---|---|---|
| k = | −6.554861E−01 | −4.738527E+01 | −2.506529E+01 | 5.188208E+00 | 4.006498E+00 |
| A4 = | 2.741177E−03 | 8.382871E−04 | 2.506337E−03 | 8.185416E−04 | −1.423550E−02 |
| A6 = | 2.831518E−04 | 2.493107E−03 | 2.909641E−03 | −1.691453E−04 | 3.205859E−05 |
| A8 = | −6.692500E−05 | −1.744085E−03 | −1.225851E−03 | 1.239364E−03 | −2.970477E−05 |
| A10 = | 2.806464E−05 | 5.497855E−04 | 2.564856E−04 | −8.482347E−04 | −3.373005E−05 |
| A12 = | −9.254249E−06 | −9.609622E−05 | 5.335204E−06 | 3.050545E−04 | 1.049892E−04 |
| A14 = | 1.555859E−06 | 8.105182E−06 | −7.499976E−06 | −5.027051E−05 | −2.369982E−05 |
| A16 = | −2.015964E−07 | −2.783898E−07 | 7.180567E−07 | 3.469337E−06 | 1.389713E−06 |

| Surface # | 7 | 9 | 10 | 11 | 12 |
|---|---|---|---|---|---|
| k = | −7.142685E+00 | −9.891317E+01 | 4.363440E+00 | −5.226089E+01 | −4.349331E+01 |
| A4 = | −9.127036E−03 | 1.404984E−03 | 8.454286E−03 | −2.964930E−03 | −1.255088E−02 |
| A6 = | −1.167121E−03 | −5.984338E−03 | −8.361889E−03 | −9.447672E−03 | 1.001943E−02 |
| A8 = | 7.855806E−04 | 5.790048E−03 | 2.195422E−03 | 7.530998E−03 | −1.301833E−02 |
| A10 = | −3.420683E−04 | −4.303918E−03 | 1.348491E−03 | −3.859812E−03 | 9.088328E−03 |
| A12 = | 1.775238E−04 | 1.934150E−03 | −1.616526E−03 | 1.339220E−03 | −3.814833E−03 |
| A14 = | −2.668896E−05 | −5.144306E−04 | 7.146935E−04 | −3.109487E−04 | 9.995539E−04 |
| A16 = | 7.995478E−07 | 7.691099E−05 | −1.675335E−04 | 4.870250E−05 | −1.612742E−04 |
| A18 = | — | −5.042340E−06 | 2.090496E−05 | −4.618437E−06 | 1.480058E−05 |
| A20 = | — | — | −1.124390E−06 | 1.877567E−07 | −5.920293E−07 |

| Surface # | 13 | 14 | 15 | 16 | 17 |
|---|---|---|---|---|---|
| k = | 2.503949E+00 | 1.641016E+00 | 4.701343E−01 | 2.729482E−01 | −1.361074E+01 |
| A4 = | −1.971354E−02 | −1.857238E−02 | 1.625284E−02 | −1.050354E−03 | −2.424525E−02 |
| A6 = | 2.460926E−03 | 2.933595E−03 | −7.018385E−03 | 5.837379E−03 | 8.177872E−03 |
| A8 = | −1.474061E−03 | −1.923655E−03 | 1.363477E−03 | −5.059857E−03 | −3.456043E−03 |
| A10 = | 4.058394E−04 | 6.765036E−04 | −7.491757E−04 | 1.705656E−03 | 1.108167E−03 |
| A12 = | 6.596709E−06 | −1.381937E−04 | 3.617878E−04 | −3.075668E−04 | −2.793622E−04 |
| A14 = | −6.082107E−05 | 1.467398E−05 | −8.773535E−05 | 3.320277E−05 | 4.943888E−05 |
| A16 = | 2.490018E−05 | −4.382258E−07 | 1.177165E−05 | −2.203600E−06 | −5.755709E−06 |

TABLE 16-continued

| Aspheric Coefficients | | | | |
|---|---|---|---|---|
| A18 = | −5.444939E−06 | −5.089777E−08 | −9.057108E−07 | 8.690136E−08 | 4.289321E−07 |
| A20 = | 7.180788E−07 | 4.606300E−09 | 3.766235E−08 | −1.814976E−09 | −1.967305E−08 |
| A22 = | −5.413802E−08 | −1.071623E−10 | −6.580248E−10 | 1.448961E−11 | 5.056472E−10 |
| A24 = | 1.811097E−09 | — | — | — | −5.575290E−12 |

| Surface # | 18 | 19 | 20 | 21 | 22 |
|---|---|---|---|---|---|
| k = | −1.299327E+01 | −1.174723E+00 | 5.674582E−01 | 0.000000E+00 | −9.985711E−01 |
| A4 = | −1.502938E−02 | −1.063158E−02 | −2.030405E−02 | −3.945540E−02 | −3.636026E−02 |
| A6 = | −4.341781E−04 | −9.545082E−03 | 5.982365E−03 | 6.950861E−03 | 7.636099E−03 |
| A8 = | −1.805710E−04 | 4.383052E−03 | −3.003068E−03 | −1.662413E−04 | −1.083269E−03 |
| A10 = | 7.299230E−04 | −1.096181E−03 | 9.287803E−04 | −1.074010E−04 | 1.064049E−04 |
| A12 = | −3.561114E−04 | 1.918716E−04 | −1.695059E−04 | 1.885770E−05 | −7.625869E−06 |
| A14 = | 8.674323E−05 | −2.463292E−05 | 1.975288E−05 | −1.673953E−06 | 4.155072E−07 |
| A16 = | −1.289654E−05 | 2.306389E−06 | −1.547990E−06 | 9.503436E−08 | −1.764267E−08 |
| A18 = | 1.258010E−06 | −1.548601E−07 | 8.371232E−08 | −3.697094E−09 | 5.832699E−10 |
| A20 = | −8.252751E−08 | 7.311961E−09 | −3.138053E−09 | 1.007459E−10 | −1.459724E−11 |
| A22 = | 3.618693E−09 | −2.359712E−10 | 8.016554E−11 | −1.915295E−12 | 2.632662E−13 |
| A24 = | −1.019237E−10 | 4.945684E−12 | −1.331919E−12 | 2.469491E−14 | −3.186584E−15 |
| A26 = | 1.670154E−12 | −6.061478E−14 | 1.296855E−14 | −2.027981E−16 | 2.297768E−17 |
| A28 = | −1.211901E−14 | 3.296356E−16 | −5.608784E−17 | 9.295344E−19 | −7.430518E−20 |
| A30 = | — | — | — | −1.693842E−21 | 8.362212E−25 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 8.72 | CTmax/CTmin | 3.64 |
| Fno | 1.95 | |R13/CT5| | 15.80 |
| HFOV [deg.] | 42.1 | f/R16 | 1.36 |
| V6 | 23.5 | f/R20 | 1.66 |
| (V2 + V3)/V1 | 0.6 | (R18 + R19)/(R18 − R19) | −0.49 |
| V5 + V6 | 43.9 | f/f1 | 1.18 |
| Vmin | 16.0 | f/f2 | −0.41 |
| V1/N1 | 36.30 | f/f8 | −0.08 |
| V2/N2 | 10.90 | f/f9 | 0.32 |
| V3/N3 | 9.20 | f10/f9 | −0.31 |
| V4/N4 | 36.26 | |f/f3| + |f/f5| + |f/f6| + |f/f7| + |f/f8| | 0.33 |
| V5/N5 | 12.29 | Y102/Y32 | 3.40 |
| V6/N6 | 14.34 | TL [mm] | 9.92 |
| V7/N7 | 36.26 | TL/f | 1.14 |
| V8/N8 | 17.83 | TL/ImgH | 1.22 |
| V9/N9 | 36.26 | ImgH/BL | 5.11 |
| V10/N10 | 36.48 | EPD/BL | 2.82 |
| (Vi/Ni)min | 9.20 | BL/TD | 0.19 |
| Nmax | 1.740 | SD/TD | 0.89 |
| CT4/CT3 | 1.820 | f/EPD | 1.95 |
| T910/CT1 | 0.44 | ImgH [mm] | 8.10 |
| ΣCT/TD | 0.67 | — | — |

9th Embodiment

Figure 17:
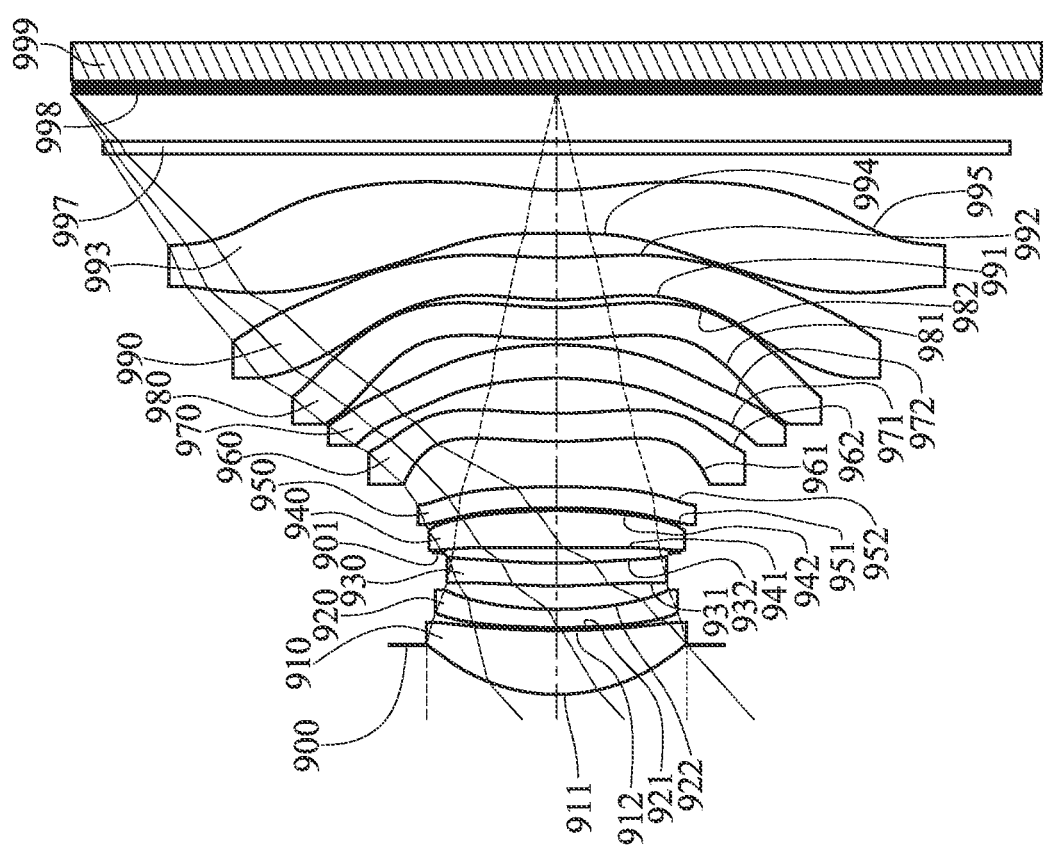
FIG. 17 is a schematic view of an image capturing unit according to the 9th embodiment of the present disclosure.
Figure 18:
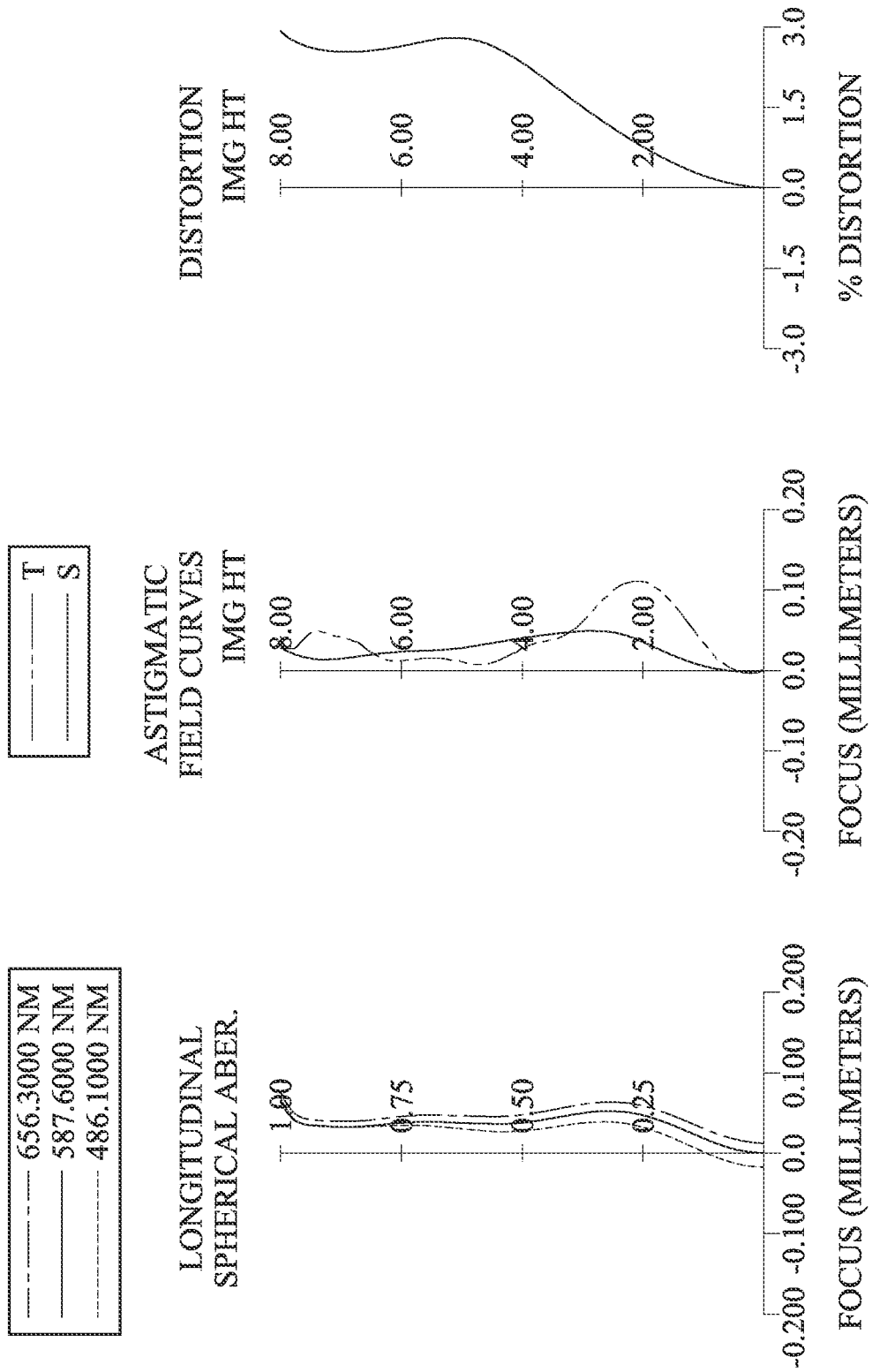
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging system (its reference numeral is omitted) of the present disclosure and an image sensor 999. The optical imaging system includes, in order from an object side to an image side along an optical path, an aperture stop 900, a first lens element 910, a second lens element 920, a third lens element 930, a stop 901, a fourth lens element 940, a fifth lens element 950, a sixth lens element 960, a seventh lens element 970, an eighth lens element 980, a ninth lens element 990, a tenth lens element 993, a filter 997 and an image surface 998. The optical imaging system includes ten lens elements (910, 920, 930, 940, 950, 960, 970, 980, 990 and 993) with no additional lens element disposed between each of the adjacent ten lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has at least one inflection point.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric. The object-side surface 941 of the fourth lens element 940 has at least one inflection point.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The object-side surface 951 of the fifth lens element 950 has at least one inflection point. The image-side surface 952 of the fifth lens element 950 has at least one inflection point.

The sixth lens element 960 with positive refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has at least one inflection point. The image-side surface 962 of the sixth lens element 960 has at least one inflection point.

The seventh lens element 970 with positive refractive power has an object-side surface 971 being concave in a paraxial region thereof and an image-side surface 972 being convex in a paraxial region thereof. The seventh lens element 970 is made of plastic material and has the object-side surface 971 and the image-side surface 972 being both aspheric. The object-side surface 971 of the seventh lens element 970 has at least one inflection point. The image-side surface 972 of the seventh lens element 970 has at least one inflection point.

The eighth lens element 980 with negative refractive power has an object-side surface 981 being convex in a paraxial region thereof and an image-side surface 982 being concave in a paraxial region thereof. The eighth lens element 980 is made of plastic material and has the object-side surface 981 and the image-side surface 982 being both aspheric. The object-side surface 981 of the eighth lens element 980 has at least one inflection point. The image-side surface 982 of the eighth lens element 980 has at least one inflection point. The image-side surface 982 of the eighth lens element 980 has at least one critical point in an off-axis region thereof.

The ninth lens element 990 with positive refractive power has an object-side surface 991 being convex in a paraxial region thereof and an image-side surface 992 being concave in a paraxial region thereof. The ninth lens element 990 is made of plastic material and has the object-side surface 991 and the image-side surface 992 being both aspheric. The object-side surface 991 of the ninth lens element 990 has at least one inflection point. The image-side surface 992 of the ninth lens element 990 has at least one inflection point. The image-side surface 992 of the ninth lens element 990 has at least one critical point in an off-axis region thereof.

The tenth lens element 993 with negative refractive power has an object-side surface 994 being convex in a paraxial region thereof and an image-side surface 995 being concave in a paraxial region thereof. The tenth lens element 993 is made of plastic material and has the object-side surface 994 and the image-side surface 995 being both aspheric. The object-side surface 994 of the tenth lens element 993 has at least one inflection point. The image-side surface 995 of the tenth lens element 993 has at least one inflection point. The image-side surface 995 of the tenth lens element 993 has at least one critical point in an off-axis region thereof.

The filter 997 is made of glass material and located between the tenth lens element 993 and the image surface 998, and will not affect the focal length of the optical imaging system. The image sensor 999 is disposed on or near the image surface 998 of the optical imaging system.

The detailed optical data of the 9th embodiment are shown in Table 17 and the aspheric surface data are shown in Table 18 below.

TABLE 17

9th Embodiment
f = 8.59 mm, Fno = 2.00, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.8241 | | | | |
| 2 | Lens 1 | 3.106 | (ASP) | 1.0573 | Plastic | 1.545 | 56.1 | 7.15 |
| 3 | | 13.520 | (ASP) | 0.0500 | | | | |
| 4 | Lens 2 | 14.343 | (ASP) | 0.3000 | Plastic | 1.686 | 18.4 | −18.74 |
| 5 | | 6.721 | (ASP) | 0.3885 | | | | |
| 6 | Lens 3 | 9.723 | (ASP) | 0.3762 | Plastic | 1.686 | 18.4 | −14234.03 |
| 7 | | 9.561 | (ASP) | 0.1804 | | | | |
| 8 | Stop | Plano | | 0.0797 | | | | |
| 9 | Lens 4 | 150.215 | (ASP) | 0.6069 | Plastic | 1.544 | 56.0 | 17.46 |
| 10 | | −10.125 | (ASP) | 0.0500 | | | | |
| 11 | Lens 5 | −10.726 | (ASP) | 0.3440 | Plastic | 1.566 | 37.4 | −41.88 |
| 12 | | −19.819 | (ASP) | 0.7509 | | | | |
| 13 | Lens 6 | 8.102 | (ASP) | 0.4649 | Plastic | 1.665 | 32.4 | 466.68 |
| 14 | | 8.128 | (ASP) | 0.5823 | | | | |
| 15 | Lens 7 | −5.449 | (ASP) | 0.5511 | Plastic | 1.544 | 56.0 | 905.22 |
| 16 | | −5.581 | (ASP) | 0.0938 | | | | |
| 17 | Lens 8 | 7.175 | (ASP) | 0.5217 | Plastic | 1.587 | 28.3 | −101.32 |
| 18 | | 6.230 | (ASP) | 0.1298 | | | | |
| 19 | Lens 9 | 6.055 | (ASP) | 0.6983 | Plastic | 1.544 | 56.0 | 27.46 |
| 20 | | 9.768 | (ASP) | 0.3975 | | | | |
| 21 | Lens 10 | 3123.759 | (ASP) | 0.7159 | Plastic | 1.534 | 56.0 | −8.71 |
| 22 | | 4.647 | (ASP) | 0.6000 | | | | |
| 23 | Filter | Plano | | 0.2100 | Glass | 1.517 | 64.2 | — |
| 24 | | Plano | | 0.7856 | | | | |
| 25 | Image | Plano | | — | | | | |

Note:
Reference wavelength is 587.6 nm (d-line).
An effective radius of the stop 901 (Surface 8) is 1.870 mm.

TABLE 18

| Aspheric Coefficients | | | | | |
|---|---|---|---|---|---|
| Surface # | 2 | 3 | 4 | 5 | 6 |
| k = | -6.503445E-01 | -4.854326E+01 | -2.578915E+01 | 2.031429E+00 | 3.195245E+00 |
| A4 = | 2.584702E-03 | 1.527070E-03 | 2.316874E-03 | -2.026984E-04 | -1.287490E-02 |
| A6 = | 6.616799E-04 | 9.629253E-04 | 2.831153E-03 | 1.939650E-03 | -3.658143E-03 |
| A8 = | -4.197524E-04 | -1.705629E-04 | -8.555050E-04 | -2.835312E-04 | 3.662937E-03 |
| A10 = | 2.071809E-04 | -3.056133E-04 | -8.136461E-05 | -2.548440E-04 | -2.068812E-03 |
| A12 = | -6.023511E-05 | 1.574402E-04 | 1.275620E-04 | 1.807933E-04 | 7.398365E-04 |
| A14 = | 9.212541E-06 | -3.007983E-05 | -2.761689E-05 | -4.019564E-05 | -1.310273E-04 |
| A16 = | -6.755404E-07 | 2.003611E-06 | 1.951482E-06 | 3.622473E-06 | 9.240675E-06 |
| Surface # | 7 | 9 | 10 | 11 | 12 |
| k = | -7.048151E+00 | 4.420865E+01 | 4.690962E+00 | -5.541954E+01 | -4.754482E+01 |
| A4 = | -8.984303E-03 | -4.948486E-03 | 1.153965E-04 | -1.575551E-02 | -1.098540E-02 |
| A6 = | -1.426526E-03 | 1.016641E-02 | 8.842147E-03 | 2.236735E-02 | 3.701633E-03 |
| A8 = | 1.057355E-03 | -1.470564E-02 | -1.497488E-02 | -2.847934E-02 | -3.141747E-03 |
| A10 = | -4.538162E-04 | 1.097317E-02 | 1.205726E-02 | 2.076914E-02 | 1.777198E-03 |
| A12 = | 2.108024E-04 | -4.918080E-03 | -6.098018E-03 | -9.562177E-03 | -7.739342E-04 |
| A14 = | -3.525493E-05 | 1.309958E-03 | 1.974208E-03 | 2.817244E-03 | 2.431455E-04 |
| A16 = | 1.931801E-06 | -1.895434E-04 | -3.925415E-04 | -5.099880E-04 | -4.957279E-05 |
| A18 = | — | 1.141574E-05 | 4.351158E-05 | 5.151269E-05 | 5.773727E-06 |
| A20 = | — | — | -2.075072E-06 | -2.224593E-06 | -2.846170E-07 |
| Surface # | 13 | 14 | 15 | 16 | 17 |
| k = | 2.169779E+00 | 1.922774E-01 | -3.646707E-01 | -4.278608E-01 | -1.354982E+01 |
| A4 = | -1.953072E-02 | -1.879979E-02 | 1.657658E-02 | 1.880538E-03 | -1.937086E-02 |
| A6 = | -2.215022E-04 | 3.428781E-03 | -8.026974E-03 | 2.176551E-03 | 3.328607E-03 |
| A8 = | 3.903393E-03 | -2.152888E-03 | 2.038808E-03 | -3.238949E-03 | -8.640725E-04 |
| A10 = | -4.836455E-03 | 7.133680E-04 | -1.008932E-03 | 1.223942E-03 | 2.478211E-04 |
| A12 = | 3.124475E-03 | -1.334347E-04 | 4.184337E-04 | -2.322929E-04 | -8.764613E-05 |
| A14 = | -1.271213E-03 | 1.199274E-05 | -9.469853E-05 | 2.602274E-05 | 2.017212E-05 |
| A16 = | 3.384879E-04 | -3.551962E-08 | 1.223615E-05 | -1.794000E-06 | -2.709007E-06 |
| A18 = | -5.918730E-05 | -7.759683E-08 | -9.205269E-07 | 7.416197E-08 | 2.172949E-07 |
| A20 = | 6.552892E-06 | 5.247522E-09 | 3.782021E-08 | -1.655032E-09 | -1.031904E-08 |
| A22 = | -4.160483E-07 | -1.050033E-10 | -6.586361E-10 | 1.476447E-11 | 2.682680E-10 |
| A24 = | 1.152545E-08 | — | — | — | -2.946450E-12 |
| Surface # | 18 | 19 | 20 | 21 | 22 |
| k = | -1.383024E+01 | -1.152302E+00 | 6.439482E-01 | 1.249330E+01 | -1.062896E+00 |
| A4 = | -1.223564E-02 | -1.807218E-02 | -1.608758E-02 | -4.021534E-02 | -3.731853E-02 |
| A6 = | -7.106197E-03 | -5.749678E-03 | 3.829822E-04 | 7.472806E-03 | 8.048044E-03 |
| A8 = | 4.966295E-03 | 2.404832E-03 | -3.419334E-04 | -3.197972E-04 | -1.190797E-03 |
| A10 = | -1.514244E-03 | -3.886196E-04 | 2.400726E-04 | -8.302337E-05 | 1.226101E-04 |
| A12 = | 2.686973E-04 | 3.119208E-05 | -5.700539E-05 | 1.632838E-05 | -9.199964E-06 |
| A14 = | -3.024712E-05 | -8.335114E-07 | 7.334922E-06 | -1.484256E-06 | 5.216888E-07 |
| A16 = | 2.230609E-06 | -6.685453E-08 | -5.904475E-07 | 8.409843E-08 | -2.279905E-08 |
| A18 = | -1.075710E-07 | 7.558087E-09 | 3.148362E-08 | -3.199145E-09 | 7.651462E-10 |
| A20 = | 3.267191E-09 | -3.420902E-10 | -1.131224E-09 | 8.297181E-11 | -1.920849E-11 |
| A22 = | -5.663780E-11 | 8.456160E-12 | 2.705199E-11 | -1.434255E-12 | 3.449504E-13 |
| A24 = | 4.263014E-13 | -1.118234E-13 | -4.108505E-13 | 1.530371E-14 | -4.144121E-15 |
| A26 = | — | 6.196969E-16 | 3.554428E-15 | -7.945076E-17 | 2.964202E-17 |
| A28 = | — | — | -1.313128E-17 | -3.901496E-20 | -9.514202E-20 |
| A30 = | — | — | — | 1.726478E-21 | 8.820219E-25 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 8.59 | CTmax/CTmin | 3.52 |
| Fno | 2.00 | |R13/CT5| | 15.84 |
| HFOV [deg.] | 42.0 | f/R16 | 1.38 |
| V6 | 32.4 | f/R20 | 1.85 |
| (V2 + V3)/V1 | 0.7 | (R18 + R19)/(R18 − R19) | -1.01 |
| V5 + V6 | 69.9 | f/f1 | 1.20 |
| Vmin | 18.4 | f/f2 | -0.46 |
| V1/N1 | 36.30 | f/f8 | -0.08 |
| V2/N2 | 10.90 | f/f9 | 0.31 |
| V3/N3 | 10.90 | f10/f9 | -0.32 |
| V4/N4 | 36.26 | |f/f3| + |f/f5| + |f/f6| + |f/f7| + |f/f8| | 0.32 |
| V5/N5 | 23.91 | Y102/Y32 | 3.56 |
| V6/N6 | 19.48 | TL [mm] | 9.93 |
| V7/N7 | 36.26 | TL/f | 1.16 |
| V8/N8 | 17.83 | TL/ImgH | 1.24 |
| V9/N9 | 36.26 | ImgH/BL | 5.01 |

-continued

9th Embodiment

| | | | |
|---|---|---|---|
| V10/N10 | 36.48 | EPD/BL | 2.69 |
| (Vi/Ni)min | 10.90 | BL/TD | 0.19 |
| Nmax | 1.686 | SD/TD | 0.90 |
| CT4/CT3 | 1.613 | f/EPD | 2.00 |
| T910/CT1 | 0.38 | ImgH [mm] | 8.00 |
| ΣCT/TD | 0.68 | — | — |

10th Embodiment

Figure 19:
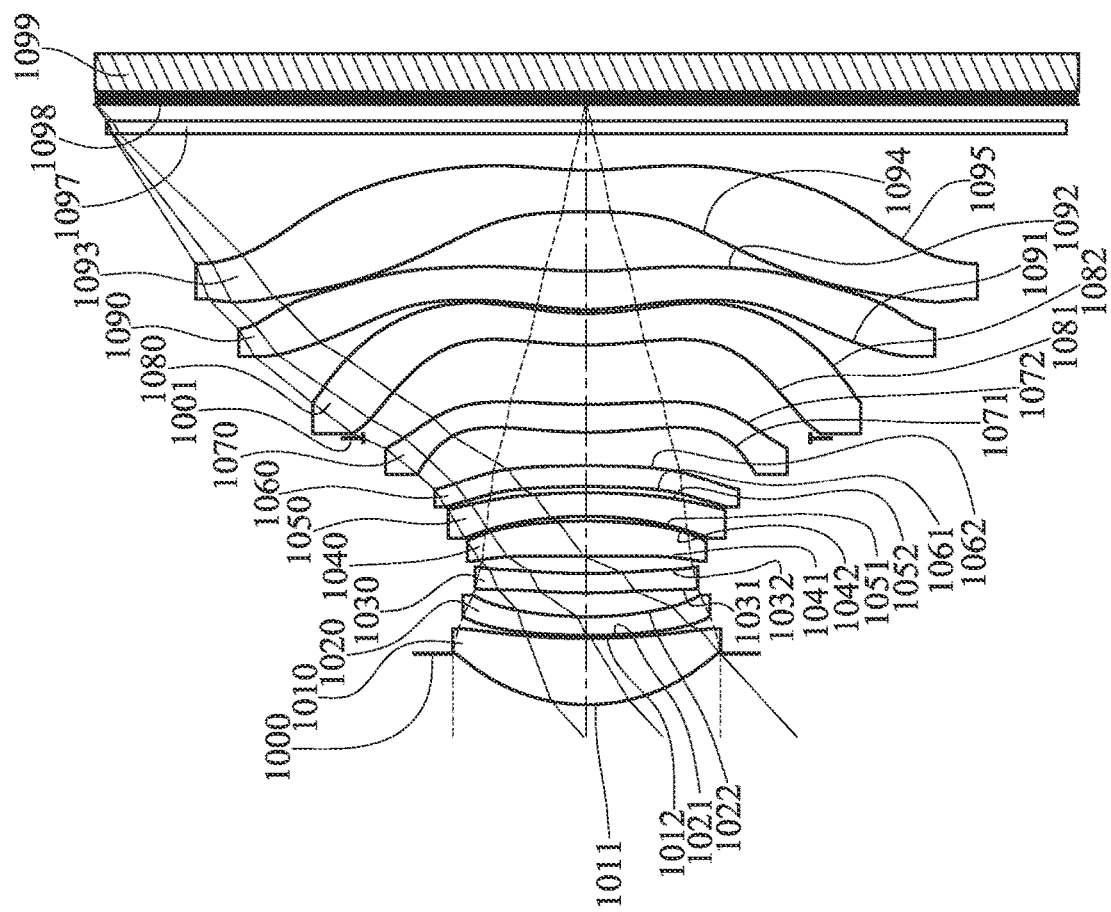
FIG. 19 is a schematic view of an image capturing unit according to the 10th embodiment of the present disclosure.
Figure 20:
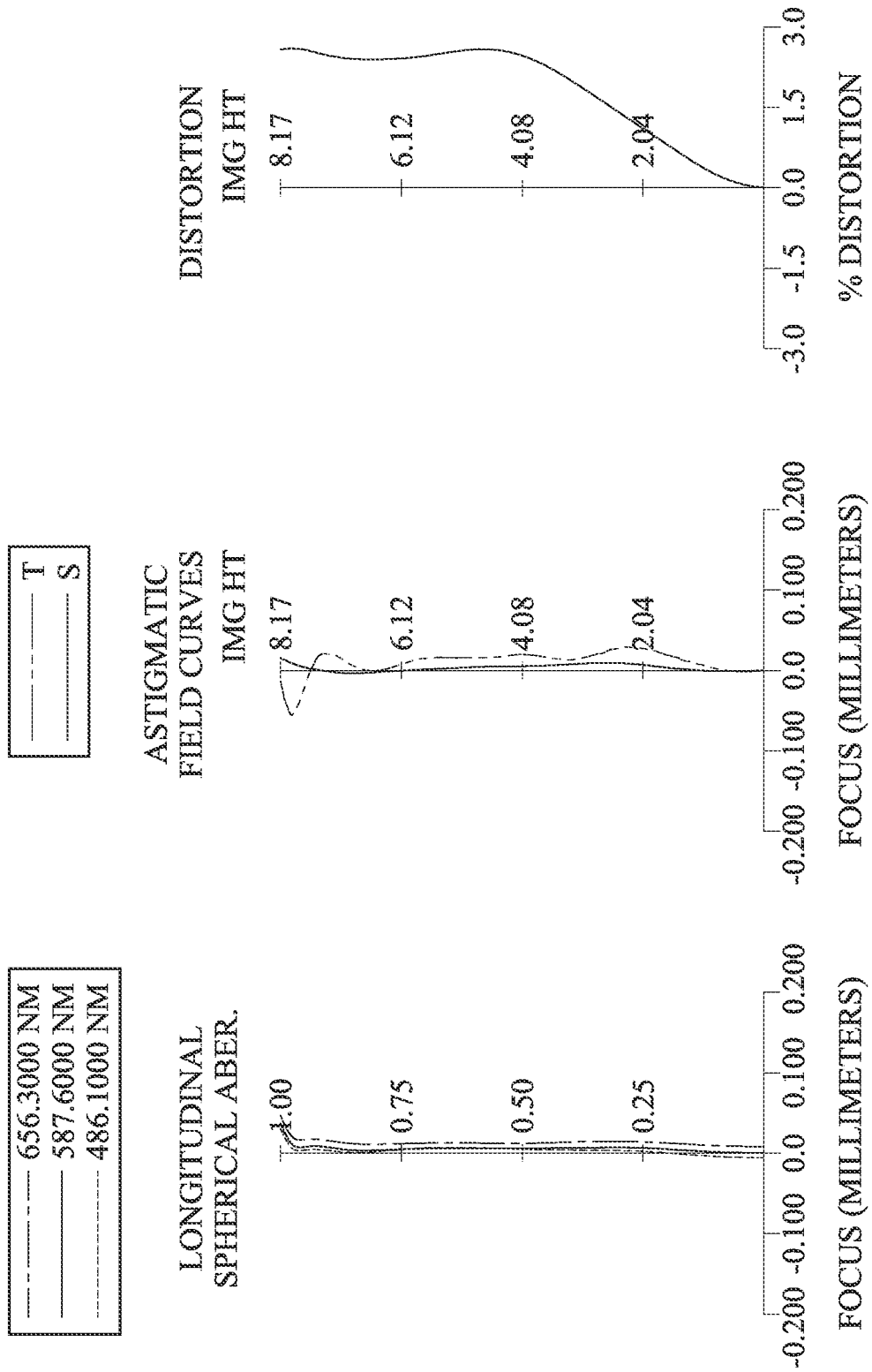
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging system (its reference numeral is omitted) of the present disclosure and an image sensor 1099. The optical imaging system includes, in order from an object side to an image side along an optical path, an aperture stop 1000, a first lens element 1010, a second lens element 1020, a third lens element 1030, a fourth lens element 1040, a fifth lens element 1050, a sixth lens element 1060, a seventh lens element 1070, a stop 1001, an eighth lens element 1080, a ninth lens element 1090, a tenth lens element 1093, a filter 1097 and an image surface 1098. The optical imaging system includes ten lens elements (1010, 1020, 1030, 1040, 1050, 1060, 1070, 1080, 1090 and 1093) with no additional lens element disposed between each of the adjacent ten lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The image-side surface 1012 of the first lens element 1010 has at least one inflection point.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The object-side surface 1031 of the third lens element 1030 has at least one inflection point. The image-side surface 1032 of the third lens element 1030 has at least one inflection point.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric. The object-side surface 1041 of the fourth lens element 1040 has at least one inflection point.

The fifth lens element 1050 with negative refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric.

The sixth lens element 1060 with negative refractive power has an object-side surface 1061 being concave in a paraxial region thereof and an image-side surface 1062 being convex in a paraxial region thereof. The sixth lens element 1060 is made of plastic material and has the object-side surface 1061 and the image-side surface 1062 being both aspheric. The object-side surface 1061 of the sixth lens element 1060 has at least one inflection point. The image-side surface 1062 of the sixth lens element 1060 has at least one inflection point.

The seventh lens element 1070 with positive refractive power has an object-side surface 1071 being convex in a paraxial region thereof and an image-side surface 1072 being concave in a paraxial region thereof. The seventh lens element 1070 is made of plastic material and has the object-side surface 1071 and the image-side surface 1072 being both aspheric. The object-side surface 1071 of the seventh lens element 1070 has at least one inflection point. The image-side surface 1072 of the seventh lens element 1070 has at least one inflection point.

The eighth lens element 1080 with negative refractive power has an object-side surface 1081 being convex in a paraxial region thereof and an image-side surface 1082 being concave in a paraxial region thereof. The eighth lens element 1080 is made of plastic material and has the object-side surface 1081 and the image-side surface 1082 being both aspheric. The object-side surface 1081 of the eighth lens element 1080 has at least one inflection point. The image-side surface 1082 of the eighth lens element 1080 has at least one inflection point. The image-side surface 1082 of the eighth lens element 1080 has at least one critical point in an off-axis region thereof.

The ninth lens element 1090 with positive refractive power has an object-side surface 1091 being convex in a paraxial region thereof and an image-side surface 1092 being concave in a paraxial region thereof. The ninth lens element 1090 is made of plastic material and has the object-side surface 1091 and the image-side surface 1092 being both aspheric. The object-side surface 1091 of the ninth lens element 1090 has at least one inflection point. The image-side surface 1092 of the ninth lens element 1090 has at least one inflection point. The image-side surface 1092 of the ninth lens element 1090 has at least one critical point in an off-axis region thereof.

The tenth lens element 1093 with negative refractive power has an object-side surface 1094 being concave in a paraxial region thereof and an image-side surface 1095 being concave in a paraxial region thereof. The tenth lens element 1093 is made of plastic material and has the object-side surface 1094 and the image-side surface 1095 being both aspheric. The object-side surface 1094 of the tenth lens element 1093 has at least one inflection point. The image-side surface 1095 of the tenth lens element 1093 has at least one inflection point. The image-side surface 1095 of the tenth lens element 1093 has at least one critical point in an off-axis region thereof.

The filter 1097 is made of glass material and located between the tenth lens element 1093 and the image surface 1098, and will not affect the focal length of the optical imaging system. The image sensor 1099 is disposed on or near the image surface 1098 of the optical imaging system.

The detailed optical data of the 10th embodiment are shown in Table 19 and the aspheric surface data are shown in Table 20 below.

TABLE 19

10th Embodiment
f = 8.67 mm, Fno = 1.95, HFOV = 42.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.8480 | | | | |
| 2 | Lens 1 | 3.160 | (ASP) | 1.1020 | Plastic | 1.545 | 56.1 | 7.59 |
| 3 | | 11.731 | (ASP) | 0.0500 | | | | |
| 4 | Lens 2 | 10.684 | (ASP) | 0.3100 | Plastic | 1.686 | 18.4 | −25.48 |
| 5 | | 6.553 | (ASP) | 0.3960 | | | | |
| 6 | Lens 3 | 9.385 | (ASP) | 0.3200 | Plastic | 1.686 | 18.4 | −303.39 |
| 7 | | 8.856 | (ASP) | 0.2920 | | | | |
| 8 | Lens 4 | 200.000 | (ASP) | 0.5750 | Plastic | 1.544 | 56.0 | 15.85 |
| 9 | | −9.001 | (ASP) | 0.0800 | | | | |
| 10 | Lens 5 | −6.253 | (ASP) | 0.3900 | Plastic | 1.639 | 23.5 | −21.98 |
| 11 | | −11.550 | (ASP) | 0.1020 | | | | |
| 12 | Lens 6 | −18.244 | (ASP) | 0.3600 | Plastic | 1.660 | 20.4 | −113.82 |
| 13 | | −24.285 | (ASP) | 0.5580 | | | | |
| 14 | Lens 7 | 7.405 | (ASP) | 0.4590 | Plastic | 1.639 | 23.5 | 46.40 |
| 15 | | 9.633 | (ASP) | −0.5600 | | | | |
| 16 | Stop | Plano | | 1.5470 | | | | |
| 17 | Lens 8 | 6.814 | (ASP) | 0.5200 | Plastic | 1.587 | 28.3 | −25.02 |
| 18 | | 4.523 | (ASP) | 0.0630 | | | | |
| 19 | Lens 9 | 4.201 | (ASP) | 0.6400 | Plastic | 1.544 | 56.0 | 17.88 |
| 20 | | 6.999 | (ASP) | 0.9880 | | | | |
| 21 | Lens 10 | −18.883 | (ASP) | 0.7000 | Plastic | 1.534 | 56.0 | −8.79 |
| 22 | | 6.334 | (ASP) | 0.6000 | | | | |
| 23 | Filter | Plano | | 0.2100 | Glass | 1.517 | 64.2 | — |
| 24 | | Plano | | 0.2821 | | | | |
| 25 | Image | Plano | | — | | | | |

Note:
Reference wavelength is 587.6 nm (d-line).
An effective radius of the stop 1001 (Surface 16) is 3.710 mm.

TABLE 20

Aspheric Coefficients

| Surface # | 2 | 3 | 4 | 5 | 6 |
|---|---|---|---|---|---|
| k = | −6.445700E−01 | −4.715630E+01 | −2.640890E+01 | 3.047220E+00 | 2.735100E+00 |
| A4 = | 2.819123E−03 | 2.715819E−04 | 1.265459E−03 | −1.186843E−03 | −1.524300E−02 |
| A6 = | 3.817882E−04 | 2.133853E−03 | 3.232492E−03 | 1.370191E−03 | −7.133553E−04 |
| A8 = | −2.130933E−04 | −8.916343E−04 | −9.407874E−04 | 6.923099E−05 | 1.345456E−03 |
| A10 = | 1.364740E−04 | 7.099017E−05 | 4.062807E−06 | −3.067791E−04 | −8.541747E−04 |
| A12 = | −4.662744E−05 | 4.545934E−05 | 9.650133E−05 | 1.655300E−04 | 3.755188E−04 |
| A14 = | 8.081691E−06 | −1.345477E−05 | −2.247948E−05 | −3.110677E−05 | −7.005391E−05 |
| A16 = | −6.407564E−07 | 1.015459E−06 | 1.663277E−06 | 2.705026E−06 | 4.586470E−06 |

| Surface # | 7 | 8 | 9 | 10 | 11 |
|---|---|---|---|---|---|
| k = | −1.018990E+01 | −9.900000E+01 | 8.816190E+00 | 1.237490E+00 | 5.134780E+00 |
| A4 = | −1.030189E−02 | −1.539265E−03 | 1.551573E−02 | 1.694024E−02 | 6.096617E−03 |
| A6 = | −2.408891E−03 | −4.898441E−03 | −2.62861E−02 | −2.762408E−02 | −2.729561E−04 |
| A8 = | 2.332264E−03 | 3.103012E−03 | 1.476320E−02 | 1.991873E−02 | −1.609688E−02 |
| A10 = | −1.085314E−03 | −2.017708E−03 | −1.471794E−03 | −1.683598E−02 | 2.035947E−02 |
| A12 = | 3.609931E−04 | 8.753378E−04 | −2.355895E−03 | 2.418996E−02 | −1.199527E−02 |
| A14 = | −4.609767E−05 | −2.528474E−04 | 1.260585E−03 | −2.585160E−02 | 3.470962E−03 |
| A16 = | 1.189385E−06 | 4.648940E−05 | −2.966298E−04 | 1.751666E−02 | −1.252041E−04 |
| A18 = | — | −3.809915E−06 | 3.672903E−05 | −7.839313E−03 | −2.775681E−04 |
| A20 = | — | — | −2.012178E−06 | 2.377669E−03 | 1.104016E−04 |
| A22 = | — | — | — | −4.862442E−04 | −2.215125E−05 |
| A24 = | — | — | — | 6.439169E−05 | 2.605787E−06 |
| A26 = | — | — | — | −4.993701E−06 | −1.709687E−07 |
| A28 = | — | — | — | 1.723153E−07 | 4.843052E−09 |

| Surface # | 12 | 13 | 14 | 15 | 17 |
|---|---|---|---|---|---|
| k = | 9.226690E+00 | −1.216360E+01 | 4.065590E+00 | 3.369090E+00 | −7.762320E+00 |
| A4 = | −3.937704E−03 | −1.079527E−02 | −1.865228E−02 | −1.961150E−02 | −9.680193E−03 |
| A6 = | 7.299179E−03 | 4.251354E−03 | 1.370799E−03 | 2.922795E−03 | −1.766477E−03 |
| A8 = | −1.911309E−02 | −5.830716E−03 | 9.319474E−04 | −1.754558E−06 | 1.078121E−04 |

TABLE 20-continued

| Aspheric Coefficients | | | | | |
|---|---|---|---|---|---|
| A10 = | 1.730139E−02 | 3.920275E−03 | −1.241414E−03 | −4.898896E−04 | 1.693400E−04 |
| A12 = | −8.662706E−03 | −1.566335E−03 | 5.761317E−04 | 2.170900E−04 | −7.817919E−05 |
| A14 = | 2.550844E−03 | 3.820695E−04 | −1.525002E−04 | −4.947741E−05 | 1.717536E−05 |
| A16 = | −4.331449E−04 | −5.486147E−05 | 2.440272E−05 | 6.650712E−06 | −2.197853E−06 |
| A18 = | 3.905354E−05 | 4.251770E−06 | −2.318997E−06 | −5.243616E−07 | 1.715000E−07 |
| A20 = | −1.444573E−06 | −1.373118E−07 | 1.193816E−07 | 2.235767E−08 | −8.040449E−09 |
| A22 = | — | — | −2.519484E−09 | −3.979012E−10 | 2.083335E−10 |
| A24 = | — | — | — | — | −2.296136E−12 |

| Surface # | 18 | 19 | 20 | 21 | 22 |
|---|---|---|---|---|---|
| k = | −9.460750E+00 | −1.188350E+00 | −6.469910E−02 | 2.057460E+00 | −9.576600E−01 |
| A4 = | −8.833601E−03 | −3.336260E−02 | −2.168639E−02 | −3.109801E−02 | −2.925820E−02 |
| A6 = | −1.098481E−03 | 4.334714E−03 | 8.075437E−04 | 3.847944E−03 | 5.066810E−03 |
| A8 = | 2.048737E−04 | −6.214623E−05 | 9.186098E−04 | 1.556251E−04 | −6.499392E−04 |
| A10 = | 3.669153E−05 | −7.007811E−05 | −2.717120E−04 | −9.092068E−05 | 6.500245E−05 |
| A12 = | −1.827397E−05 | 1.057227E−05 | 4.095312E−05 | 1.185923E−05 | −5.245767E−06 |
| A14 = | 3.184327E−06 | −7.489777E−07 | −4.019847E−06 | −8.950132E−07 | 3.355451E−07 |
| A16 = | −3.158178E−07 | 2.905268E−08 | 2.764225E−07 | 4.506075E−08 | −1.644168E−08 |
| A18 = | 1.927433E−08 | −5.365446E−10 | −1.361049E−08 | −1.586158E−09 | 5.981465E−10 |
| A20 = | −7.167610E−10 | −1.626969E−12 | 4.779344E−10 | 3.943980E−11 | −1.568954E−11 |
| A22 = | 1.492008E−11 | 2.867990E−13 | −1.167633E−11 | −6.817015E−13 | 2.863764E−13 |
| A24 = | −1.333684E−13 | −5.318635E−15 | 1.883303E−13 | 7.810883E−15 | −3.439853E−15 |
| A26 = | — | 3.394043E−17 | −1.800243E−15 | −5.338725E−17 | 2.441149E−17 |
| A28 = | — | — | 7.712786E−18 | 1.647711E−19 | −7.753550E−20 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 8.67 | CTmax/CTmin | 3.55 |
| Fno | 1.95 | |R13/CT5| | 18.99 |
| HFOV [deg.] | 42.5 | f/R16 | 1.92 |
| V6 | 20.4 | f/R20 | 1.37 |
| (V2 + V3)/V1 | 0.7 | (R18 + R19)/(R18 − R19) | −0.46 |
| V5 + V6 | 43.9 | f/f1 | 1.14 |
| Vmin | 18.4 | f/f2 | −0.34 |
| V1/N1 | 36.30 | f/f8 | −0.35 |
| V2/N2 | 10.90 | f/f9 | 0.49 |
| V3/N3 | 10.90 | f10/f9 | −0.49 |
| V4/N4 | 36.26 | |f/f3| + |f/f5| + |f/f6| + |f/f7| + |f/f8| | 1.03 |
| V5/N5 | 14.34 | Y102/Y32 | 3.55 |
| V6/N6 | 12.29 | TL [mm] | 9.98 |
| V7/N7 | 14.34 | TL/f | 1.15 |
| V8/N8 | 17.83 | TL/ImgH | 1.22 |
| V9/N9 | 36.26 | ImgH/BL | 7.48 |
| V10/N10 | 36.48 | EPD/BL | 4.07 |
| (Vi/Ni)min | 10.90 | BL/TD | 0.12 |
| Nmax | 1.686 | SD/TD | 0.90 |
| CT4/CT3 | 1.797 | f/EPD | 1.95 |
| T910/CT1 | 0.90 | ImgH [mm] | 8.17 |
| ΣCT/TD | 0.60 | — | — |

11th Embodiment

Figure 21:
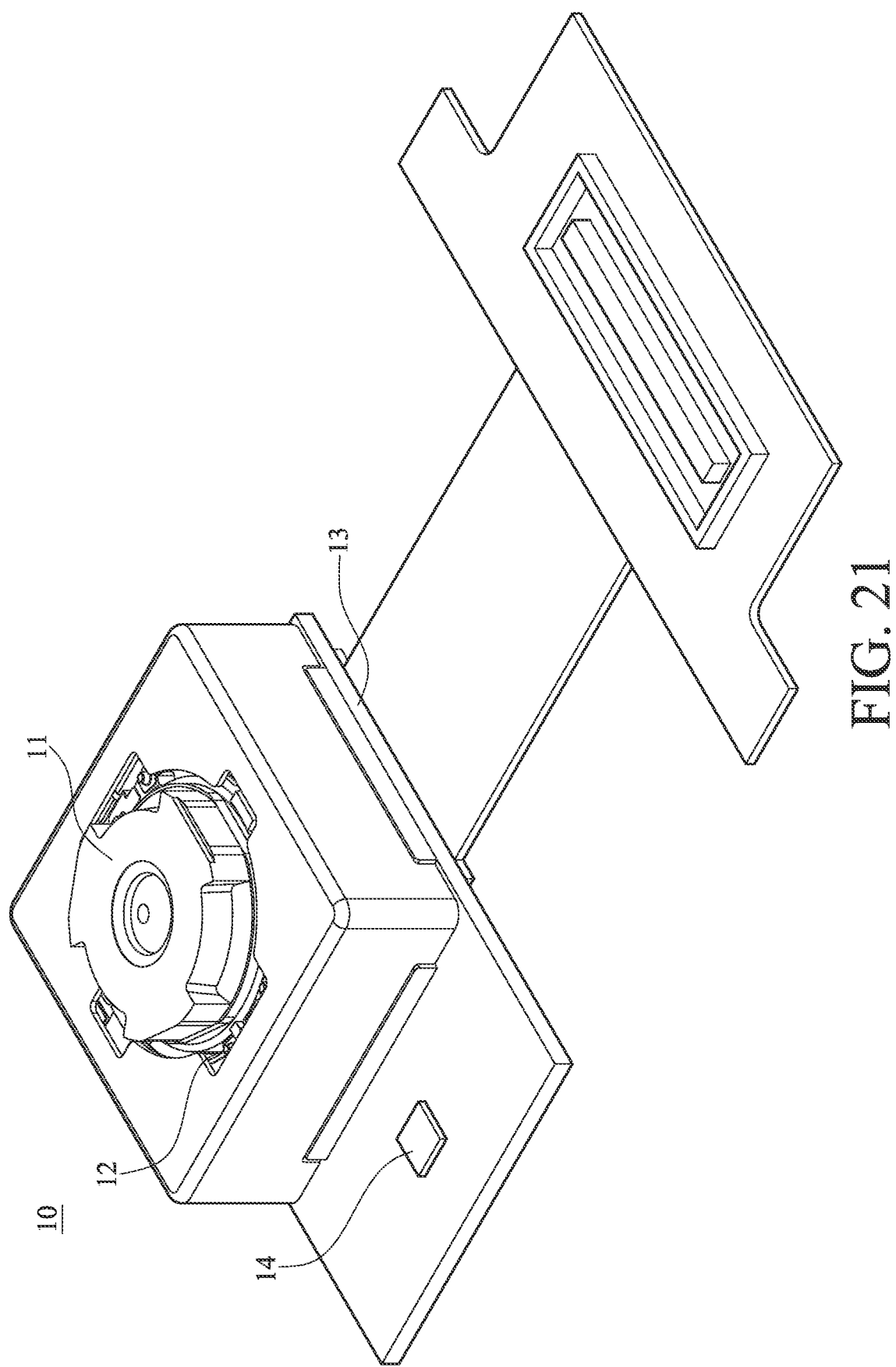
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the optical imaging system disclosed in the 1st embodiment, a barrel and a holder member (their reference numerals are omitted) for holding the optical imaging system. However, the lens unit 11 may alternatively be provided with the optical imaging system disclosed in other above-mentioned embodiments, and the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical imaging system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 22:
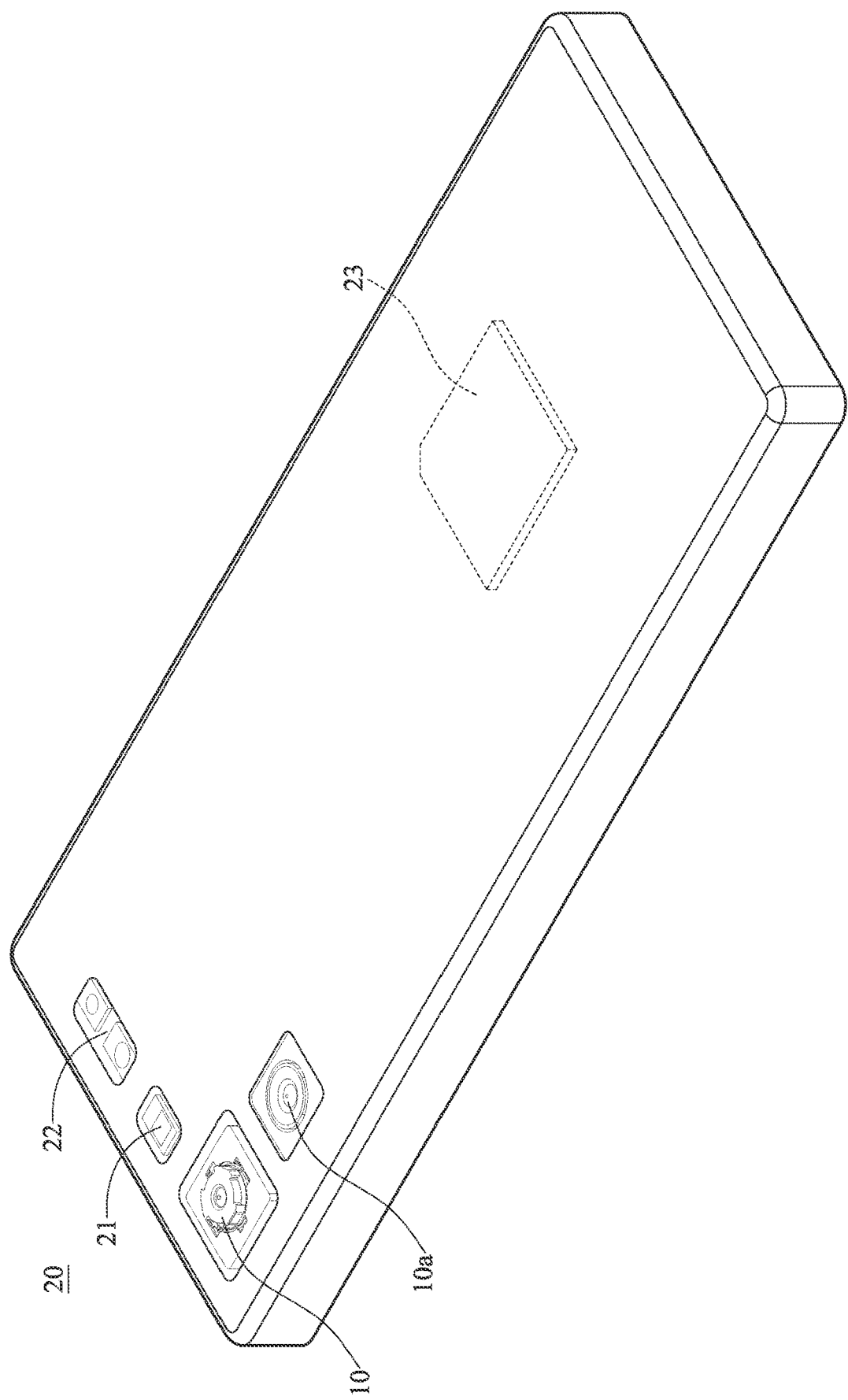
FIG. 22 is one perspective view of an electronic device according to the 12th embodiment of the present disclosure.
Figure 23:
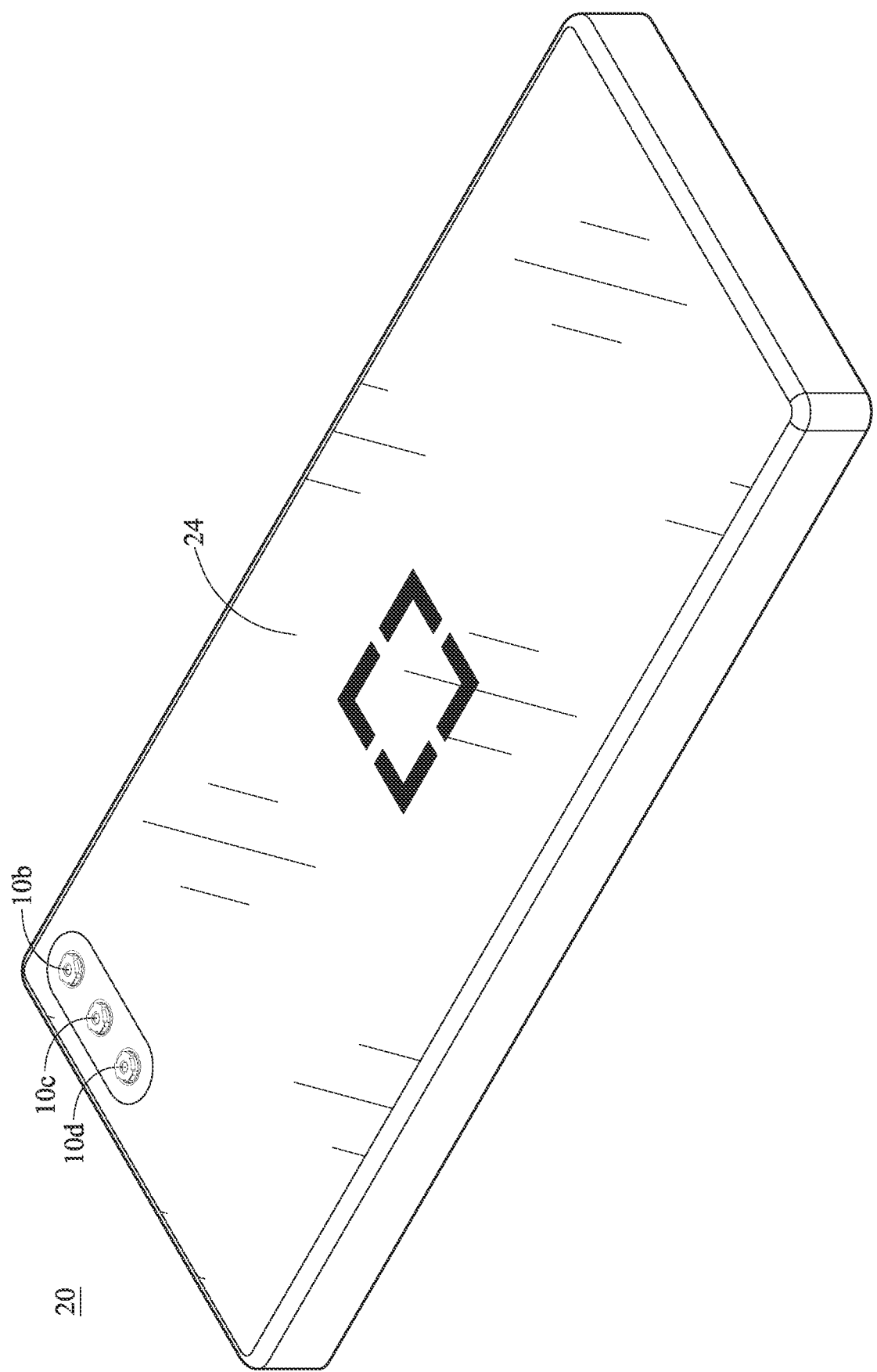
FIG. 23 is another perspective view of the electronic device in FIG. 22.
Figure 24:
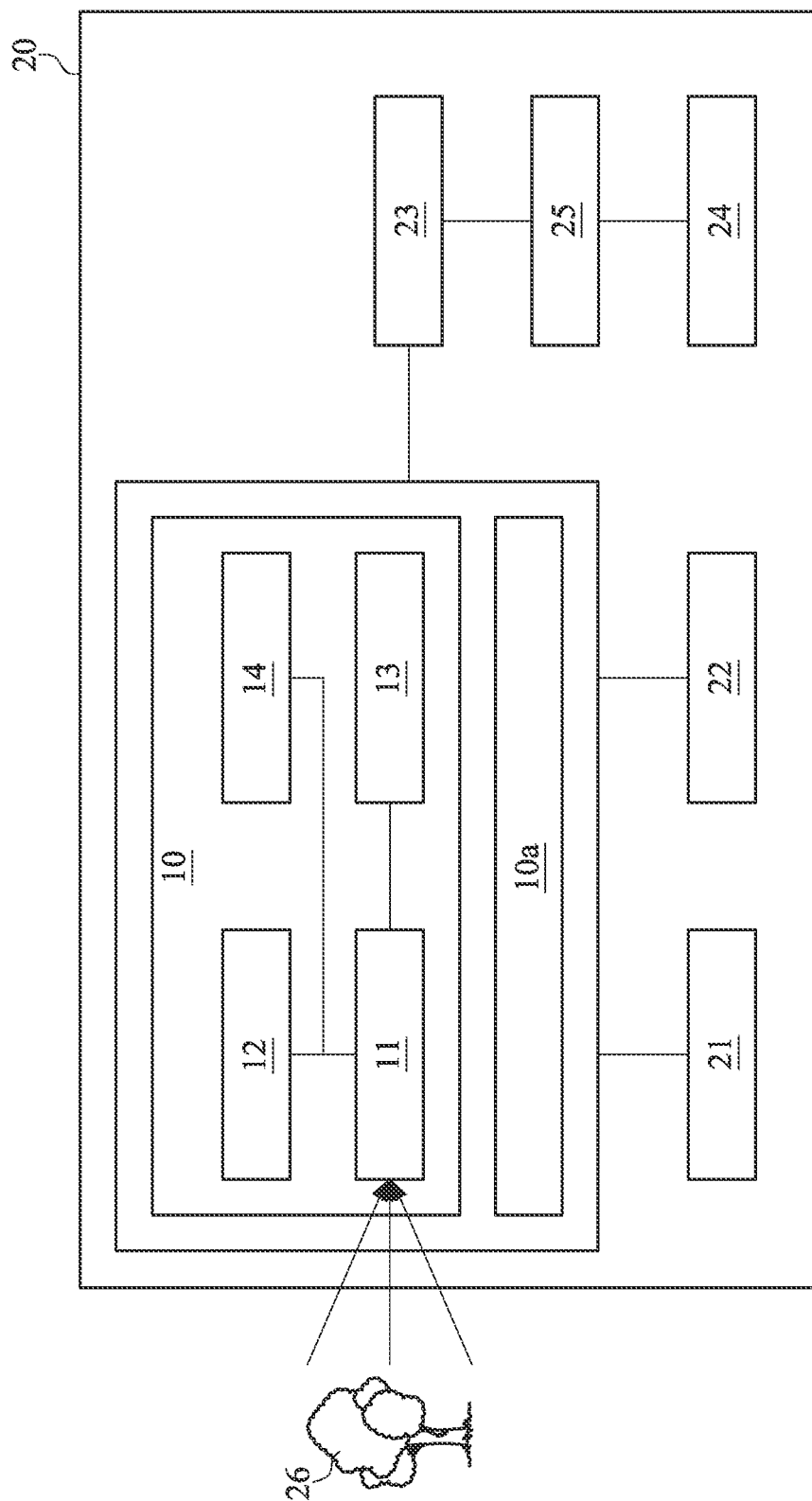
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22.

In this embodiment, an electronic device 20 is a smartphone including the image capturing unit 10 disclosed in the 11th embodiment, an image capturing unit 10a, an image capturing unit 10b, an image capturing unit 10c, an image capturing unit 10d, a flash module 21, a focus assist module 22, an image signal processor 23, a user interface 24 and an image software processor 25. The image capturing unit 10 and the image capturing unit 10a are disposed on the same side of the electronic device 20 and each of the image capturing units 10 and 10a has a single focal point. The image capturing unit 10b, the image capturing unit 10c, the image capturing unit 10d and the user interface 24 are disposed on the opposite side of the electronic device 20 and the user interface 24 is a display unit, such that the image capturing units 10b, 10c, 10d can be front-facing cameras of the electronic device 20 for taking selfies, but the present disclosure is not limited thereto. Furthermore, each of the image capturing units 10a, 10b, 10c and 10d can include the optical imaging system of the present disclosure and can have a configuration similar to that of the image capturing unit 10. In detail, each of the image capturing units 10a, 10b, 10c and 10d can include a lens unit, a driving device, an image sensor and an image stabilizer, and each of the lens unit can include an optical lens assembly such as the optical imaging system of the present disclosure, a barrel and a holder member for holding the optical lens assembly.

The image capturing unit 10 is a wide-angle image capturing unit, the image capturing unit 10a is an ultra-wide-angle image capturing unit, the image capturing unit 10b is a wide-angle image capturing unit, the image capturing unit 10c is an ultra-wide-angle image capturing unit, and the image capturing unit 10d is a ToF (time of flight) image capturing unit. In this embodiment, the image capturing units 10, 10a have different fields of view, such that the electronic device 20 can have various magnification ratios so as to meet the requirement of optical zoom functionality. Moreover, a maximum field of view of the image capturing unit 10 and a maximum field of view of the image capturing unit 10a differ by at least 20 degrees. Therefore, it is favorable for obtaining images with different ranges and details for the electronic device 20 so as to meet various usage scenarios. In addition, the image capturing unit 10d can determine depth information of the imaged object. In this embodiment, the electronic device 20 includes multiple image capturing units 10, 10a, 10b, 10c and 10d, but the present disclosure is not limited to the number and arrangement of image capturing units.

When a user captures images of an object 26, the light rays converge in the image capturing unit 10 or the image capturing unit 10a to generate images, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the light rays may converge in the image capturing unit 10b, 10c or 10d to generate images. The user interface 24 can include a touch screen, and the user is able to interact with the user interface 24 and the image software processor 25 having multiple functions to capture images and complete image processing. Alternatively, the user may capture images via a physical button. The image processed by the image software processor 25 can be displayed on the user interface 24.

13th Embodiment

Figure 25:
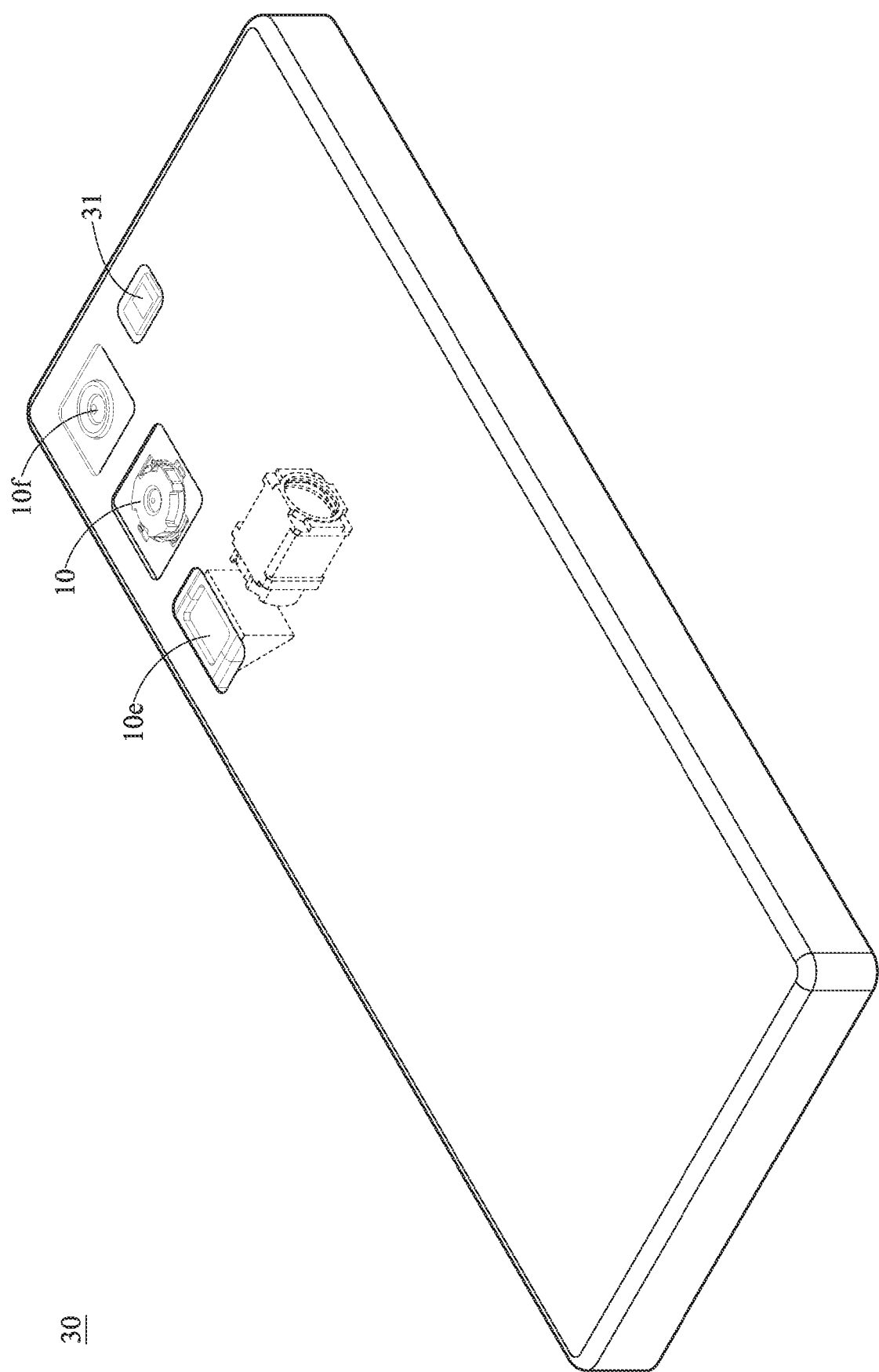
FIG. 25 is one perspective view of an electronic device according to the 13th embodiment of the present disclosure.

FIG. 25 is one perspective view of an electronic device according to the 13th embodiment of the present disclosure.

In this embodiment, an electronic device 30 is a smartphone including the image capturing unit 10 disclosed in the 11th embodiment, an image capturing unit 10e, an image capturing unit 10f, a flash module 31, a focus assist module, an image signal processor, a display unit and an image software processor (not shown). The image capturing unit 10, the image capturing unit 10e and the image capturing unit 10f are disposed on the same side of the electronic device 30, while the display unit is disposed on the opposite side of the electronic device 30. Furthermore, each of the image capturing units 10e and 10f can include the optical imaging system of the present disclosure and can have a configuration similar to that of the image capturing unit 10, so the details in this regard will not be provided again.

The image capturing unit 10 is a wide-angle image capturing unit, the image capturing unit 10e is a telephoto image capturing unit, and the image capturing unit 10f is an ultra-wide-angle image capturing unit. In this embodiment, the image capturing units 10, 10e and 10f have different fields of view, such that the electronic device 30 can have various magnification ratios so as to meet the requirement of optical zoom functionality. Moreover, the image capturing unit 10e can be a telephoto image capturing unit having a light-folding element configuration, such that the total track length of the image capturing unit 10e is not limited by the thickness of the electronic device 30. Moreover, the light-folding element configuration of the image capturing unit 10e can be similar to, for example, one of the structures shown in FIG. 28 to FIG. 30 which can be referred to foregoing descriptions corresponding to FIG. 28 to FIG. 30 so the details in this regard will not be provided again. In this embodiment, the electronic device 30 includes multiple image capturing units 10, 10e and 10f, but the present disclosure is not limited to the number and arrangement of image capturing units. When a user captures images of an object, light rays converge in the image capturing unit 10, 10e or 10f to generate images, and the flash module 31 is activated for light supplement. Further, the subsequent processes are performed in a manner similar to the abovementioned embodiment, so the details in this regard will not be provided again.

14th Embodiment

Figure 26:
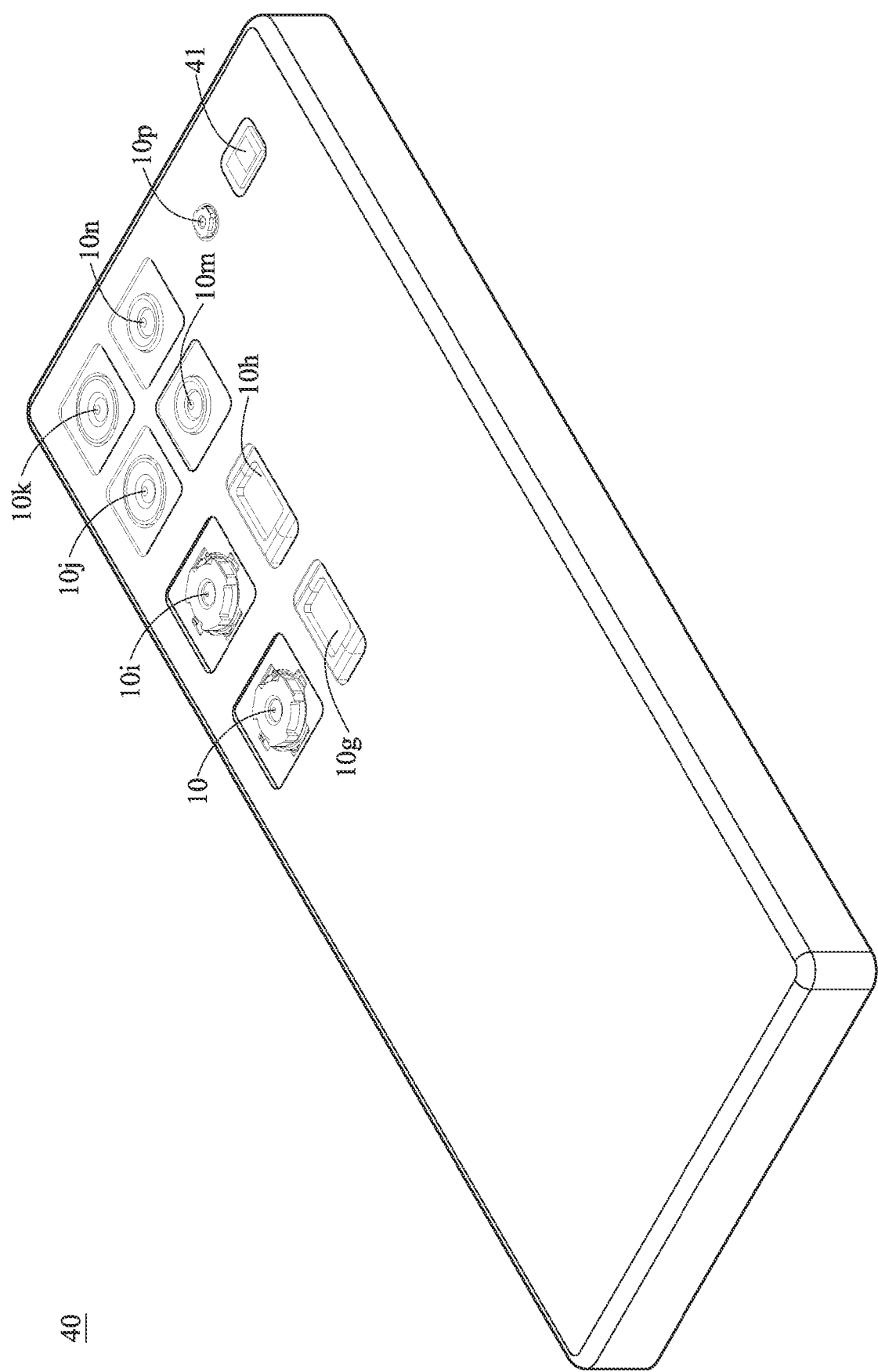
FIG. 26 is one perspective view of an electronic device according to the 14th embodiment of the present disclosure.

FIG. 26 is one perspective view of an electronic device according to the 14th embodiment of the present disclosure.

In this embodiment, an electronic device 40 is a smartphone including the image capturing unit 10 disclosed in the 11th embodiment, an image capturing unit 10g, an image capturing unit 10h, an image capturing unit 10i, an image capturing unit 10j, an image capturing unit 10k, an image capturing unit 10m, an image capturing unit 10n, an image capturing unit 10p, a flash module 41, a focus assist module, an image signal processor, a display unit and an image software processor (not shown). The image capturing units 10, 10g, 10h, 10i, 10j, 10k, 10m, 10n and 10p are disposed on the same side of the electronic device 40, while the display unit is disposed on the opposite side of the electronic device 40. Furthermore, each of the image capturing units 10g, 10h, 10i, 10j, 10k, 10m, 10n and 10p can include the optical imaging system of the present disclosure and can have a configuration similar to that of the image capturing unit 10, so the details in this regard will not be provided again.

The image capturing unit 10 is a wide-angle image capturing unit, the image capturing unit 10g is a telephoto image capturing unit, the image capturing unit 10h is a telephoto image capturing unit, the image capturing unit 10i is a wide-angle image capturing unit, the image capturing unit 10j is an ultra-wide-angle image capturing unit, the image capturing unit 10k is an ultra-wide-angle image capturing unit, the image capturing unit 10m is a telephoto image capturing unit, the image capturing unit 10n is a telephoto image capturing unit, and the image capturing unit 10p is a ToF image capturing unit. In this embodiment, the image capturing units 10, 10g, 10h, 10i, 10j, 10k, 10m and 10n have different fields of view, such that the electronic device 40 can have various magnification ratios so as to meet the requirement of optical zoom functionality. Moreover, each of the image capturing units 10g and 10h can be a telephoto image capturing unit having a light-folding element configuration. Moreover, the light-folding element configuration of each of the image capturing unit 10g and 10h can be similar to, for example, one of the structures shown in FIG. 28 to FIG. 30 which can be referred to foregoing descriptions corresponding to FIG. 28 to FIG. 30 so the details in this regard will not be provided again. In addition, the image capturing unit 10p can determine depth information of the imaged object. In this embodiment, the electronic device 40 includes multiple image capturing units 10, 10g, 10h, 10i, 10j, 10k, 10m, 10n and 10p, but the present disclosure is not limited to the number and arrangement of image capturing units. When a user captures images of an object, the light rays converge in the image capturing unit 10, 10g, 10h, 10i, 10j, 10k, 10m, 10n or 10p to generate images, and the flash module 41 is activated for light supplement. Further, the subsequent processes are performed in a manner similar to the abovementioned embodiments, so the details in this regard will not be provided again.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical imaging system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging system comprising ten lens elements, the ten lens elements being, in order from an object side to an image side along an optical path, a first lens element, a second lens element, a third lens element, a fourth lens element, a fifth lens element, a sixth lens element, a seventh lens element, an eighth lens element, a ninth lens element and a tenth lens element, and each of the ten lens elements has an object-side surface facing toward the object side and an image-side surface facing toward the image side;

wherein the optical imaging system further comprises an aperture stop, the first lens element has positive refractive power, the second lens element has negative refractive power, the image-side surface of the second lens element is concave in a paraxial region thereof, the fourth lens element has positive refractive power, the image-side surface of the eighth lens element is concave in a paraxial region thereof and has at least one convex shape in an off-axis region thereof, the ninth lens element has positive refractive power, the tenth lens element has negative refractive power, and at least one of the object-side surface and the image-side surface of the tenth lens element has at least one inflection point; and wherein an axial distance between the aperture stop and the image-side surface of the tenth lens element is SD, an axial distance between the object-side surface of the first lens element and the image-side surface of the tenth lens element is TD, a curvature radius of the image-side surface of the eighth lens element is R16, a curvature radius of the image-side surface of the ninth lens element is R18, a curvature radius of the object-side surface of the tenth lens element is R19, a focal length of the optical imaging system is f, a focal length of the first lens element is f1, and the following conditions are satisfied:

$0.30 < SD/TD < 1.20;$ $-5.0 < (R18+R19)/(R18-R19) < 5.0;$ $0.15 < f/R16 < 8.0;$ and $0.20 < f/f1 < 4.0.$ 2. The optical imaging system of claim 1, wherein the object-side surface of the second lens element is convex in a paraxial region thereof, the image-side surface of the third lens element is concave in a paraxial region thereof, and at least four lens elements of the optical imaging system are made of plastic material.

3. The optical imaging system of claim 1, wherein at least four lens elements of the optical imaging system have Abbe numbers smaller than 40.0; and wherein an axial distance between the image-side surface of the tenth lens element and an image surface is BL, the axial distance between the object-side surface of the first lens element and the image-side surface of the tenth lens element is TD, and the following condition is satisfied:

$0 < BL/TD < 0.25.$

4. The optical imaging system of claim 1, wherein a maximum image height of the optical imaging system is ImgH, an axial distance between the image-side surface of the tenth lens element and an image surface is BL, and the following condition is satisfied:

$5.0 < ImgH/BL < 20.0.$

5. The optical imaging system of claim 1, wherein a maximum value among central thicknesses of all lens elements of the optical imaging system is CTmax, a minimum value among central thicknesses of all lens elements of the optical imaging system is CTmin, the focal length of the optical imaging system is f, a focal length of the second lens element is f2, and the following conditions are satisfied:

2.0<CTmax/CTmin<5.5; and

−3.0<f/f2<−0.25.

6. The optical imaging system of claim 1, wherein the focal length of the optical imaging system is f, a focal length of the third lens element is f3, a focal length of the fifth lens element is f5, a focal length of the sixth lens element is f6, a focal length of the seventh lens element is f7, a focal length of the eighth lens element is f8, and the following condition is satisfied:

0<|f/f3|+|f/f5|+|f/f6|+|f/f7|+|f/f8|<1.10.

7. The optical imaging system of claim 1, wherein an Abbe number of the sixth lens element is V6, and the following condition is satisfied:

10.0<V6<40.0.

8. The optical imaging system of claim 1, wherein the focal length of the optical imaging system is f, a curvature radius of the image-side surface of the tenth lens element is R20, a sum of central thicknesses of all lens elements of the optical imaging system is ΣCT, the axial distance between the object-side surface of the first lens element and the image-side surface of the tenth lens element is TD, and the following conditions are satisfied:

0.60<f/R20<2.50; and 0.45<ΣCT/TD<1.0.

\* \* \* \* \*